(12) United States Patent
Yoshida

(10) Patent No.: US 11,455,056 B2
(45) Date of Patent: Sep. 27, 2022

(54) POSITION INPUT DEVICE

(71) Applicant: Sharp Kabushiki Kaisha, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/236,041

(22) Filed: Apr. 21, 2021

(65) Prior Publication Data

US 2021/0357095 A1     Nov. 18, 2021

Related U.S. Application Data

(60) Provisional application No. 63/026,174, filed on May 18, 2020.

(51) Int. Cl.
    *G06F 3/041*         (2006.01)
    *G06F 3/044*         (2006.01)
    *G02F 1/1343*       (2006.01)
    *G02F 1/1362*       (2006.01)
    *G02F 1/1333*       (2006.01)
    *G02F 1/1368*       (2006.01)

(52) U.S. Cl.
    CPC ...... *G06F 3/04164* (2019.05); *G02F 1/13338* (2013.01); *G02F 1/134318* (2021.01); *G02F 1/134363* (2013.01); *G02F 1/136272* (2021.01); *G06F 3/044* (2013.01); *G06F 3/0412* (2013.01); *G06F 3/04166* (2019.05); *G02F 1/1368* (2013.01); *G02F 1/136227* (2013.01)

(58) Field of Classification Search
    CPC ................................................ G06F 3/041–048
    See application file for complete search history.

(56) References Cited

U.S. PATENT DOCUMENTS

2014/0104510 A1    4/2014   Wang et al.
2019/0294273 A1*   9/2019   Yoshida ................ G06F 3/0418

FOREIGN PATENT DOCUMENTS

JP           2014-081935 A      5/2014

* cited by examiner

*Primary Examiner* — Roy P Rabindranath
(74) *Attorney, Agent, or Firm* — Keating & Bennett, LLP

(57) ABSTRACT

A position input device includes a position detecting electrode, a position detecting wire, a first spare position detecting wire, a plurality of second spare position detecting wires, and a plurality of connectable portions. The position detecting electrode detects an input position. The position detecting wire transmits at least a position detection signal. The plurality of second spare position detecting wires are connectable to the first spare position detecting wire. The plurality of connectable portions are provided separately at each of sites of intersection of the position detecting wire and the plurality of second spare position detecting wires and are disposed to overlap each other via an insulating film.

15 Claims, 29 Drawing Sheets

POSITION INPUT DEVICE

CROSS-REFERENCE TO RELATED APPLICATION

The present application claims priority from Provisional Application No. 63/026,174, the content to which is hereby incorporated by reference into this application.

BACKGROUND OF THE INVENTION

1. Field of the Invention

The technology disclosed herein relates to a position input device.

2. Description of the Related Art

A conventionally known example of a capacitive in-cell touch panel is described in Japanese Unexamined Patent Application Publication No. 2014-81935. The capacitive in-cell touch panel described in Japanese Unexamined Patent Application Publication No. 2014-81935 has a sensing electrode provided over a color filter substrate and a TFT array substrate having a common electrode layer and, by dividing the whole common electrode layer into a plurality of strip structures that function as touch driving electrodes and driving the touch driving electrodes in a time-division manner, achieves a touch function and a display function in a time-division manner. Since the structure of the common electrode layer of the TFT array substrate is altered to form the touch driving electrodes, it is not necessary to add a new film over the existing TFT array substrate, and it is only necessary to add an additional process of dividing the whole common electrode layer into the plurality of strip structures. This reduces manufacturing cost and raises manufacturing efficiency.

SUMMARY OF THE INVENTION

In the capacitive in-cell touch panel described in Japanese Unexamined Patent Application Publication No. 2014-81935, common electrode signal lines are connected to the plurality of touch driving electrodes into which the common electrode layer is divided, and a common electrode signal and a touch scanning signal that are outputted from an IC chip are supplied through the common electrode signal lines. However, in case of a break in a common electrode signal line, the common electrode signal and the touch scanning signal can no longer be supplied to a touch driving electrode to which the common electrode signal line is connected. This may seriously impairs both the display function and the touch panel function. In particular, with progress toward larger sizes and higher definition, common electrode signal lines become greater in line length and become smaller in line width. Such common electrode signal lines tend to easily get broken and are hard to handle.

The technology described herein was made in view of such circumstances, and has as an object to make it possible to repair a position detecting wire.

(1) A position input device according to the technology described herein includes: a position detecting electrode that forms a capacitance with a position input body which performs position input and that detects an input position inputted by the position input body; a position detecting wire that extends along a first direction, that is connected to the position detecting electrode, and that transmits at least a position detection signal; a first spare position detecting wire that extends along the first direction; a plurality of second spare position detecting wires that extend along a second direction intersecting the first direction, that are arranged at spacings in the first direction, that intersect the position detecting wire and the first spare position detecting wire, and that are connectable to the first spare position detecting wire; and a plurality of connectable portions that are provided separately at each of sites of intersection of the position detecting wire and the plurality of second spare position detecting wires and that are disposed to overlap each other via an insulating film.

(2) Further, in the position input device, in addition to (1) described above, a plurality of the position detecting electrodes may be arranged at spacings in the second direction, and the first spare position detecting wire may be disposed between the position detecting electrodes adjacent to each other in the second direction.

(3) Further, in addition to (2) described above, the position input device may further include: a pixel electrode disposed to overlap the position detecting electrode via an insulating film; and a signal supply unit, connected to the position detecting wire, that supplies the position detecting wire with the position detection signal and a common potential signal in a time-division manner.

(4) Further, in addition to (3) described above, the position input device may further include a common potential signal supply unit, connected to the first spare position detecting wire, that supplies the first spare position detecting wire with the common potential signal.

(5) Further, in the position input device, in addition to (4) described above, a plurality of the position detecting electrodes may be arranged at spacings in the first direction, and the first spare position detecting wire may extend an entire length of a range of placement of the plurality of position detecting electrodes in the first direction.

(6) Further, in the position input device, in addition to (5) described above, a plurality of the first spare position detecting wires may be placed adjacent separately to each of a plurality of the position detecting electrodes arranged in the second direction, and a plurality of the second spare position detecting wires may be arranged in the second direction and disposed to separately intersect each of the plurality of first spare position detecting wires.

(7) Further, in the position input device, in addition to any of (4) to (6) described above, the second spare position detecting wires may be disposed between the position detecting electrodes adjacent to each other in the first direction, and may be connected to the first spare position detecting wire that the second spare position detecting wires intersect.

(8) Further, in addition to any of (4) to (6) described above, the position input device may further include a plurality of inter-spare position detecting wire connectable portions that are provided separately at each of sites of intersection of the first spare position detecting wire and the plurality of second spare position detecting wires and that are disposed to overlap each other via an insulating film.

(9) Further, in the position input device, in addition (2) described above, a plurality of the position detecting electrodes may be arranged at spacings in the first direction, a plurality of the first spare position detecting wires may be arranged in the first direction, arranged so that the position detecting electrode is interposed therebetween in the second direction, and disposed so that those of the first spare position detecting wires between which the position detecting electrode is interposed in the second direction differ in position from each other in the first direction, and the second spare position detecting wires may be disposed to separately intersect at least two of the first spare position detecting wires between which the position detecting electrode is interposed in the second direction.

(10) Further, in the position input device, in addition (9) described above, the second spare position detecting wires may be disposed between the position detecting electrodes adjacent to each other in the first direction, arranged in the second direction, and disposed so that those of the second spare position detecting wires between which the position detecting electrode is interposed in the first direction differ in position from each other in the second direction.

(11) Further, in the position input device, in addition (10) described above, the second spare position detecting wires may be connected to one of two of the first spare position detecting wires between which the position detecting electrode is interposed in the second direction, the position input device further including inter-spare position detecting wire connectable portions that are provided separately at each of sites of intersection of the second spare position detecting wires and the other of the two first spare position detecting wires and that are disposed to overlap each other via an insulating film.

(12) Further, in addition to any of (1) to (11) described above, the position input device may further include a plurality of intermediate electrodes that are disposed so that an interlayer insulating film is sandwiched between the plurality of connectable portions of the position detecting wire and the plurality of intermediate electrodes and that are disposed so that an insulating film is sandwiched between the plurality of connectable portions of the plurality of second spare position detecting wires and the plurality of intermediate electrodes. In the position input device, either the plurality of connectable portions of the position detecting wire or the plurality of connectable portions of the plurality of second spare position detecting wires may be connected to the plurality of intermediate electrodes through intermediate electrode contact holes bored through an insulating film.

(13) Further, in addition to (12) described above, the position input device may further include a plurality of inter-spare position detecting wire electrodes disposed so that an insulating film is sandwiched between sites of intersection of the first spare position detecting wire with the plurality of second spare position detecting wires and the plurality of inter-spare position detecting wire electrodes and an insulating film is sandwiched between sites of intersection of the plurality of second spare position detecting wires with the first spare position detecting wire and the plurality of inter-spare position detecting wire electrodes. In the position input device, at least either the sites of intersection of the first spare position detecting wire with the plurality of second spare position detecting wires or the sites of intersection of the plurality of second spare position detecting wires with the first spare position detecting wire may be connected to the plurality of intermediate electrodes through inter-spare position detecting wire electrode contact holes bored through an insulating film.

(14) Further, in addition to any of (1) to (13) described above, the position input device may further include: a plurality of pixel electrodes that are arranged in the second direction and that are disposed to overlap the position detecting electrode via an insulating film; and a plurality of image lines that extend along the first direction, that are arranged in the second direction, and that supply the plurality of pixel electrodes with an image signal. In the position input device, the position detecting wire and the first spare position detecting wire may be located at the same layer as each other and disposed to overlap the plurality of image lines via an insulating film.

(15) Further, in addition to any of (1) to (14) described above, the position input device may further include: a plurality of pixel electrodes that are arranged in the first direction and that are disposed to overlap the position detecting electrode via an insulating film; a plurality of switching elements that are connected separately to each of the plurality of pixel electrodes; and a plurality of scanning lines that extend along the second direction, that are disposed so that two of the pixel electrodes are interposed therebetween in the first direction, two of which are disposed between the pixel electrodes adjacent to each other in the first direction, and that are connected to the plurality of switching elements. In the position input device, the second spare position detecting wires may be located at the same layer as the scanning lines, disposed between the pixel electrodes adjacent to each other in the first direction, and disposed so that the pixel electrodes are interposed between the scanning lines and the second spare position detecting wires in the first direction.

The technology described herein makes it possible to repair a position detecting wire.

DETAILED DESCRIPTION OF THE INVENTION

Embodiment 1

Figure 1:
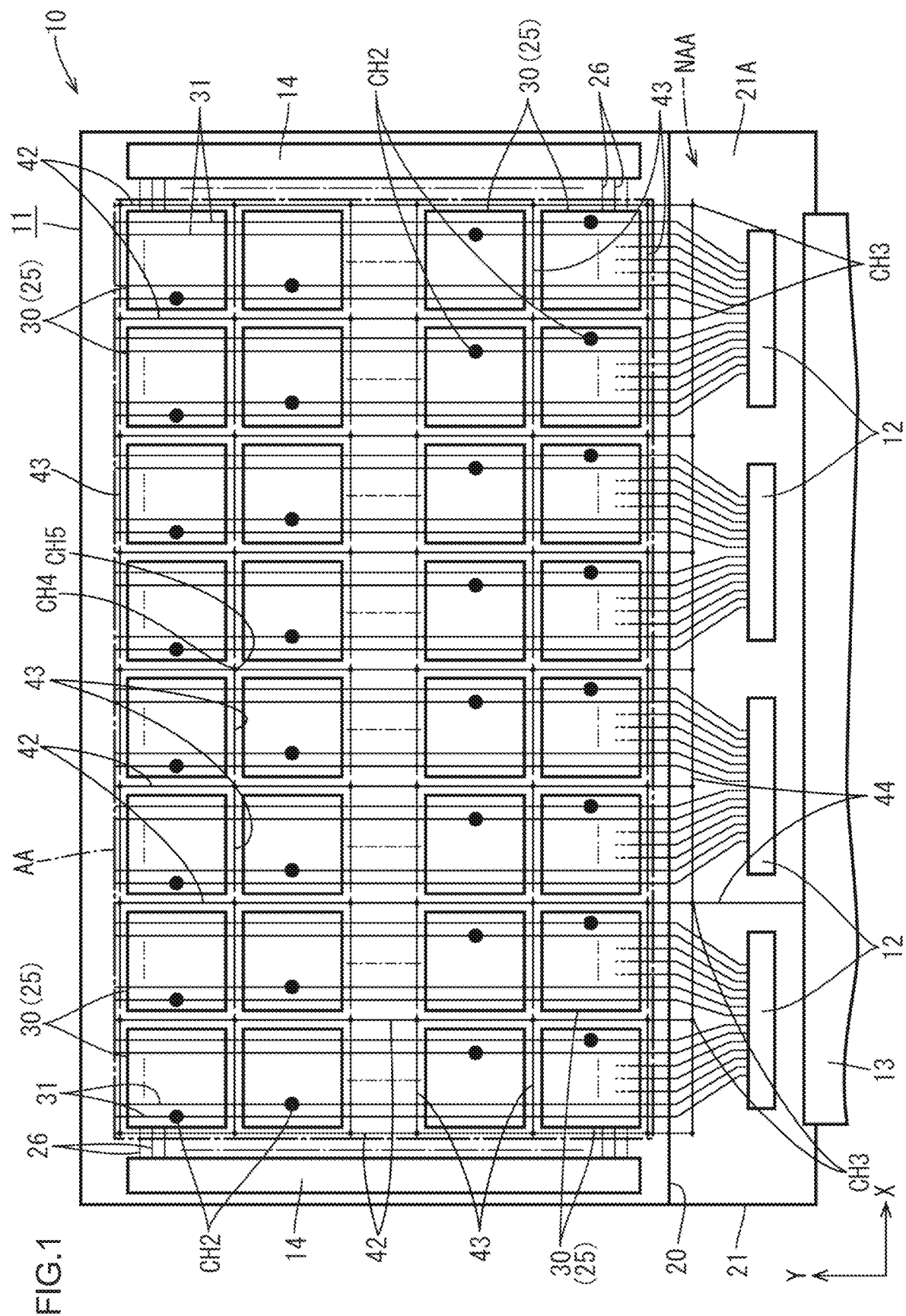
FIG. 1 is a plan view showing touch electrodes, touch wires, or other components of a liquid crystal panel of a liquid crystal display device according to Embodiment 1.

Embodiment 1 is described with reference to FIGS. 1 to 16. The present embodiment illustrates a liquid crystal display device (display device with a position input function) 10 including an image display function and a touch panel function (position input function, position detection function). It should be noted that some of the drawings show an X axis, a Y axis, and a Z axis, and are drawn such that each of the axes extends in a corresponding one of the directions shown in the drawings. Further, FIGS. 3, 5, 8, 14, and 15 show front side up and show back side down.

FIG. 1 is a schematic plan view of a liquid crystal panel 11. As shown in FIG. 1, the liquid crystal display device 10 includes at least the liquid crystal panel (position input device, display panel, display panel with a position input function) 11, which has a horizontally long square shape and which is capable of displaying an image, and a backlight device (lighting device) serving as an external light source that illuminates the liquid crystal panel 11 with light for use in display. In the present embodiment, the liquid crystal panel 11 has a screen size of, for example, approximately 60 inches (specifically, 60.3 inches) and a resolution of "7680× 4320" equivalent to 8K resolution. The backlight device is disposed at the back of (i.e. at the rear of) the liquid crystal panel 11, and has a light source (such as an LED) that emits white light, an optical member that converts light from the light source into planar light by imparting an optical effect to the light, or other components.

As shown in FIG. 1, a central part of a screen of the liquid crystal panel 11 serves as a display area (area surrounded by dot-and-dash lines in FIG. 1) AA in which an image is displayed. Meanwhile, a frame-shaped outer peripheral portion of the screen of the liquid crystal panel 11 surrounding the display area AA serves as a non-display area NAA in which no image is displayed. The liquid crystal panel 11 includes a pair of substrates 20 and 21 bonded together. One of the two substrates 20 and 21 located at the front (i.e. facing forward) is a CF substrate (counter substrate) 20, and one of the two substrates 20 and 21 located at the back (i.e. at the rear) is an array substrate (active matrix substrate, element substrate) 21. The CF substrate 20 and the array substrate 21 each include a glass substrate and various types of films stacked over an inner surface of the glass substrate. It should be noted that a polarizing plate is attached to an outer surface of each of the two substrates 20 and 21. The CF substrate 20 has its short side dimension made shorter than a short side dimension of the array substrate 21, and is bonded to the array substrate 21 in such a manner that one end of the CF substrate 20 meets one end of the array substrate 21 in a short side direction (Y-axis direction). Accordingly, the other end of the array substrate 21 in the short side direction serves as a CF substrate non-overlap portion 21A that protrudes laterally from the CF substrate 20 and that does not overlap the CF substrate 20. In this CF substrate non-overlap portion 21A, a driver (signal supply unit) 12 and a flexible substrate 13 for supplying various signals involved in the after-mentioned display function or touch panel function are mounted. The driver 12 includes an LSI chip having a drive circuit inside, is mounted on the array substrate 21 by COG (chip on glass), and processes various signals that are transmitted by the flexible substrate 13. In the present embodiment, four drivers 12 are arranged at spacings in an X-axis direction in the non-display area NAA of the liquid crystal panel 11. The flexible substrate 13 includes a substrate made of an insulating and flexible synthetic resin material (such as polyimide resin) and a large number of wiring patterns formed over the substrate. The flexible substrate 13 has one end connected to the non-display area NAA of the liquid crystal panel 11, and has the other end connected to a control substrate (signal supply source). Various signals that are supplied from the control substrate are transmitted to the liquid crystal panel 11 via the flexible substrate 13, processed by the driver 12 in the non-display area NAA, and then outputted toward the display area AA. In the non-display area NAA of the array substrate 21, a pair of gate circuit units 14 are provided in such a manner that the display area AA is interposed between the gate circuit units 14 on both sides of the display area AA in the X-axis direction. Each of the gate circuit units 14 is intended to supply a scanning signal to the after-mentioned gate lines 26, and is monolithically provided in the array substrate 21.

The liquid crystal panel 11 according to the present embodiment has both a display function of displaying an image and a touch panel function of detecting a position (input position) that a user inputs on the basis of an image being displayed, and has an integrated (in-cell) touch panel pattern for fulfilling the touch panel function. This touch panel pattern is of a so-called projected capacitive type, and employs a self-capacitance detecting scheme. As shown in FIG. 1, the touch panel pattern is constructed of a plurality of touch electrodes (position detecting electrodes) 30 arranged in a matrix in a board surface of the liquid crystal panel 11. The touch electrodes 30 are disposed in the display area AA of the liquid crystal panel 11. Accordingly, the display area AA of the liquid crystal panel 11 substantially coincides with a touch area (position input area) that is capable of detecting an input position, and the non-display area NAA substantially coincides with a non-touch area (non-position input area) that is incapable of detecting an input position. Moreover, when the user moves a finger (position input body), which is an electric conductor, toward a surface (display surface) of the liquid crystal panel 11 in an attempt to perform position input on the basis of an image that the user views in the display area AA of the liquid crystal panel 11, capacitances are formed between the finger and touch electrodes 30. A capacitance that is detected by a touch electrode 30 situated close to the finger changes as the finger approaches, and becomes different from a capacitance that is detected by a touch electrode 30 situated away from the finger. This makes it possible to detect the input position on the basis of the difference.

As shown in FIG. 1, the plurality of touch electrodes 30 are arranged at spacings in a matrix along the X-axis direction (direction of arrangement of pixel electrodes 24 between which a touch wire 31 is interposed) and the Y-axis direction (direction of extension of a touch wire 31) in the display area AA. Each of the touch electrodes 30 has a substantially square shape when seen in plan view, and has a dimension of approximately several millimeters on a side. Specifically, in the present embodiment, each of the touch electrodes 30 has a regular square shape having a dimension of approximately 6.8 mm on a side; therefore, in the touch area (display area AA) of the liquid crystal panel 11, whose screen size is 60.3 inches, a total of 21867 touch electrodes 30 arranged in a matrix with 111 rows arranged in a short side direction (Y-axis direction) of the touch area and 197 columns arranged in a long side direction (X-axis direction) of the touch area are present. Accordingly, each of the touch electrodes 30 is much larger in size than the after-mentioned pixel unit PX when seen in plan view, and is disposed in an area covering a plurality of (e.g. approximately several tens of) pixel units PX in the X-axis direction and the Y-axis direction. It should be noted that specific numerical values such as the dimension of a touch electrode 30 on a side and the number of touch electrodes 30 provided in the touch area may be changed as appropriate to numerical values other than those mentioned above. Further, the number of touch electrodes 30 shown in FIG. 1 does not agree with the aforementioned number (21867) of touch electrodes 30 provided, and FIG. 1 is merely a schematic representation of an array of touch electrodes 30. The liquid crystal panel 11 is provided with a plurality of touch wires (position detecting wires) 31 selectively connected to the plurality of touch electrodes 30. Each of the touch wires 31 extends along the Y-axis direction, and is selectively connected to a particular one of a plurality of touch electrodes 30 arranged along the Y-axis direction. It should be noted that FIG. 1 uses large black circles to illustrate points of connection at which the touch wires 31 are connected to the touch electrodes 30. Furthermore, the touch wires 31 are connected to a detection circuit. The detection circuit may be provided in the driver 12, or may be provided outside the liquid crystal panel 11 via the flexible substrate 13. A detailed configuration of the touch wires 31 will be described later.

As shown in FIG. 1, the liquid crystal panel 11 includes first spare touch wires (first spare position detecting wires) 42 and second spare touch wires (second spare position detecting wires) 43 that are used for repair in case of a break in a touch wire 31. The first spare touch wires 42 extend along the Y-axis direction (first direction) in such a manner as to run parallel to the touch wires 31, and each extend the entire length of a range of placement of a column of touch electrodes 30 arranged in the Y-axis direction (i.e. a short side of the touch area). The first spare touch wires 42 are placed adjacent to the touch electrodes 30 in the X-axis direction so as not to overlap the touch electrodes 30. In particular, the first spare touch wires 42 include first spare touch wires 42 each disposed in a place between touch electrodes 30 arranged in the X-axis direction and first spare touch wires 42 disposed in places at both ends of the touch area in the X-axis direction, and the number of first spare touch wires 42 provided is larger by 1 than the number of touch electrodes 30 arranged in the X-axis direction. Specifically, the number of first spare touch wires 42 provided is for example 198. The second spare touch wires 43 extend along the X-axis direction (second direction) orthogonal to (intersecting) the Y-axis direction, and the number of second spare touch wires 43 arranged in the X-axis direction is equal to the number of touch electrodes 30 arranged in the X-axis direction. That is, the length of each of the second spare touch wires 43 is smaller than the range of placement of a row of touch electrodes 30 arranged in the X-axis direction (i.e. a long side of the touch area), and is about equal to the length of a side of a touch electrode 30. The second spare touch wires 43 are placed adjacent to the touch electrodes 30 in the Y-axis direction so as not to overlap the touch electrodes 30. In particular, the second spare touch wires 43 include second spare touch wires 43 each disposed in a place between touch electrodes 30 arranged in the Y-axis direction and second spare touch wires 43 disposed in places at both ends of the touch area in the Y-axis direction. Accordingly, a total of 22064 second spare touch wires 43 are arranged in a matrix with 112 rows arranged in the Y-axis direction and 197 columns arranged in the X-axis direction.

As shown in FIG. 1, those first and second spare touch wires 42 and 43 which surround a common touch electrode 30 intersect each other, and the sites of intersection are connected to each other. A second spare touch wire 43 adjacent in the Y-axis direction to a touch electrode 30 belonging to a column other than the column of touch electrodes 30 located at the left end in FIG. 1 is connected to a first spare touch wire 42 adjacent on the right in FIG. 1 to touch electrodes 30 belonging to the same column. On the other hand, a second spare touch wire 43 adjacent in the Y-axis direction to a touch electrode 30 belonging to the column of touch electrodes 30 located at the left end in FIG. 1 is connected to two first spare touch wires 42 between which touch electrodes 30 belonging to the same column are interposed on both sides of the touch electrodes 30 in the X-axis direction. It should be noted that FIG. 1 uses small black circles to illustrate points of connection between the first spare touch wires 42 and the second spare touch wires 43. A detailed configuration of the first spare touch wires 42 and the second spare touch wires 43 will be described later. Further, the liquid crystal panel 11 is provided with a common potential signal supply wire (common potential signal supply unit) 44 for supplying a common potential signal to the first spare touch wires 42. The common potential signal supply wire 44 has a portion extending along the X-axis direction and a portion extending along the Y-axis direction. The portion of the common potential signal supply wire 44 extending along the X-axis direction is located between the touch area and the driver 12 in the Y-axis direction, extends the entire length of the touch area in the X-axis direction, and is connected to all first spare touch wires 42. The portion of the common potential signal supply wire 44 extending along the Y-axis direction is connected to the portion extending along the X-axis direction and to the flexible substrate 13. The common potential signal supply wire 44 is supplied with a common potential signal that is transmitted by the flexible substrate 13.

Figure 2:
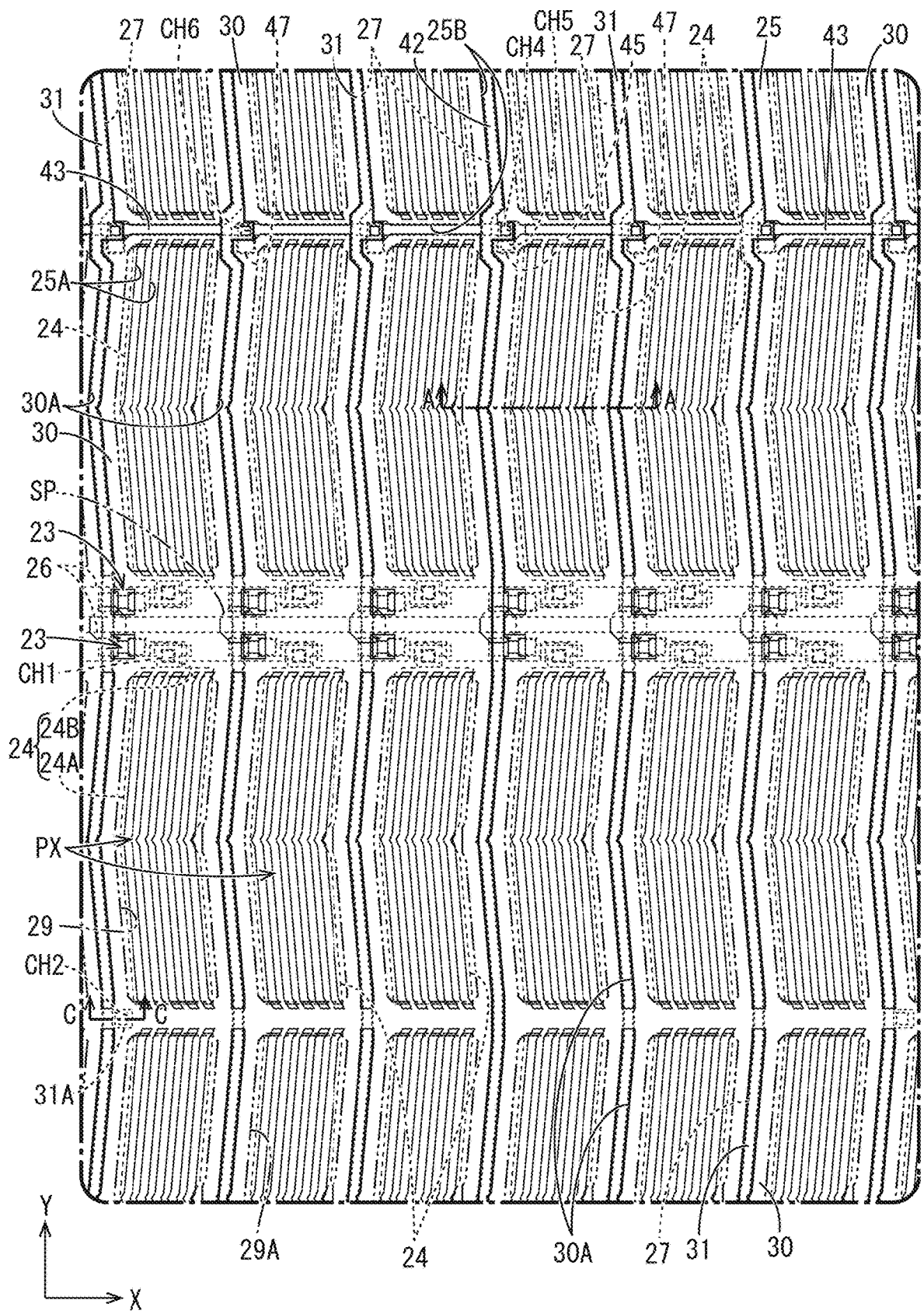
FIG. 2 is a plan view of an array substrate of the liquid crystal panel in a display area.

FIG. 2 is a plan view of the array substrate 21 of the liquid crystal panel 11 in the display area AA. As shown in FIG. 2, TFTs (switching elements, thin-film transistors) 23 and pixel electrodes 24 are provided over an inner surface of the array substrate 21 of the liquid crystal panel 11 in the display area AA. A large number of TFTs 23 and a large number of pixel electrodes 24 are provided in a matrix (rows and columns) by being placed at spacings along the X-axis direction and the Y-axis direction. Around these TFTs 23 and these pixel electrodes 24, gate lines (scanning lines) 26 and source lines (image lines, data lines) 27 that are orthogonal to (i.e. intersect) each other are disposed. While the gate lines 26 extend substantially along the X-axis direction, the source lines 27 extend substantially along the Y-axis direction. The gate lines 26 are disposed so that two pixel electrodes 24 are interposed therebetween in the Y-axis direction, and two of the gate lines 26 are disposed between pixel electrodes 24 adjacent to each other in the Y-axis direction. That is, two pixel electrodes 24 and two gate lines 26 are disposed to be alternately and repeatedly arranged in the Y-axis direction, and the number of pixel electrodes 24 arranged in the Y-axis direction is equal to the number of gate lines 26 arranged in the Y-axis direction. The TFTs 23 are disposed to overlap the gate lines 26, and are arrayed in the same array as the gate lines 26. That is, the TFTs 23 are disposed so that two pixel electrodes 24 are interposed therebetween in the Y-axis direction, and two of the TFTs 23 are disposed between pixel electrodes 24 adjacent to each other in the Y-axis direction. Meanwhile, one pixel electrode 24 and one source line 27 are disposed to be alternately and repeatedly arranged in the X-axis direction, and the number of pixel electrodes 24 arranged in the X-axis direction is equal to the number of source lines 27 arranged in the X-axis direction. Each of the gate lines 26 and each of the source lines 27 are connected to a gate electrode 23A and a source electrode 23B, respectively, of a corresponding one of the TFTs 23, and each of the pixel electrodes 24 is connected to a drain electrode 23C of a corresponding one of the TFTs 23. Moreover, the TFTs 23 are driven on the basis of various signals that are transmitted to the gate lines 26 and the source lines 27, respectively, and, as they are driven, control the supply of electric potentials to the pixel electrodes 24. Each of the pixel electrodes 24 has a vertically long rectangular shape as its planar shape (or, in particular, has a long side bending along the source lines 27), has its short side direction corresponding to a direction of extension of the gate lines 26, and has its long side direction corresponding to a direction of extension of the source lines 27. Areas between pixel electrodes 24 adjacent to each other in the Y-axis direction include gate line placement areas (scanning line placement areas) in each of which two gate lines 26 are placed and gate line non-placement areas (scanning line non-placement areas) in each of which no gate lines 26 are placed, and the gate line placement areas and the gate line non-placement areas are alternately and repeatedly arranged in the Y-axis direction. In the present embodiment, the liquid crystal panel 11 has a resolution of "7680×4320" equivalent to 8K resolution, and as will be mentioned later, color filters 28 of three colors are configured such that those color filters 28 which assume different colors from each other are repeatedly arranged along the gate lines 26 (X-axis direction); therefore, the number of source lines 27 provided is "7680×3=23040", and the number of gate lines 26 provided is "4320". It should be noted that the CF substrate 20 has formed thereon a light shield (inter-pixel light shield, black matrix) 29 illustrated by chain double-dashed lines in FIG. 2. The light shield 29 has a substantially grid shape as its planar shape so as to divide adjacent pixel electrodes 24 from each other, and has pixel openings 29A each located over a large part of a corresponding one of the pixel electrodes 24 when seen in plan view. These pixel openings 29A allow light transmitted by the pixel electrodes 24 to exit out of the liquid crystal panel 11. The light shield 29 is disposed to overlap at least the gate lines 26 and the source lines 27 (including the touch wires 31) of the array substrate 21 when seen in plan view. The placement or other features of the TFTs 23 and the pixel electrodes 24 will be described later. Spacers SP for retaining the spacing between the two substrates 20 and 21 are provided in parts of the CF substrate 20 near sites of intersection of the gate lines 26 and the source lines 27.

Figure 3:
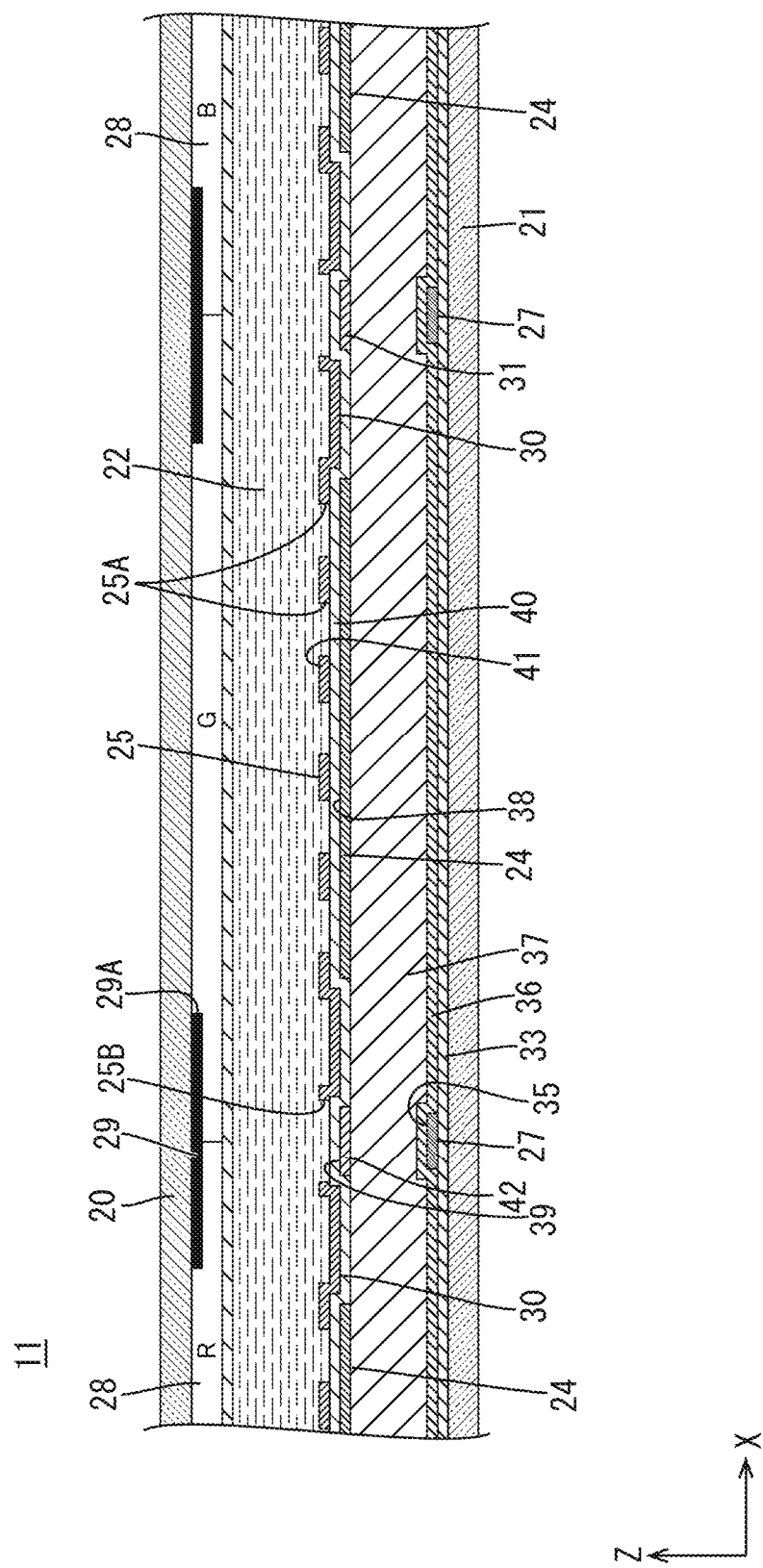
FIG. 3 is a cross-sectional view of the liquid crystal panel as taken along line A-A in FIG. 2.

FIG. 3 is a cross-sectional view of a part of the liquid crystal panel 11 near a central part of a pixel section PX (i.e. a cross-sectional view taken along line A-A in FIG. 2). As shown in FIG. 3, the liquid crystal panel 11 has a liquid crystal layer (medium layer) 22, disposed between the two substrates 20 and 21, that contains liquid crystal molecules of a substance whose optical properties vary in the presence of the application of an electric field. Color filters 28 of three colors that assume blue (B), green (G), and red (R) are provided on an inner surface of the CF substrate 20 of the liquid crystal panel 11 in the display area AA. A large number of color filters 28 that assume different colors from each other are repeatedly arranged along the gate lines 26 (X-axis direction), and those color filters 28 are arrayed in stripes as a whole by extending along the source lines 27 (substantially the Y-axis direction). These color filters 28 are disposed to separately overlap each of the pixel electrodes 24 of the array substrate 21 when seen in plan view. Color filters 28 adjacent to each other in the X-axis direction that assume different colors from each other are placed so that their boundary (color boundary) overlaps a source line 27 and the light shield 29. In this liquid crystal panel 11, R, G, and B color filters 28 arranged along the X-axis direction and three pixel electrodes 24 separately facing each of the color filters 28 constitute pixel units PX of three colors, respectively. Moreover, in this liquid crystal panel 11, a display pixel capable of a color display of a predetermined tone is constituted by pixel units PX of three colors, namely R, G, and B, adjacent to one another along the X-axis direction. An array pitch between pixel units PX in the X-axis direction is for example approximately 60 μm (specifically, 58 μm), and an array pitch between pixel units PX in the Y-axis direction is for example 180 μm (specifically, 174 μm). The light shield 29 is disposed to divide adjacent color filters 28 from each other. At a higher layer than the color filters 28 (facing the liquid crystal layer 22), a planarizing film is provided so as to be solidly disposed substantially all over the CF substrate 20. It should be noted that an alignment films for aligning the liquid crystal molecules contained in the liquid crystal layer 22 is formed on the innermost surface of each of the two substrates 20 and 21 touching the liquid crystal layer 22.

Next, a common electrode 25 is described with reference to FIGS. 2 and 3. Over an inner surface of the array substrate 21 in the display area AA, as shown in FIGS. 2 and 3, the common electrode 25 is formed at a higher layer than the pixel electrodes 24 in such a manner as to overlap all pixel electrodes 24. The common electrode 25 is supplied with a common potential signal of a consistently almost constant reference potential except during a period (sensing period) in which the common electrode 25 is supplied with a touch signal (signal, position detection signal) to detect an input position inputted by a finger serving as a position input body, and extends substantially all over the display area AA. The common electrode 25 has a plurality of pixel overlap openings (pixel overlap slits, alignment control slits) 25A, bored through parts of the common electrode 25 overlapping each separate pixel electrode 24 (in particular, the after-mentioned pixel electrode body 24A), that extend along the long side direction of each separate pixel electrode 24. It should be noted that the specifics of the pixel overlap openings 25A including the number of pixel overlap openings 25A provided, the shapes, and the range of formation may differ appropriately from those illustrated. When the pixel electrodes 24 are charged and potential differences are accordingly generated between the pixel electrodes 24 and the common electrode 25, which overlap each other, fringe fields (oblique fields) each containing a component acting parallel to a board surface of the array substrate 21 and a component acting in a direction normal to the board surface of the array substrate 21 are generated between opening edges of the pixel overlap openings 25A and the pixel electrodes 24. Accordingly, these fringe fields can be utilized to control an alignment state of the liquid crystal molecules contained in the liquid crystal layer 22. That is, the liquid crystal panel 11 according to the present embodiment is in an operation mode called "FFS (fringe field switching) mode". Moreover, this common electrode 25 constitutes the aforementioned touch electrodes 30. In addition to the aforementioned pixel overlap openings 25A, the common electrode 25 has a dividing opening (dividing slit) 25B that divides adjacent touch electrodes 30 from each other. The dividing opening 25B is composed of a portion traversing the entire length of the common electrode 25 substantially in the X-axis direction and a portion traversing the entire length of the common electrode 25 substantially in the Y-axis direction, and has a substantially grid shape as a whole when seen in plan view (see FIG. 1). The common electrode 25 is composed of a plurality of touch electrodes 30, divided by the dividing opening 25B into a lattice pattern when seen in plan view, that are electrically independent of one another. The touch wires 31, which are connected to such touch electrodes 30, are supplied with a common potential signal involved in the image display function and a touch signal (position detection signal) involved in the touch panel function in a time-division manner from the driver 12. A timing during which the common potential signal is supplied from the driver 12 to the touch wires 31 is a display period, and a timing during which the touch signal is supplied from the driver 12 to the touch wires 31 is a sensing period (position detection period). This common potential signal is transmitted to all touch wires 31 at the same timing (display period), so that all touch electrodes 30 are brought to a reference potential based on the common potential signal and function as the common electrode 25.

Figure 4:
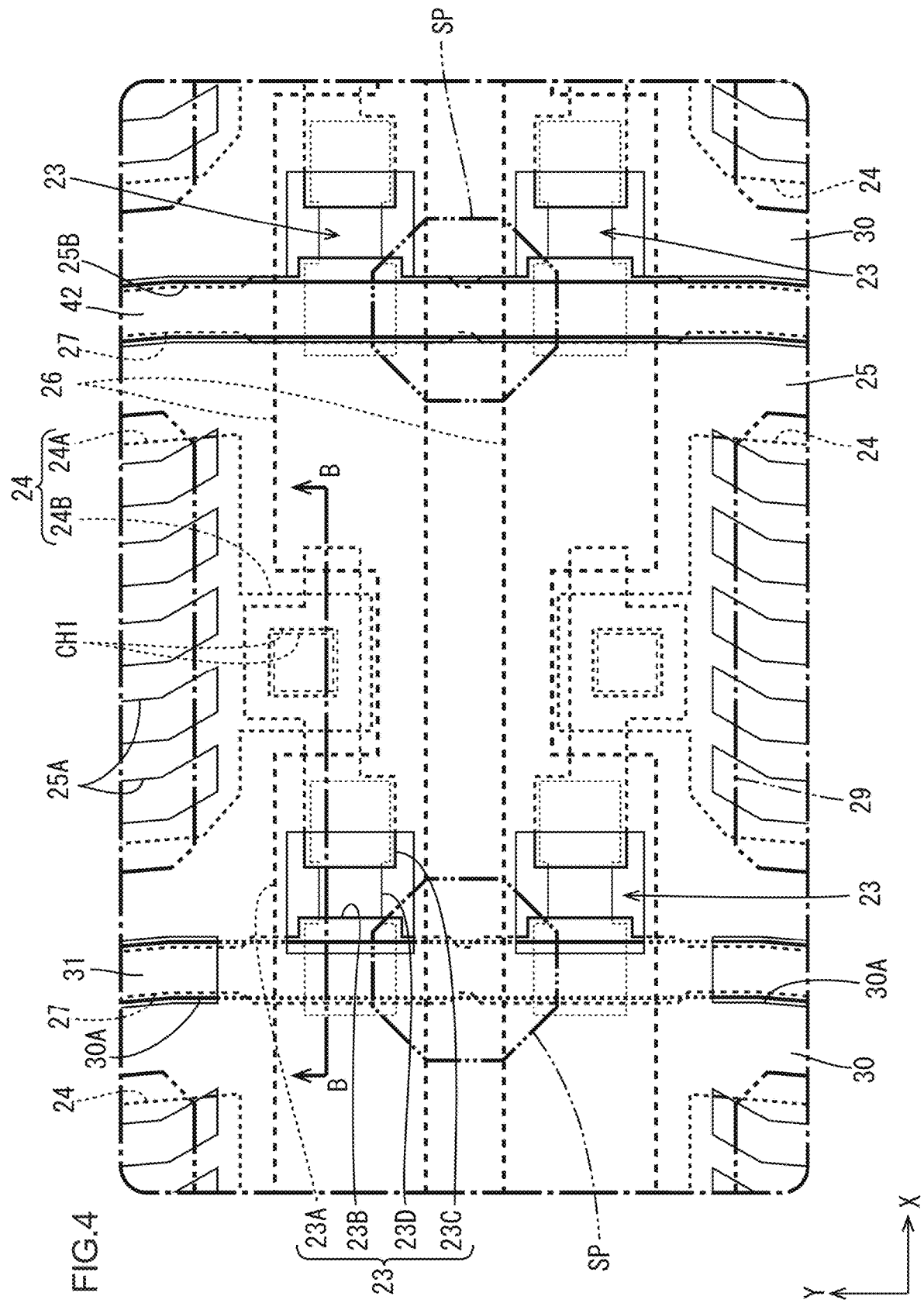
FIG. 4 is an enlarged plan view of a part of the array substrate near a TFT.

A configuration of each of the TFTs 23 and a configuration of each of the pixel electrodes 24 are described in detail with reference to FIG. 4. FIG. 4 is an enlarged plan view of a part of the array substrate 21 near a predetermined TFT 23. As shown in FIG. 4, the TFT 23 has a horizontally long shape extending along the X-axis direction as a whole, and is placed adjacent on the upper or lower side of FIG. 4 in the Y-axis direction to the pixel electrode 24 to which it is connected. The TFT 23 has a gate electrode 23A composed of a part of a gate line 26 (near a site of intersection with a source line 27). The gate electrode 23A has a horizontally long shape extending along the X-axis direction, and drives the TFT 23 in accordance with a scanning signal that is supplied to the gate line 26, whereby an electric current between a source electrode 23B and a drain electrode 23C is controlled. The TFT 23 has a source electrode 23B composed of a part of the source line 27 (near a site of intersection with the gate line 26). The source electrode 23B is disposed at one end of the TFT 23 in the X-axis direction to almost entirely overlap the gate electrode 23A, and is connected to a channel portion 23D. The TFT 23 has a drain electrode 23C disposed in a place at a spacing from the source electrode 23B, i.e. at the other end of the TFT 23 in the X-axis direction. The drain electrode 23C extends substantially along the X-axis direction, has one end opposed to the source electrode 23B, overlapped with the gate electrode 23A, connected to the channel portion 23D, and has the other end connected to the pixel electrode 24.

As shown in FIG. 4, the pixel electrode 24 is composed of a substantially square pixel electrode body 24A overlapping a pixel opening 29A of the light shield 29 and a contact portion 24B protruding from the pixel electrode body 24A toward the TFT 23 along the Y-axis direction. Of them, the contact portion 24B is disposed to overlap the other end of the drain electrode 23C, and their points of overlap are connected to each other through a pixel contact hole CH1. It should be noted that the gate line 26 has a notch in an area thereof overlapping both the contact portion 24B and the drain electrode 23C. This notch is provided to reduce a capacitance between the gate line 26 and the pixel electrode 24. Further, the other end of the drain electrode 23C overlaps the gate line 26. This is provided so that the capacitance between the gate line 26 and the drain electrode 23C (i.e. the pixel electrode 24) does not fluctuate even in a case where the drain electrode 23C becomes misaligned with the gate line 26 when the array substrate 21 is manufactured. The TFT 23 has a channel portion 23D overlapped with the gate electrode 23A via the after-mentioned gate insulating film 33 and connected to the source electrode 23B and the drain electrode 23C. The channel portion 23D overlaps the gate electrode 23A, extends along the X-axis direction, has one end connected to the source electrode 23B, and has the other end connected to the drain electrode 23C. Moreover, when the TFT 23 is brought into an on state in accordance with a scanning signal that is supplied to the gate electrode 23A, an image signal (data signal) that is supplied to the source line 27 is supplied from the source electrode 23B to the drain electrode 23C via the channel portion 23D, which is composed of a semiconductor film 34. As a result, the pixel electrode 24 is charged to an electric potential based on the image signal. It should be noted that the common electrode 25 has a notch in an area thereof overlapping the channel portion 23D. This notch is provided to inhibit the amount of leak current between the source electrode 23B and the drain electrode 23C from fluctuating along with a fluctuation in electric potential of the common electrode 25 (touch electrode 30) when the TFT 23 is in an off state.

Figure 5:
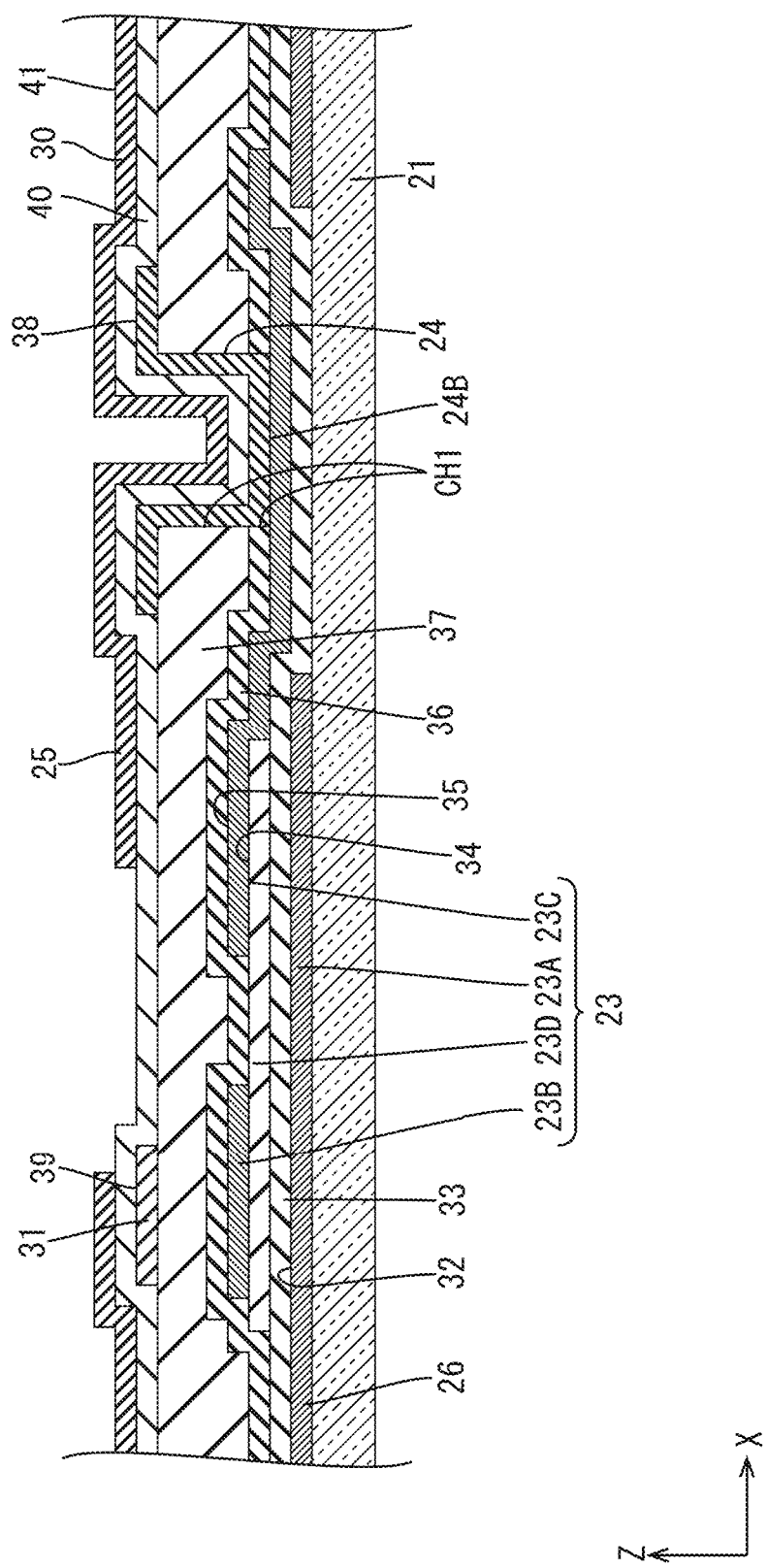
FIG. 5 is a cross-sectional view of the array substrate as taken along line B-B in FIG. 4.

The various types of films stacked over the inner surface of the array substrate 21 are described here with reference to FIG. 5. FIG. 5 is a cross-sectional view of a part of the liquid crystal panel 11 near the TFT 23 (i.e. a cross-sectional view taken along line B-B in FIG. 2). Over the array substrate 21, as shown in FIG. 5, a first metal film 32, a gate insulating film 33, a semiconductor film 34, a second metal film 35, a first interlayer insulating film 36, a planarizing film 37, a first transparent electrode film 38, a third metal film 39, a second interlayer insulating film 40, and a second transparent electrode film 41 are stacked in this order from the bottom (i.e. from the glass substrate). The first metal film 32, the second metal film 35, and the third metal film 39 are each a single-layer film made of one type of metal material selected from among copper, titanium, aluminum, molybdenum, tungsten, and other metal materials or a laminated film or an alloy made of different types of metal material, thereby having electric conductivity and a light blocking effect. The first metal film 32 constitutes the gate line 26, the gate electrode 23A of the TFT 23, the second spare touch wire 43, the common potential signal supply wire 44, or other components. The second metal film 35 constitutes the source line 27, the source electrode 23B and the drain electrode 23C of the TFT 23, or other components. The third metal film 39 constitutes the touch wire 31, the first spare touch wire 42, or other components. The semiconductor film 34 is a thin film made of a semiconductor material such as an oxide semiconductor or amorphous silicon, and constitutes the channel portion (semiconductor portion) 23D, which is connected to the source electrode 23B and the drain electrode 23C of the TFT 23 or other components. The first transparent electrode film 38 and the second transparent electrode film 41 are each made of a transparent electrode material (such as ITO (indium tin oxide) or IZO (indium zinc oxide)). The first transparent electrode film 38 constitutes the pixel electrode 24 or other components. The first transparent electrode film 38 and the third metal film 39 are both placed at a higher layer than the planarizing film 37 and located at the same layer as each other. Accordingly, the pixel electrode 24 composed of the first transparent electrode film 38 can be said to be disposed at the same layer as the touch wire 31, the first spare touch wire 42, or other components composed of the third metal film 39. The second transparent electrode film 41 constitutes the common electrode 25 (touch electrode 30).

The gate insulating film 33, the first interlayer insulating film 36, and the second interlayer insulating film 40 are each made of an inorganic material such as silicon nitride ($SiN_x$) or silicon oxide ($SiO_2$). The planarizing film 37 is made of an organic material such as PMMA (acrylic resin) and, as shown in FIG. 5, is greater in film thickness than the other insulating films 33, 36, and 40 each made of an inorganic material. This planarizing film 37 gives the array substrate 21 a planarized surface. The gate insulating film 33 keeps the first metal film 32, which is at a lower layer than the gate insulating film 33, in the state of being insulated from the semiconductor film 34 and the second metal film 35, which are at a higher layer than the gate insulating film 33. The first interlayer insulating film 36 and the planarizing film 37 keep the semiconductor film 34 and the second metal film 35, which are at a lower layer than the first interlayer insulating film 36 and the planarizing film 37, in the state of being insulated from the first transparent electrode film 38 and the third metal film 39, which are at a higher layer than the first interlayer insulating film 36 and the planarizing film 37. The first interlayer insulating film 36 and the planarizing film 37 have a pixel contact hole CH1, bored therethrough so as to be in a place overlapping both the drain electrode 23C composed of the second metal film 35 and the contact portion 24B of the pixel electrode 24 composed of the first transparent electrode film 38, through which the drain electrode 23C and the contact portion 24B are connected to each other. The second interlayer insulating film 40 keeps the first transparent electrode film 38 and the third metal film 39, which are at a lower layer than the second interlayer insulating film 40, in the state of being insulated from the second transparent electrode film 41, which is at a higher layer than the second interlayer insulating film 40. In the present embodiment, the touch wires 31 and the first spare touch wires 42 are single-layer structures composed of the third metal film 39. Alternatively, for example, the touch wires 31 and the first spare touch wires 42 may be laminated structures composed of the first transparent electrode film 38 and the third metal film 39.

Figure 6:
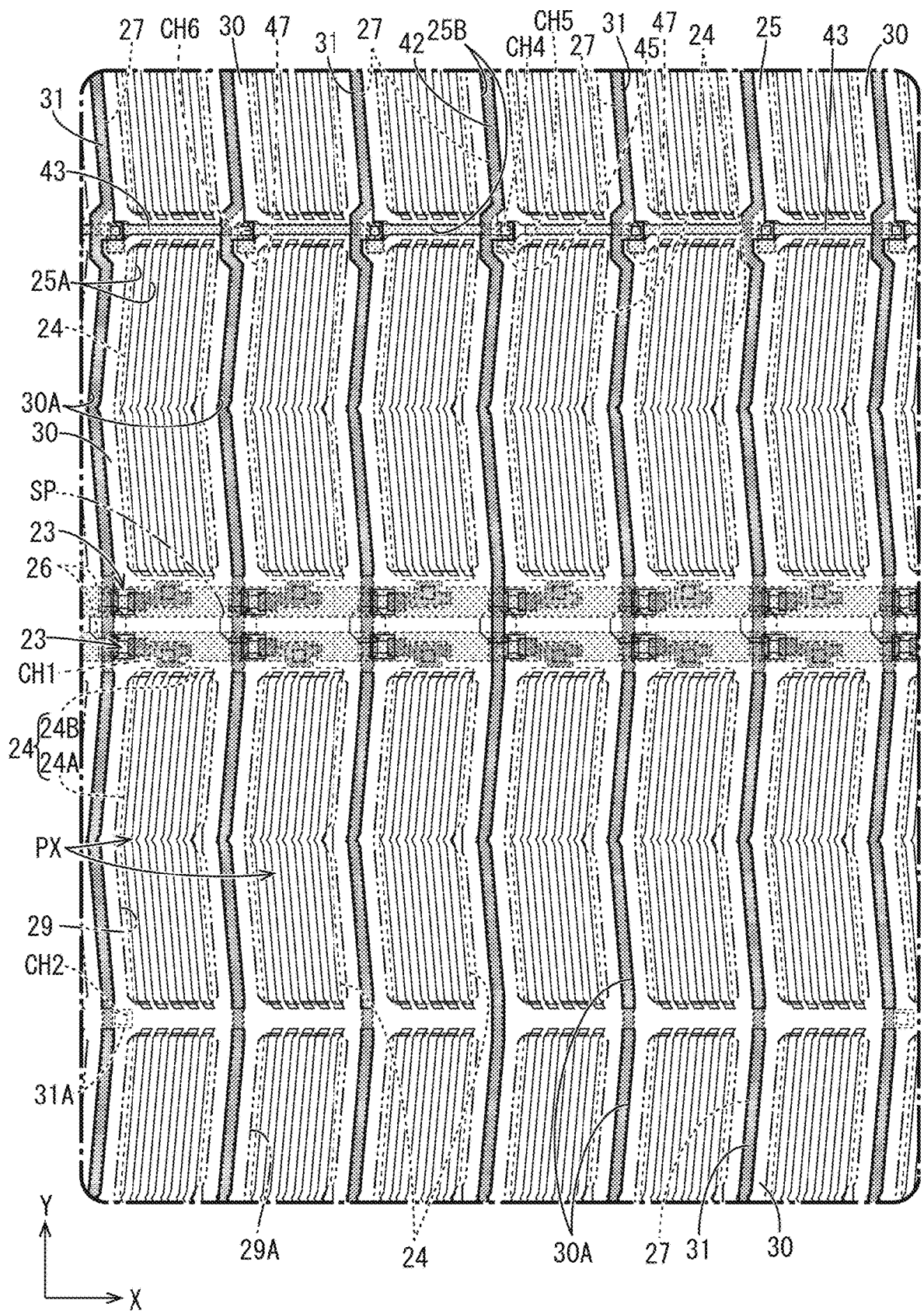
FIG. 6 is a plan view showing patterns of a first metal film and a second metal film of the array substrate in the same area as FIG. 2.
Figure 7:
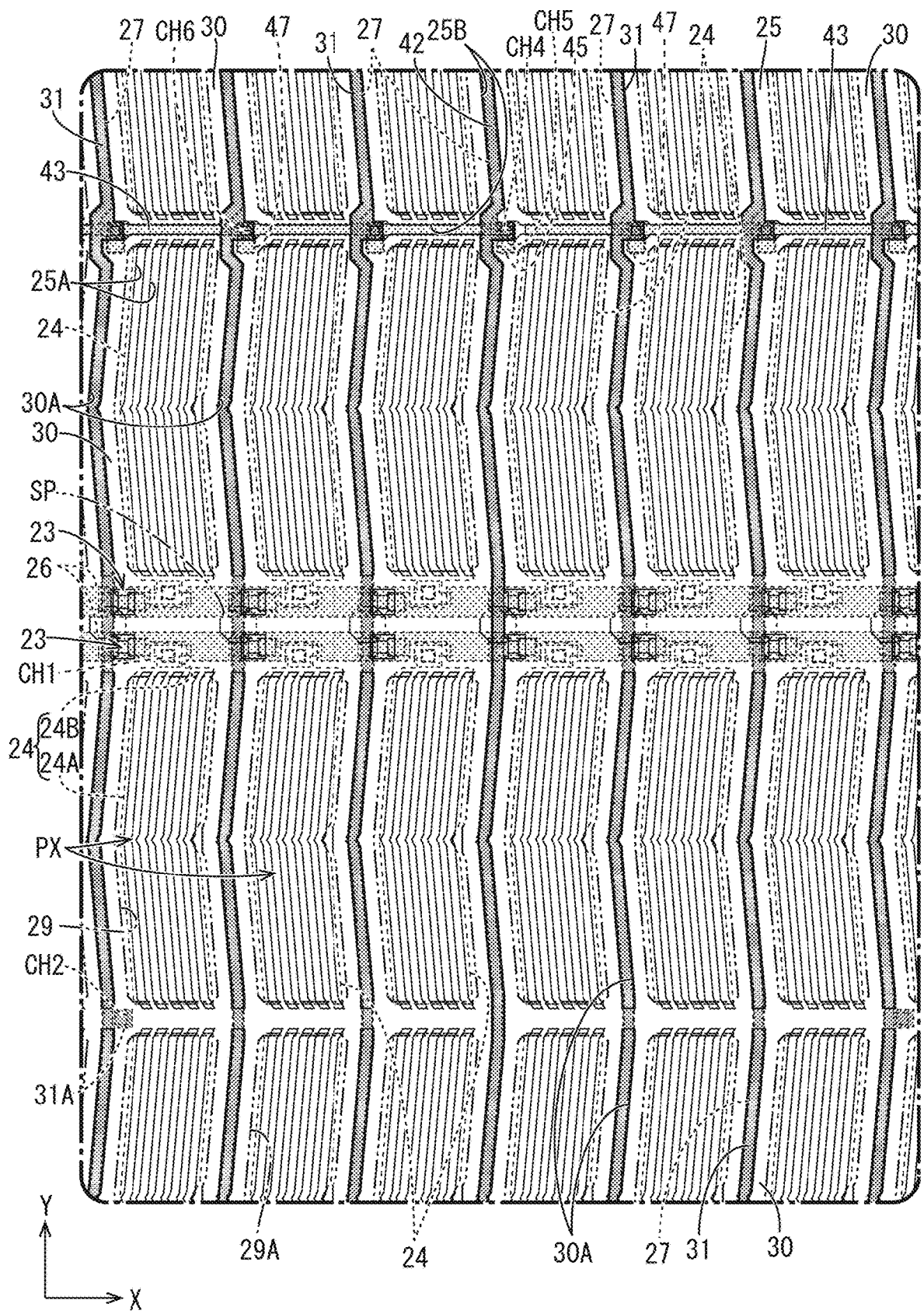
FIG. 7 is a plan view showing the pattern of the first metal film and a pattern of a third metal film of the array substrate in the same area as FIG. 2.
Figure 8:
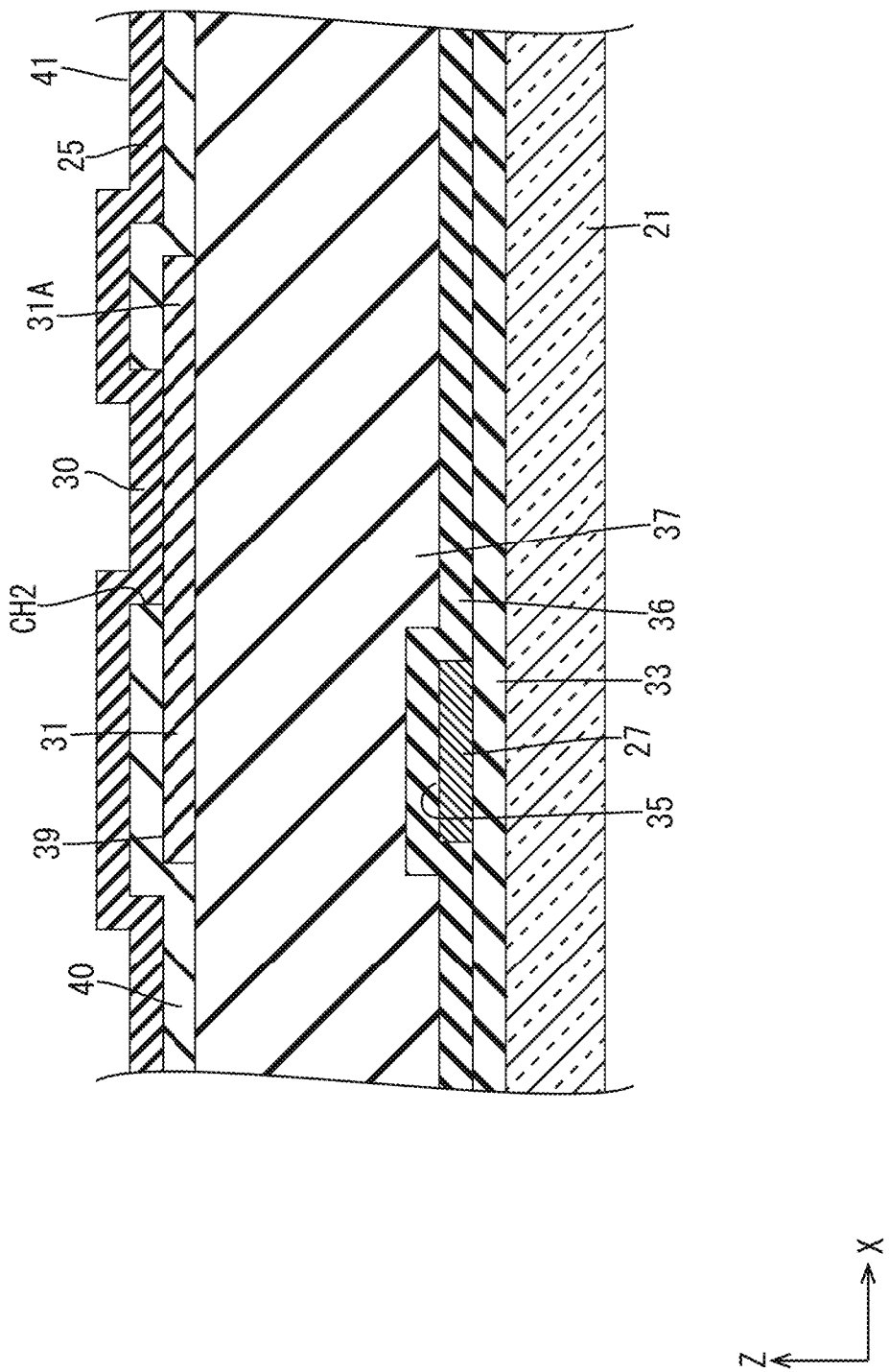
FIG. 8 is a cross-sectional view of the array substrate as taken along line C-C in FIG. 2.

Next, a configuration of the touch wires 31 in the display area AA is described primarily with reference to FIGS. 3, 6, 7, and 8. FIG. 6 is a plan view showing patterns of the electrodes 23A to 23C of TFTs 23, gate lines 26, source lines 27, second spare touch wires 43, or other components (i.e. the first metal film 32 and the second metal film 35) of the array substrate 21. FIG. 6 illustrates the first metal film 32 and the second metal film 35 by half-tone dot meshing. FIG. 7 is a plan view showing patterns of the gate electrodes 23A of TFTs 23, gate lines 26, touch wires 31, first spare touch wires 42, second spare touch wires 43, or other components (i.e. the first metal film 32 and the third metal film 39) of the array substrate 21. FIG. 7 illustrates the first metal film 32 and the third metal film 39 by half-tone dot meshing. FIG. 8 is a cross-sectional view of a part of the array substrate 21 near a point of connection between a touch electrode 30 and a touch wire 31 (i.e. a cross-sectional view taken along line C-C in FIG. 2). As shown in FIGS. 3, 6, and 7, the touch wires 31 are composed of the third metal film 39, and are disposed to overlap substantially the whole area (most) of the source lines 27, which are composed of the second metal film 35, via the first interlayer insulating film 36 and the planarizing film 37 when seen in plan view. In this way, a space for placement of the touch wires 31 and the source lines 27 is made smaller than in the case of touch wires disposed not to overlap the source lines 27. This is suitable to bringing about improvement in aperture ratio. In the display area AA, the touch wires 31 extend substantially along the Y-axis direction in such a manner as to run parallel to the source lines 27, and are each placed apart in the X-axis direction from but adjacent in the X-axis direction to a large number of pixel electrodes 24 arranged along the Y-axis direction. That is, the touch wires 31 and the source lines 27 overlapping the touch wires 31 are both disposed not to overlap the pixel electrodes 24. The touch wires 31 are disposed to overlap most of the source lines 27 excluding some of the source lines 27 (i.e. source lines 27 overlapping the dividing opening 25B). The number of touch wires 31 provided is smaller than the number of source lines 27 provided and equal to or larger than the number of touch electrodes 30 provided. As shown in FIGS. 7 and 8, each of the touch wires 31 has a pad portion 31A that is connected to the touch electrode 30 to which it is connected in the display area AA. The pad portion 31A is provided in such a manner as to partially protrude from a side edge of the touch wire 31 along the X-axis direction. The pad portion 31A is disposed in a gate line non-placement area, included in the areas between pixel electrodes 24 adjacent to each other in the Y-axis direction, in which no gate lines 26 are placed, thereby avoiding a short circuit with the pixel electrode 24, which is located at the same layer. The points of overlap between the pad portion 31A and the touch electrode 30 to which it is connected are connected through a touch wire contact hole CH2 bored through the second interlayer insulating film 40.

Figure 9:
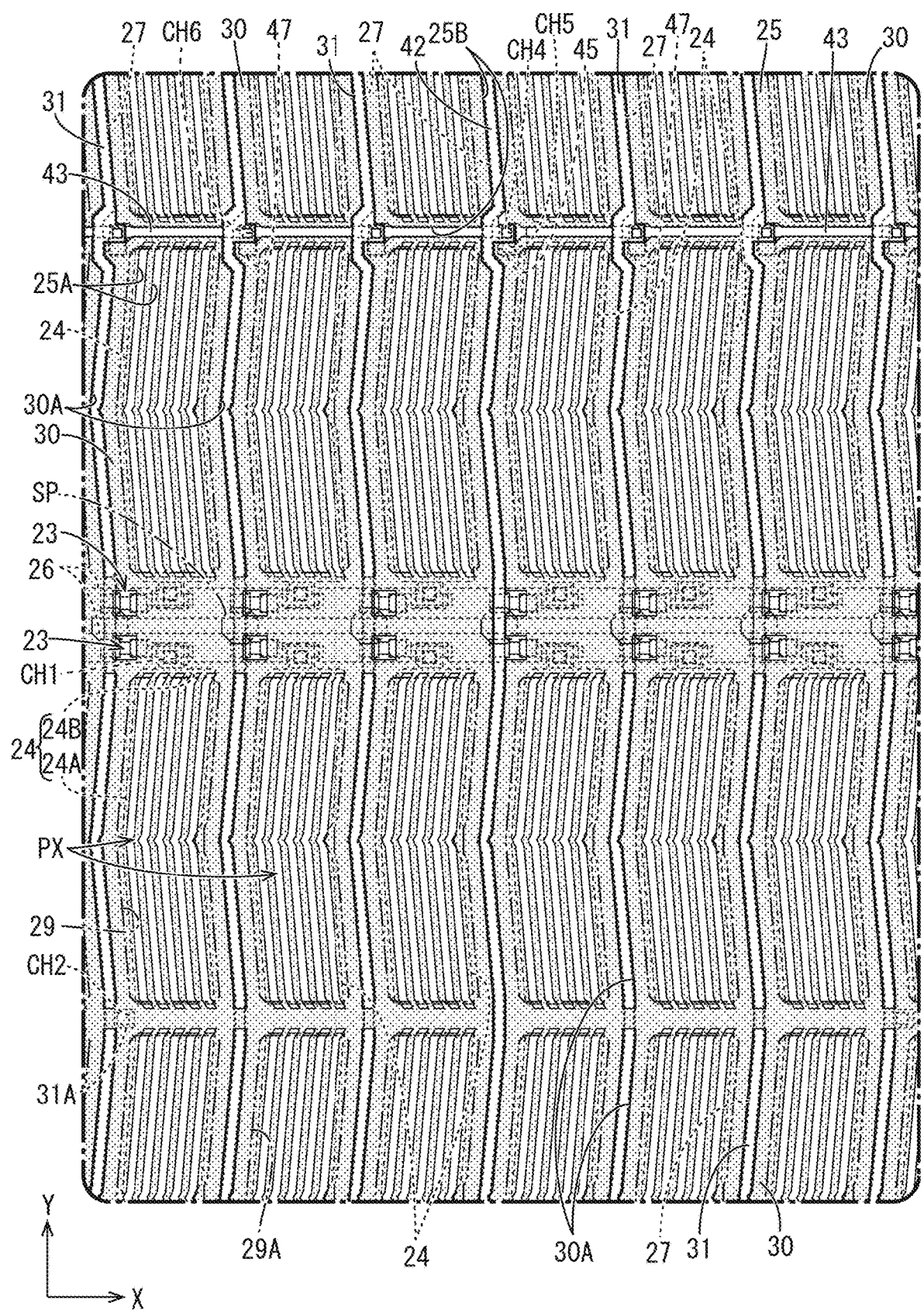
FIG. 9 is a plan view showing a pattern of a second transparent electrode film of the array substrate in the same area as FIG. 2.

A detailed configuration of the touch electrodes 30 is described with reference to FIG. 9. FIG. 9 is a plan view showing patterns of the common electrode 25 and touch electrodes 30 (i.e. the second transparent electrode film 41) of the array substrate 21. FIG. 9 illustrates the second transparent electrode film 41 by half-tone dot meshing. As shown in FIG. 9, the touch electrodes 30 are provided with touch wire overlap openings (position detecting wire overlap openings) 30A disposed to partially overlap the touch wires 31. The touch wire overlap openings 30A extend in such a manner as to run parallel to the Y-axis direction, which is the direction of extension of the touch wires 31, and have vertically long shapes (i.e. longitudinal shapes whose long sides extend in the direction of extension of the touch wires 31) when seen in plan view. Further, the touch wire overlap openings 30A are larger in width dimension (dimension in the X-axis direction) than the touch wires 31. Since the touch wire overlap openings 30A are disposed in such a manner as to overlap a part of each separate touch wire 31, a parasitic capacitance that may be formed between a touch wire 31 and a touch electrode 30 unconnected to the touch wire 31 is reduced. This results in high position detection sensitivity.

Figure 10:
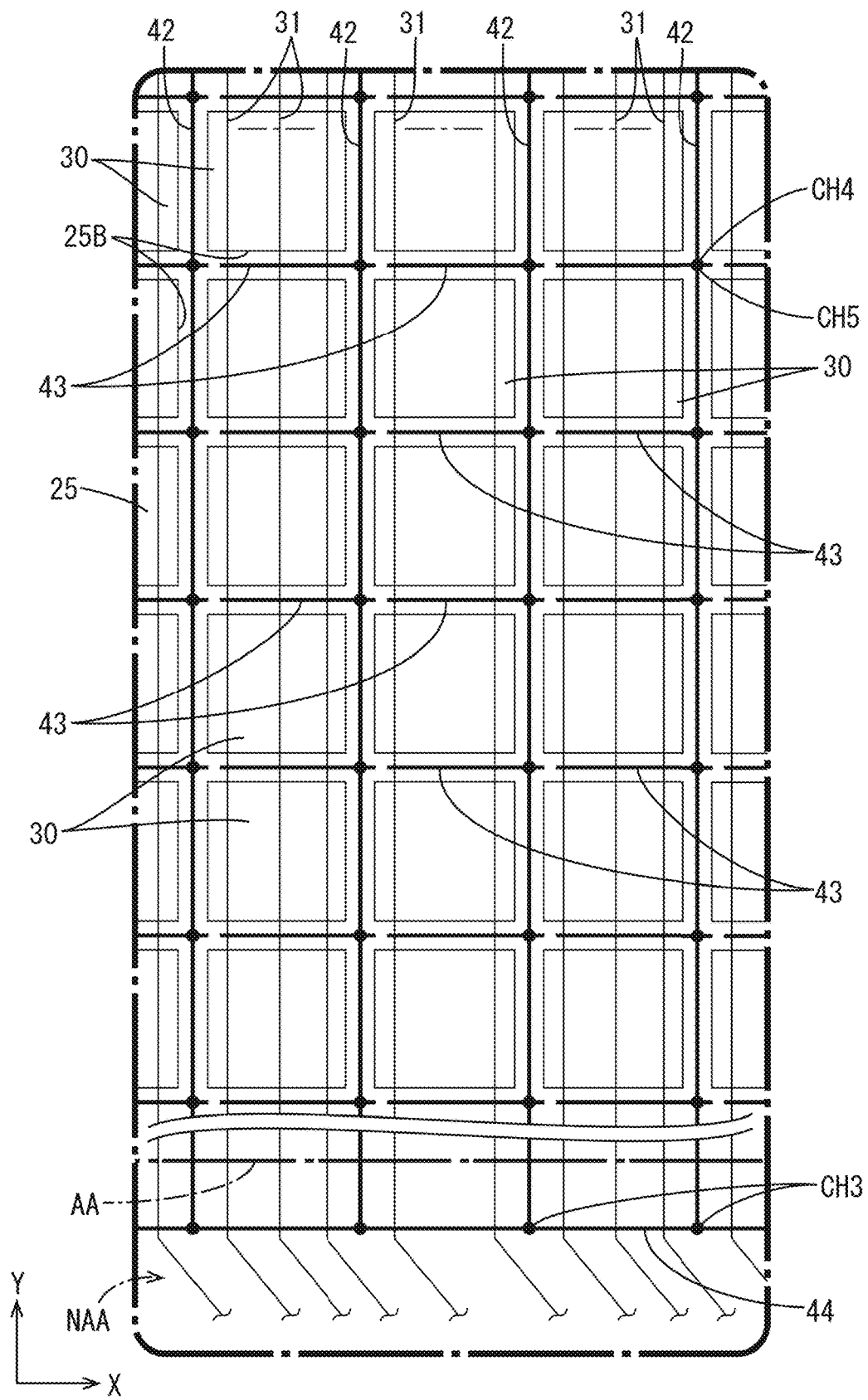
FIG. 10 is a plan view schematically showing touch electrodes, touch wires, first spare touch wires, second spare touch wires, and a common potential signal supply wire of the liquid crystal panel.

Next, the first spare touch wires 42 and the second spare touch wires 43 are described in detail with reference to FIGS. 3, 7, 9, and 10. FIG. 10 is a plan view schematically showing touch electrodes 30, touch wires 31, first spare touch wires 42, second spare touch wires 43, and the common potential signal supply wire 44 of the liquid crystal panel 11. As shown in FIGS. 3 and 7, the first spare touch wires 42 are composed of the third metal film 39, and are disposed to overlap substantially the whole area (most) of the source lines 27, which are composed of the second metal film 35, via the first interlayer insulating film 36 and the planarizing film 37 when seen in plan view. In this way, a space for placement of the first spare touch wires 42 and the source lines 27 is made smaller than in the case of first spare touch wires disposed not to overlap the source lines 27. This is suitable to bringing about improvement in aperture ratio. In the display area AA, the first spare touch wires 42 extend substantially along the Y-axis direction in such a manner as to run parallel to the source lines 27, and are each placed apart in the X-axis direction from but adjacent in the X-axis direction to a large number of pixel electrodes 24 arranged along the Y-axis direction. That is, the first spare touch wires 42 and the source lines 27 overlapping the first spare touch wires 42 are both disposed not to overlap the pixel electrodes 24. As shown in FIGS. 7 and 9, most of the first spare touch wires 42 (i.e. all of the first spare touch wires 42 excluding two located at both ends of the touch area in the X-axis direction) are selectively disposed to overlap source lines 27 overlapping parts (i.e. parts extending along the Y-axis direction) of the dividing opening 25B dividing touch electrodes 30 adjacent to each other in the X-axis direction from each other. That is, most of the first spare touch wires 42 are each interposed between touch electrodes 30 adjacent to each other in the X-axis direction and do not overlap the touch electrodes 30. As shown in FIG. 10, the first spare touch wires 42 traverse the entire length of the touch area (display area AA) in the Y-axis direction, and ends of the first spare touch wires 42 facing the driver 12 are drawn out into the non-touch area (non-display area NAA) and connected to the common potential signal supply wire 44, which is composed of the first metal film 32. The first spare touch wires 42 and the common potential signal supply wire 44 are disposed to partially overlap each other via the gate insulating film 33, the first interlayer insulating film 36, and the planarizing film 37, and are connected to each other through first spare touch wire contact holes CH3 bored through the gate insulating film 33, the first interlayer insulating film 36, and the planarizing film 37. It should be noted that although the common potential signal supply wire 44, which is composed of the first metal film 32, intersects the source lines 27, which are composed of the second metal film 35, and the touch wires 31, which are composed of the third metal film 39, short-circuits are avoided, as the gate insulating film 33 is sandwiched between the source lines 27 and the common potential signal supply wire 44 and the first interlayer insulating film 36 and the planarizing film 37 are sandwiched between the touch wires 31 and the common potential signal supply wire 44.

As shown in FIGS. 6 and 7, the second spare touch wires 43 are composed of the same first metal film 32 as the gate lines 26, and extend along the X-axis direction in such a manner as to run parallel to the gate lines 26. Accordingly, the second spare touch wires 43 are each disposed in a gate line non-placement area, included in the areas between pixel electrodes 24 adjacent to each other in the Y-axis direction, in which no gate lines 26 are placed, and are disposed not to overlap the pixel electrodes 24. The second spare touch wires 43 intersect both the source lines 27, which are composed of the second metal film 35 and which extend along the Y-axis direction, and the first spare touch wires 42, which are composed of the third metal film 39 and which extend along the Y-axis direction. As shown in FIG. 10, a plurality of the second spare touch wires 43 are arranged so that a touch electrode 30 is interposed therebetween in the Y-axis direction. Most of the second spare touch wires 43 (i.e. all of the second spare touch wires 43 excluding two located at both ends of the touch area in the Y-axis direction) are disposed to overlap parts (i.e. parts extending along the X-axis direction) of the dividing opening 25B dividing touch electrodes 30 adjacent to each other in the Y-axis direction from each other. That is, most of the second spare touch wires 43 are each interposed between touch electrodes 30 adjacent to each other in the Y-axis direction and do not overlap the touch electrodes 30. It should be noted that the gate lines 26 are disposed not to overlap parts of the dividing opening 25B dividing touch electrodes 30 adjacent to each other in the Y-axis direction from each other (see FIG. 7). The second spare touch wires 43 are each about equal in length to a side of a touch electrode 30, each intersect all touch wires 30 disposed to overlap touch electrodes 30 adjacent to each other in the Y-axis direction, and each intersect one first spare touch wire 42 adjacent on the right (one side) in FIG. 10 in the X-axis direction to the same touch electrodes 30. The second spare touch wires 43, which intersect the first spare touch wires 42 and the touch wires 31, are connected to the first spare touch wires 42.

Figure 11:
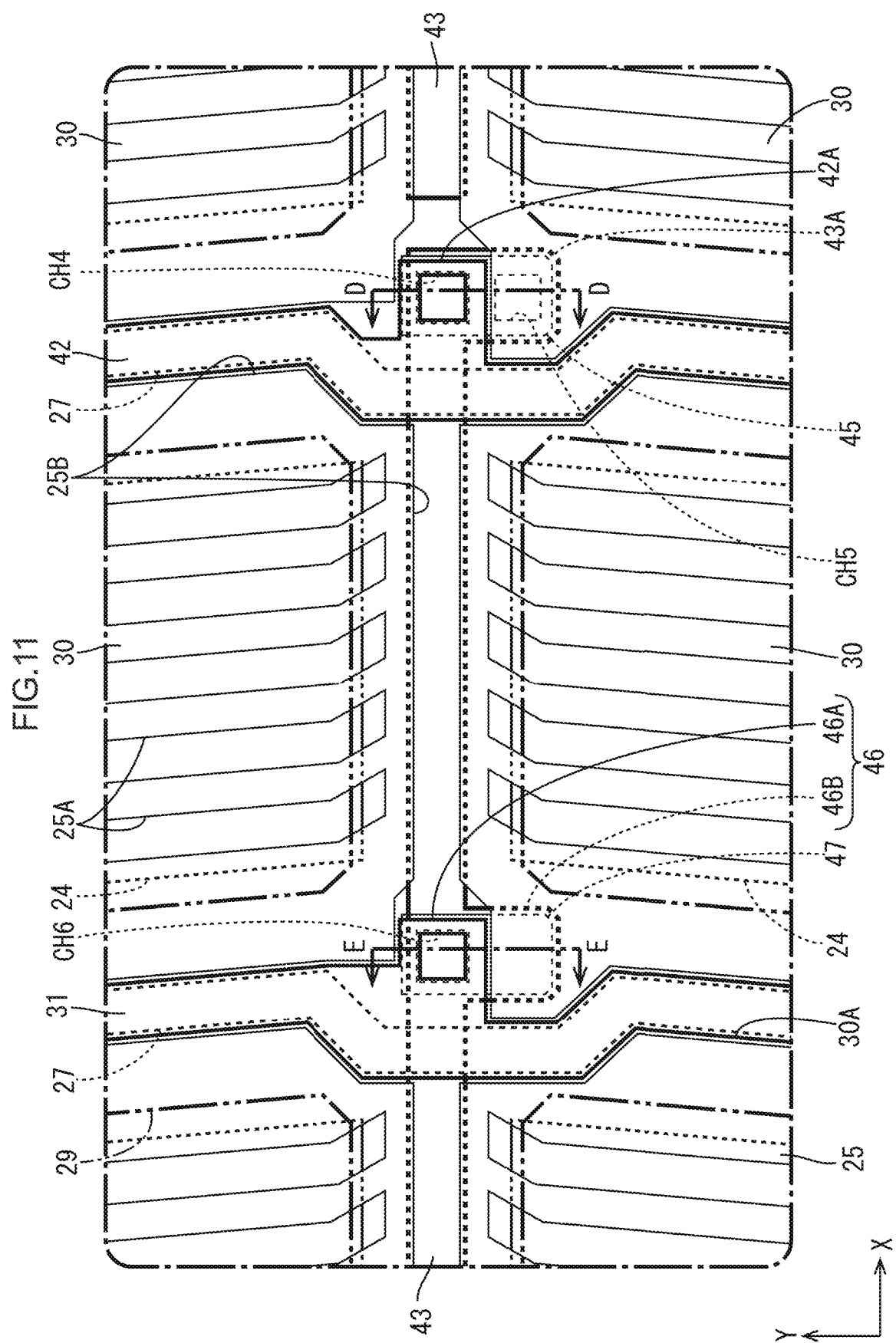
FIG. 11 is an enlarged plan view of a part of the array substrate near a touch wire, a first spare touch wire, and a second spare touch wire.
Figure 12:
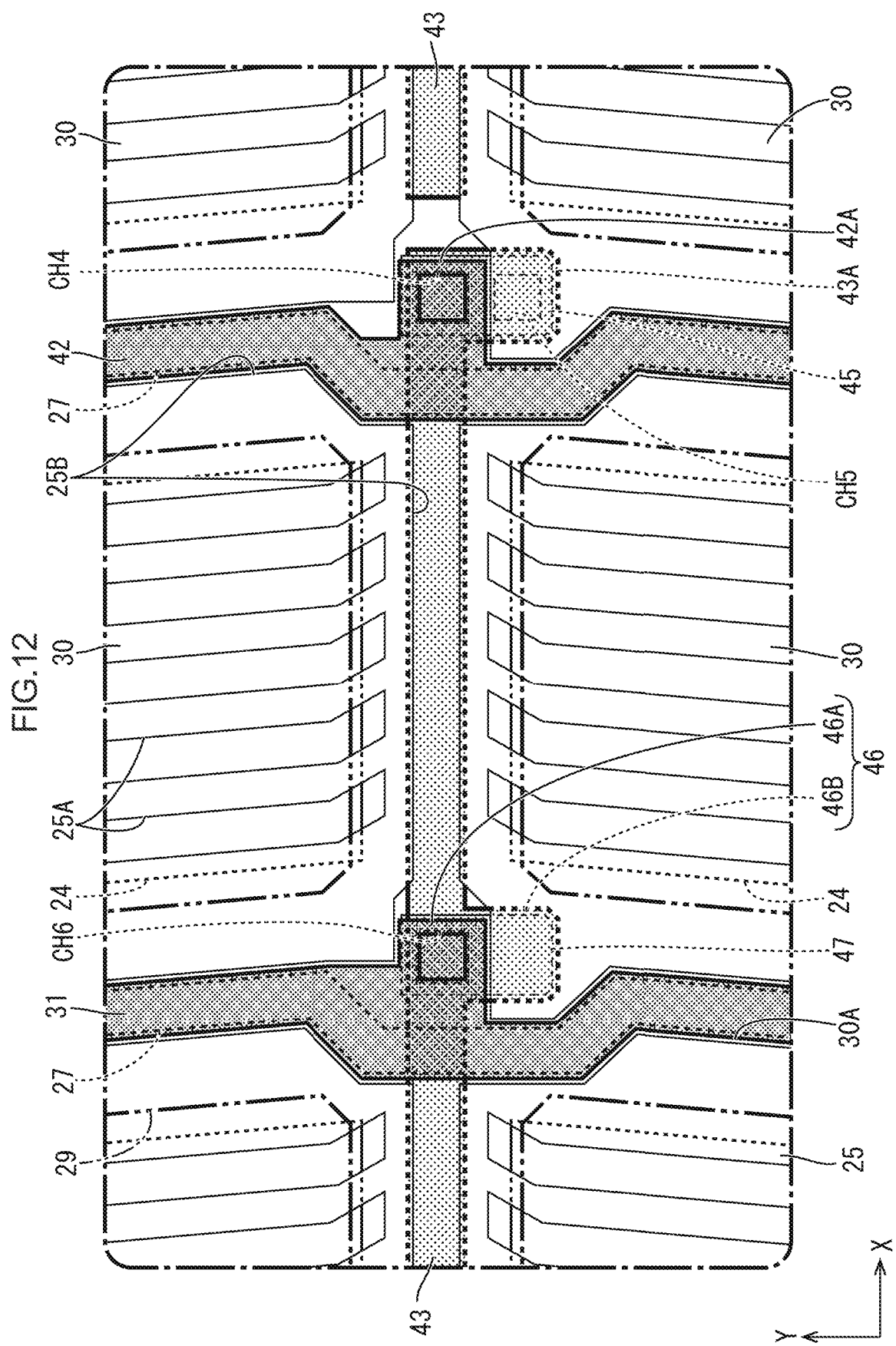
FIG. 12 is a plan view of patterns of the first metal film and the third metal film of the array substrate in the same area as FIG. 11.
Figure 13:
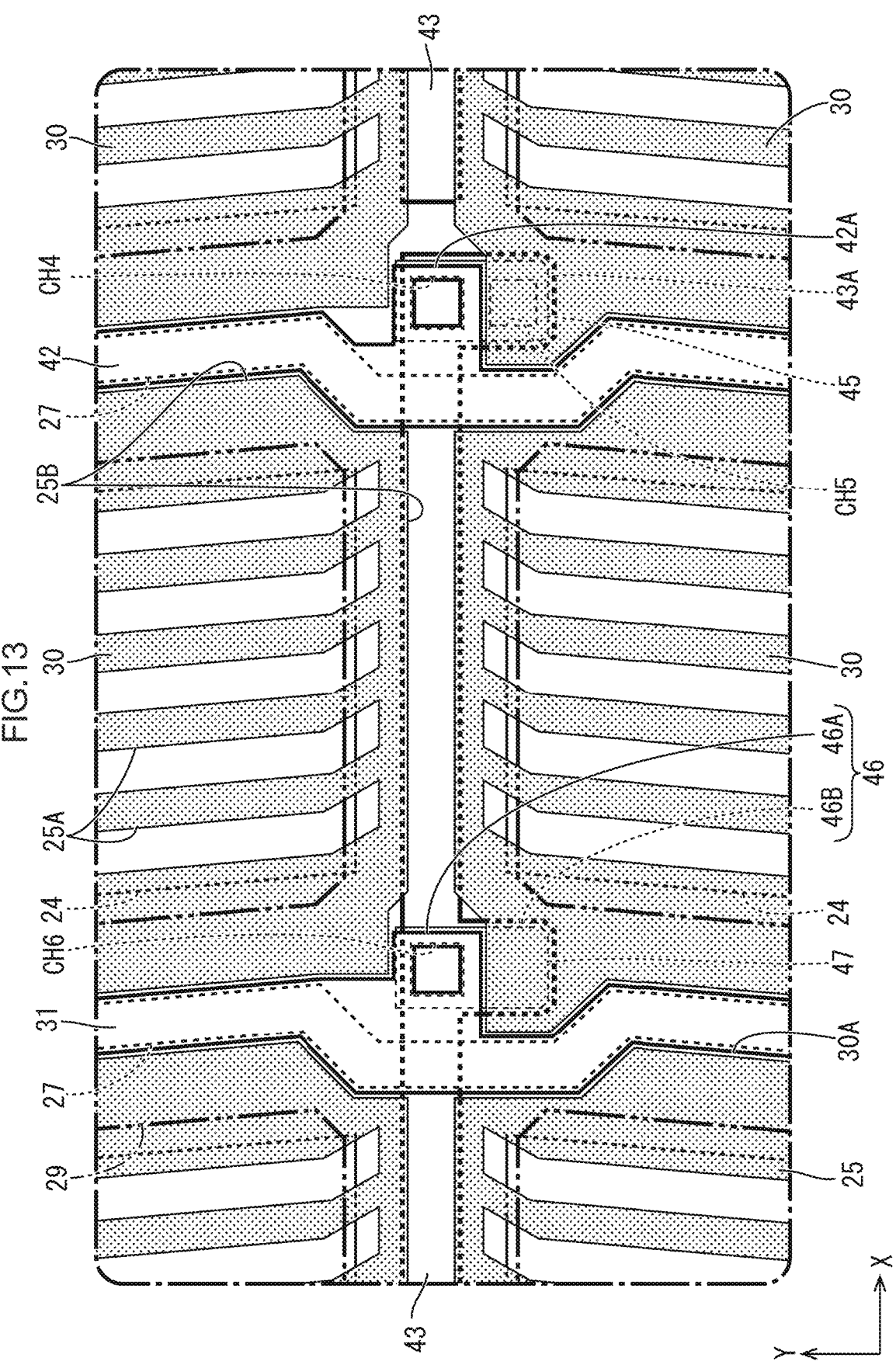
FIG. 13 is a plan view showing a pattern of the second transparent electrode film of the array substrate in the same area as FIG. 11.
Figure 14:
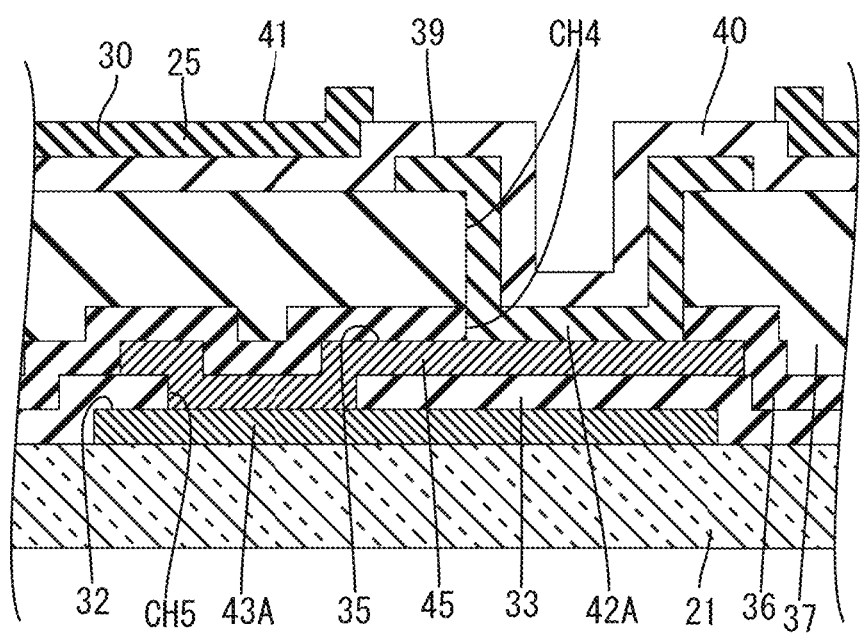
FIG. 14 is a cross-sectional view of the array substrate as taken along line D-D in FIG. 11.

A structure for connecting a first spare touch wire 42 and a second spare touch wire 43 is described with reference to FIGS. 11 to 14. FIG. 11 is an enlarged plan view of a part of the array substrate 21 near a touch wire 31, a first spare touch wire 42, and a second spare touch wire 43. FIG. 12 is a plan view of patterns of a touch wire 31, a first spare touch wire 42, a second spare touch wire 43, or other components (i.e. the first metal film 32 and the third metal film 39) of the array substrate 21. FIG. 12 illustrates the first metal film 32 and the third metal film 39 by half-tone dot meshing. FIG. 13 is a plan view showing a pattern of touch electrodes 30 (i.e. the second transparent electrode film 41) of the array substrate 21. FIG. 13 illustrates the second transparent electrode film 41 by half-tone dot meshing. FIG. 14 is a cross-sectional view of a point of connection between a first spare touch wire 42 and a second spare touch wire 43 in the array substrate 21 (i.e. a cross-sectional view taken along line D-D in FIG. 11). As shown in FIGS. 11 and 12, a first branch portion 42A protruding along the X-axis direction is provided at a site of intersection of a first spare touch wire 42 with a second spare touch wire 43. An end of the second spare touch wire 43 in the X-axis direction is disposed to overlap the first branch portion 42A, and the second spare touch wire 43 has a second branch portion 43A protruding from the same end along the Y-axis direction. The second branch portion 43A is placed adjacent to the first branch portion 42A in the Y-axis direction and disposed not to overlap the first branch portion 42A.

Moreover, as shown in FIGS. 11 and 12, an inter-spare touch wire electrode (inter-spare position detecting wire electrode) 45 is provided in such a manner as to overlap both the first branch portion 42A and the second branch portion 43A. A plurality of the inter-spare touch wire electrodes 45 are provided separately at all sites of intersection of a plurality of the first spare touch wires 42 and a plurality of the second spare touch wires 43. The inter-spare touch wire electrode 45 has a vertically long substantially square shape extending along the Y-axis direction, and is disposed to lie astride the first branch portion 42A and the second branch portion 43A. It should be noted that as shown in FIG. 13, the overlap among the first branch portion 42A, the second branch portion 43A, and the inter-spare touch wire electrode 45 is located in the dividing opening 25B and disposed not to overlap a touch electrode 30. As shown in FIG. 14, the inter-spare touch wire electrode 45 is composed of the second metal film 35, and whereas the first interlayer insulating film 36 and the planarizing film 37 are sandwiched between the inter-spare touch wire electrode 45 and the first branch portion 42A of the first spare touch wire 42, which is composed of the third metal film 39, the gate insulating film 33 is sandwiched between the inter-spare touch wire electrode 45 and the second branch portion 43A of the second spare touch wire 43, which is composed of the first metal film 32. The inter-spare touch wire electrode 45 and the first branch portion 42A are connected to each other through a first inter-spare touch wire electrode contact hole CH4 bored through the first interlayer insulating film 36 and the planarizing film 37, which are sandwiched between the inter-spare touch wire electrode 45 and the first branch portion 42A. The inter-spare touch wire electrode 45 and the second branch portion 43A are connected to each other through a second inter-spare touch wire electrode contact hole CH5 bored through the gate insulating film 33, which is sandwiched between the inter-spare touch wire electrode 45 and the second branch portion 43A. The first inter-spare touch wire electrode contact hole CH4 and the second inter-spare touch wire electrode contact hole CH5 are arranged adjacent to each other in the Y-axis direction and disposed not to overlap each other. Although three insulating films, namely the gate insulating film 33, the first interlayer insulating film 36, and the planarizing film 37, are sandwiched between the first spare touch wire 42 and the second spare touch wire 43, the first spare touch wire 42 and the second spare touch wire 43 are connected to each other with high reliability, as the first spare touch wire 42 and the second spare touch wire 43 are each connected to the inter-spare touch wire electrode 45, which is located midway in between the first spare touch wire 42 and the second spare touch wire 43. It should be noted that FIG. 10 uses one black circuit to illustrate the first inter-spare touch wire electrode contact hole CH4 and the second inter-spare touch wire electrode contact hole CH5.

Figure 15:
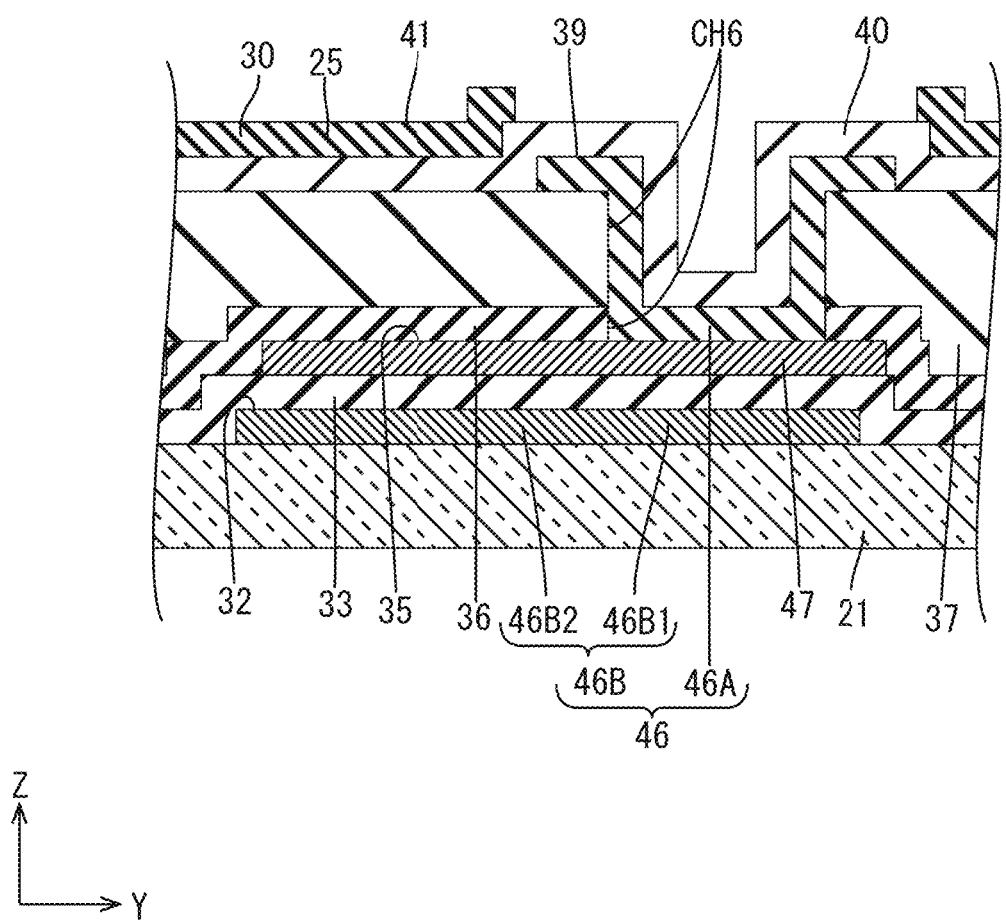
FIG. 15 is a cross-sectional view of the array substrate as taken along line E-E in FIG. 11.

Next, sites of intersection of a touch wire 31 and a second spare touch wire 43 are described with reference to FIGS. 12, 13, and 15. FIG. 15 is a cross-sectional view of sites of intersection of a touch wire 31 and a second spare touch wire 43 in the array substrate 21 (i.e. a cross-sectional view taken along line E-E in FIG. 11). As shown in FIG. 12, connectable portions 46 are provided separately at each of the sites of intersection of the touch wire 31 and the second spare touch wire 43. The connectable portions 46, which are provided separately at each of the sites of intersection of the touch wires 31 and the second spare touch wires 43, are in the state of being electrically insulated from each other under normal conditions, but are configured to be electrically connected to each other by performing a predetermined process in repairing a break in the touch wire 31. These connectable portions 46 are provided separately at all sites of intersection of a plurality of the touch wires 31 and a plurality of the second spare touch wires 43. The connectable portions 46 include a touch wire side connectable portion (position detecting wire side connectable portion) 46A provided at the site of intersection of the touch wire 31 with the second spare touch wire 43 and a second spare touch wire side connectable portion (second spare position detecting wire side connectable portion) 46B provided at the site of intersection of the second spare touch wire 43 with the touch wire 31. The touch wire side connectable portion 46A is provided in such a manner as to protrude from the touch wire 31 along the X-axis direction, and is disposed to overlap the second spare touch wire 43. The second spare touch wire side connectable portion 46B is composed of an overlap portion 46B1 that is a part of the second spare touch wire 43 overlapping the touch wire side connectable portion 46A and a non-overlap portion 46B2 that is a part of the second spare touch wire 43 protruding from the overlap portion 46B1 along the Y-axis direction and not overlapping the touch wire side connectable portion 46A. As shown in FIG. 15, the gate insulating film 33, the first interlayer insulating film 36, and the planarizing film 37 are sandwiched between the touch wire side connectable portion 46A and the overlap portion 46B1 of the second spare touch wire side connectable portion 46B.

Moreover, as shown in FIG. 12, an intermediate electrode 47 is provided in such a manner as to overlap both the touch wire side connectable portion 46A and the second spare touch wire side connectable portion 46B. The intermediate electrode 47 has a vertically long substantially square shape extending along the Y-axis direction, and is disposed to lie astride the touch wire side connectable portion 46A and the second spare touch wire side connectable portion 46B. It should be noted that the overlap among the touch wire side connectable portion 46A, the second spare touch wire side connectable portion 46B, and the intermediate electrode 47 is located in the dividing opening 25B and disposed not to overlap a touch electrode 30 (see FIG. 13). As shown in FIG. 15, the intermediate electrode 47 is composed of the second metal film 35, and whereas the first interlayer insulating film 36 and the planarizing film 37 are sandwiched between the intermediate electrode 47 and the touch wire side connectable portion 46A of the touch wire 31, which is composed of the third metal film 39, the gate insulating film 33 is sandwiched between the intermediate electrode 47 and the second spare touch wire side connectable portion 46B of the second spare touch wire 43, which is composed of the first metal film 32. The touch wire side connectable portion 46A and the intermediate electrode 47 are electrically connected to each other through an intermediate electrode contact hole CH6 bored through the first interlayer insulating film 36 and the planarizing film 37, which are sandwiched between the touch wire side connectable portion 46A and the intermediate electrode 47. On the other hand, the second spare touch wire side connectable portion 46B and the intermediate electrode 47 are kept in the state of being electrically insulated from each other by the gate insulating film 33, which is sandwiched between the second spare touch wire side connectable portion 46B and the intermediate electrode 47. As a result, a short circuit between an unbroken touch wire 31 and the second spare touch wire side connectable portion 46B is avoided.

Figure 16:
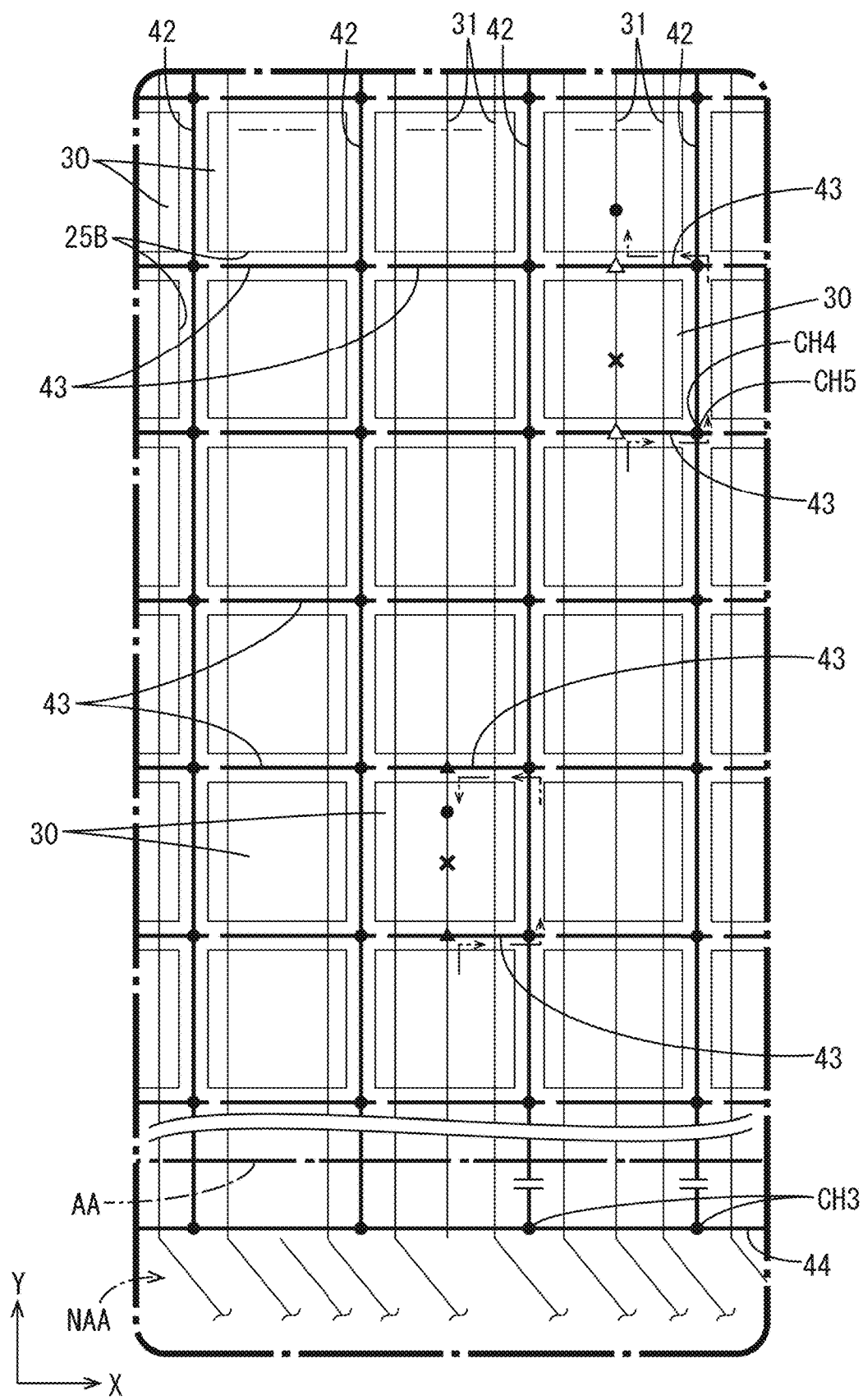
FIG. 16 is a plan view schematically showing touch electrodes, touch wires, first spare touch wires, second spare touch wires, and the common potential signal supply wire of the liquid crystal panel with touch wires repaired.

A method for repairing in case of a break in a touch wire 31 in a liquid crystal display panel 11 configured as described above is described with reference to FIGS. 15 and 16. FIG. 16 is a plan view schematically showing touch electrodes 30, touch wires 31, first spare touch wires 42, second spare touch wires 43, and the common potential signal supply wire 44 of the liquid crystal panel 11 with touch wires 31 repaired. The liquid crystal panel 11 is configured such that various defects are detected by conducting various inspections during or after manufacturing, and depending on inspections results, repairs may be performed. For example, in a case where it has been determined by an inspection that there is a break in a touch wire 31, the broken touch wire 31 is repaired. Identification of a broken touch wire 31 and identification of the location of the break by an inspection makes it possible to, as shown in FIG. 16, identify two second spare touch wires 43 between which a touch electrode 30 overlapping the broken touch wire 31 is interposed in the Y-axis direction and a first spare touch wire 42 intersecting those two second spare touch wires 43. FIG. 16 uses the mark "X" to illustrate the location of a break in a touch wire 31. An end of the first spare touch wire 42 thus identified that is drawn out into the non-display area NAA is irradiated with laser light. This causes the first spare touch wire 42 irradiated with the laser light to be cut off, to be electrically disconnected from the common potential signal supply wire 44, and to stop being supplied with the common potential signal. That is, the first spare touch wire 42 thus cut off is brought into the state of being electrically isolated. FIG. 16 uses the mark "=" to illustrate the location of a cut in a first spare touch wire 42.

Meanwhile, as shown in FIG. 16, a process of short-circuiting connectable portions 46 provided separately at each of the sites of intersection of the two second spare touch wires 43 between which the touch electrode 30 overlapping the broken touch wire 31 is interposed in the Y-axis direction and the broken touch wire 31 is performed. Specifically, as shown in FIG. 15, the non-overlap portions 46B2 of the second spare touch wire side connectable portions 46B among the touch wire side connectable portion 46A of the broken touch wire 31 and the second spare touch wire side connectable portions 46B of the two second spare touch wires 43 and the intermediate electrodes 47 are irradiated with laser light. Then, at the points of irradiation with the laser light, the state of being insulated by the gate insulating film 33 sandwiched between the non-overlap portions 46B2 of the second spare touch wire side connectable portions 46B and the intermediate electrodes 47 is broken down, so that the non-overlap portions 46B2 of the second spare touch wire side connectable portions 46B and the intermediate electrodes 47 become short-circuited. FIG. 16 uses the mark "A" to illustrate a point of irradiation with laser light for a short circuit. The film thickness of the gate insulating film 33, whose insulation is broken down by irradiation with laser light, is thinner than the sum of the film thicknesses of the first interlayer insulating film 36 and the planarizing film 37. Accordingly, the second spare touch wires 43 and the intermediate electrodes 47 are short-circuited by irradiation with laser light with higher certainty than in a case where touch wire side connectable portions and intermediate electrodes are unconnected in advance and a process of irradiation with laser light is performed in making a repair. Meanwhile, the touch wire side connectable portion 46A, which is electrically connected to the intermediate electrode 47 through the intermediate contact hole CH6, does not need such a short-circuiting process (laser light irradiation process). Thus, as shown in FIG. 16, the two second spare touch wires 43 between which the touch electrode 30 overlapping the broken touch wire 31 is interposed in the Y-axis direction and the broken touch wire 31 become electrically connected via the connectable portions 46, so that the touch signal and the common potential signal that are supplied to the broken touch wire 31 come to be supplied through the aforementioned two second spare touch wires 43 and the first spare touch wire 42 intersecting these two second spare touch wires 43 to the touch electrodes 30 to which the broken touch wire 31 is connected. It should be noted that FIG. 16 uses arrows to illustrate a transmission path of each signal. This makes it possible to repair a touch wire 31 and avoid impairment of the touch panel function.

Moreover, since, as shown in FIG. 16, the first spare touch wires 42 are each disposed between touch electrodes 30 adjacent to each other in the X-axis direction, it is harder for a first spare touch wire 42 and a touch electrode 30 to which a broken touch wire 31 is not connected to form a parasitic capacitance with each other in a case where the first spare touch wire 42 transmits the touch signal as it is used for repairing the broken touch wire 31 than in the case of first spare touch wires disposed to overlap the touch electrodes 30. This makes it hard for the touch signal to become blunt while being transmitted by the first spare touch wire 42, thus making it hard for touch sensitivity (position detection sensitivity) to decrease. Similarly, since the second spare touch wires 43 are each disposed between touch electrodes 30 adjacent to each other in the Y-axis direction, it is harder for a second spare touch wire 43 and a touch electrode 30 to which a broken touch wire 31 is not connected to form a parasitic capacitance with each other in a case where the second spare touch wire 43 transmits the touch signal as it is used for repairing the broken touch wire 31. This makes it hard for the touch signal to become blunt while being transmitted by the second spare touch wire 43, thus making it hard for the touch sensitivity to decrease. Furthermore, since the touch wires 31 are supplied with the touch signal and the common potential signal in a time-division manner from the driver 12, a first spare touch wire 42 and a second spare touch wire 43 that are connected to a broken touch wire 31 are at the same potential as each touch electrode 30 at a timing (display period) during which the common potential signal is supplied. A first spare touch wire 42 and a second spare touch wire 43 that are at the same potential as each touch electrode 30 are disposed between touch electrodes 30 adjacent to each other in the X-axis direction and the Y-axis direction, respectively; therefore, in the liquid crystal panel 11 according to the present embodiment, in which the alignment of liquid crystal molecules is controlled by electric fields generated between the pixel electrodes 24 and the common electrode 25, the alignment of liquid crystal molecules in areas between the touch electrodes 30 adjacent to each other in the X-axis direction and the Y-axis direction is hardly disrupted, so that excellent display quality is attained.

In addition, in a case where no touch wire 31 is repaired, a first spare touch wire 42 disposed between touch electrodes 30 adjacent to each other in the X-axis direction is at the same potential as each touch electrode 30 and a second spare touch wire 43 disposed between touch electrodes 30 adjacent to each other in the Y-axis direction are the same potential as each pixel electrode 30 at a timing during which the common potential signal is supplied from the driver 12, as a first spare touch wire 42 and a second spare touch wire 43 that are connected to each other are supplied with the common potential signal from the common potential signal supply wire 44 as shown in FIG. 10. Accordingly, in the liquid crystal panel 11 according to the present embodiment, in which the alignment of liquid crystal molecules is controlled by electric fields generated between the pixel electrodes 24 and the touch electrodes 30, the alignment of liquid crystal molecules in areas between touch electrodes 30 adjacent to each other in the X-axis direction and the Y-axis direction is hardly disrupted, so that excellent display quality is attained.

Furthermore, as shown in FIGS. 1 and 16, a plurality of the first spare touch wires 42 are arranged in the X-axis direction and each extend the entire length of a range of placement of a plurality of the touch electrodes 30 in the Y-axis direction, and a plurality of the second spare touch wires 43 are arranged in the X-axis direction and disposed to separately intersect each of the plurality of first spare touch wires 42. Such a configuration makes it possible to use a first spare touch wire 42 and a second spare touch wire 43 to repair a break in a touch wire 31 connected to a plurality of touch electrodes 30 arranged at spacings in the Y-axis direction, regardless of where in the Y-axis direction the break is located. In addition, a touch wire 31 can be repaired separately for each of the columns of a plurality of touch electrodes 30 arranged in the Y-axis direction. Specifically, even in a case where, as shown in FIG. 16, there are breaks in two touch wires 31 to which touch electrodes 30 belonging to two columns adjacent to each other in the X-axis direction are connected, those touch wires 31 can be repaired. Moreover, the transmission paths of those signals which are supplied to the touch wires 31 thus repaired circumvent only touch electrodes 30 overlapping the locations of the breaks, and do not circumvent touch electrodes 30 not overlapping the locations of the breaks. Accordingly, even when those signals which are supplied to the touch wires 31 thus repaired pass through the first spare touch wires 42 and the second spare touch wires 43, the signals hardly become blunt under the influence of interconnection resistance or parasitic capacitance.

As described above, a liquid crystal panel (position input device) 11 of the present embodiment includes: a touch electrode (position detecting electrode) 30 that forms a capacitance with a position input body which performs position input and that detects an input position inputted by the position input body; a touch wire (position detecting wire) 31 that extends along a first direction, that is connected to the touch electrode 30, and that transmits at least a position detection signal; a first spare touch wire (first spare position detecting wire) 42 that extends along the first direction; a plurality of second spare touch wires (second spare position detecting wires) 43 that extend along a second direction intersecting the first direction, that are arranged at spacings in the first direction, that intersect the touch wire 31 and the first spare touch wire 42, and that are connectable to the first spare touch wire 42; and a plurality of connectable portions 46 that are provided separately at each of sites of intersection of the touch wire 31 and the plurality of second spare position detecting wires 43 and that are disposed to overlap each other via a gate insulating film 33, a first interlayer insulating film 36, and a planarizing film 37, each of which is an insulating film.

This allows the touch electrode 30 to form a capacitance with a position input body which performs position input and, by utilizing a position detection signal that is supplied by the touch wire 31, detect an input position inputted by the position input body. Although the touch wire 31, which extends along the first direction, intersects the plurality of second spare touch wires 43, which extend along the second direction intersecting the first direction, the gate insulating film 33, the first interlayer insulating film 36, and the planarizing film 37, each of which is an insulating film, are sandwiched between the sites of intersection, so that short circuits are avoided.

In case of a break in the touch wire 31, a repair is performed by using the first spare touch wire 42, which extends along the first direction, and the plurality of second spare touch wires 43, which are arranged at spacings in the first direction and which intersect the touch wire 31 and the first spare touch wire 42. That is, a process such as laser light irradiation is performed on a plurality of the connectable portions 46 provided separately at each of sites of intersection of at least two of the plurality of second spare touch wires 43 between which the location of the break in the broken touch wire 31 is interposed in the first direction and the broken touch wire 31 and disposed to overlap each other via the gate insulating film 33, the first interlayer insulating film 36, and the planarizing film 37, each of which is an insulating film. Then, the plurality of connectable portions 46 cause the broken touch wire 31 and the at least two second spare touch wires 43 between which the location of the break is interposed in the first direction to be electrically connected. Further, the first spare touch wire 42 and the plurality of second spare touch wires 43 are electrically connectable. Accordingly, even in case of a break in the touch wire 31, the position detection signal is supplied to the touch electrode 30 by passing through the first spare touch wire 42 and the at least two second spare touch wires 43 between which the location of the break is interposed in the first direction. This makes it possible to repair a touch wire 31 and avoid impairment of the touch panel function.

Further, a plurality of the touch electrodes 30 are arranged at spacings in the second direction, and the first spare touch wire 42 is disposed between the touch electrodes 30 adjacent to each other in the second direction. This makes it harder for the first spare touch wire 42 and a touch electrode 30 to which the broken touch wire 31 is not connected to form a parasitic capacitance with each other in a case where the first spare touch wire 42 transmits the position detection signal as it is used for repairing the broken touch wire 31 than in the case of a first spare touch wire disposed to overlap the touch electrode 30. This makes it hard for the position detection signal to become blunt while being transmitted by the first spare touch wire 42, thus making it hard for position detection sensitivity to decrease.

Further, the liquid crystal panel 11 further includes: a pixel electrode 24 disposed to overlap the touch electrode 30 via a second interlayer insulating film (insulating film) 40; and a driver (signal supply unit) 12, connected to the touch wire 31, that supplies the touch wire 31 with the position detection signal and a common potential signal in a time-division manner. This causes the position detection signal and the common potential signal to be supplied from the driver 12 to the touch wire 31 in a time-division manner. Accordingly, at a timing during which the position detection signal is supplied, the touch electrode 30 fulfills a position detection function, and at a timing during which the common potential signal is supplied, the touch electrode 30 fulfills an image display function by utilizing an electric field generated between the pixel electrode 24, which overlaps the touch electrode 30 via the second interlayer insulating film 40, and the touch electrode 30. The first spare touch wire 42, which is disposed between the touch electrodes 30 adjacent to each other in the second direction, is at the same potential as each touch electrode 30 in a case where the first spare touch wire 42 transmits the common potential signal as it is used for repairing the broken touch wire 31. Accordingly, for example, in a case where the alignment of liquid crystal molecules is controlled by an electric field generated between the pixel electrode 24 and the touch electrode 30 (common electrode 25), the alignment of liquid crystal molecules in an area between the touch electrodes 30 adjacent to each other in the second direction is hardly disrupted.

Further, the liquid crystal panel 11 further includes a common potential signal supply wire (common potential signal supply unit) 44, connected to the first spare touch wire 42, that supplies the first spare touch wire 42 with the common potential signal. This causes the common potential signal to be supplied from the common potential signal supply wire 44 to the first spare touch wire 42 in a case where the touch wire 31 is not repaired. This causes the first spare touch wire 42, which is disposed between the touch electrodes 30 adjacent to each other in the second direction, to be at the same potential as each touch electrode 30 at a timing during which the common potential signal is supplied from the driver 12. Accordingly, for example, in a case where the alignment of liquid crystal molecules is controlled by an electric field generated between the pixel electrode 24 and the touch electrode 30, the alignment of liquid crystal molecules in the area between the touch electrodes 30 adjacent to each other in the second direction is hardly disrupted. In a case where the touch wire 31 is repaired, it is only necessary to perform a process of electrically disconnecting the first spare touch wire 42 from the common potential signal supply wire 44.

Further, a plurality of the touch electrodes 30 are arranged at spacings in the first direction, and the first spare touch wire 42 extends an entire length of a range of placement of the plurality of touch electrodes 30 in the first direction. This makes it possible to use the first spare touch wire 42 to repair a break in the touch wire 31 connected to the plurality of touch electrodes 30 arranged at spacings in the first direction, regardless of where in the first direction the break is located. Moreover, in a case where the touch wire 31 is not repaired, the first spare touch wire 42 is brought to the same potential as the touch electrode 30 by being supplied with the common potential signal from the common potential signal supply wire 44 at a timing during which the common potential signal is supplied from the driver 12. Accordingly, for example, in a case where the alignment of liquid crystal molecules is controlled by an electric field generated between the pixel electrode 24 and the touch electrode 30, the alignment of liquid crystal molecules over the entire length of the range of placement of the plurality of touch electrodes 30 in the first direction in the area between the touch electrodes 30 adjacent to each other in the second direction is hardly disrupted.

Further, a plurality of the first spare touch wires 42 are placed adjacent separately to each of a plurality of the touch electrodes 30 arranged in the second direction, and a plurality of the second spare touch wires 43 are arranged in the second direction and disposed to separately intersect each of the plurality of first spare touch wires 42. In this way, in case of a break in the touch wire 31 connected to any of a plurality of the touch electrodes 30 arranged in the first direction, the first spare touch wire 42 adjacent in the second direction to the touch electrode 30 to which the broken touch wire 31 is connected and a plurality of the second spare touch wires 43 intersecting the first spare touch wire 42 can be used to perform a repair. This makes it possible to repair the touch wire 31 separately for each of the columns of a plurality of the touch electrodes 30 arranged in the first direction. This makes it easier to improve the non-defective-product ratio through recovery of the position detection function than in the case of second spare touch wires disposed to overlap a plurality of the first spare touch wires 42 arranged in the second direction.

Further, the second spare touch wires 43 are disposed between the touch electrodes 30 adjacent to each other in the first direction, and are connected to the first spare touch wire 42 that the second spare touch wires 43 intersect. Since the second spare touch wires 43 are connected to the first spare touch wire 42, a repair is performed with higher workability than in a case where second spare touch wires are unconnected to the first spare touch wire 42 and it is necessary to perform a process of connecting the second spare touch wires to the first spare touch wire 42 in performing a repair. Moreover, in a case where the touch wire 31 is not repaired, the second spare touch wires 43, which are connected to the first spare touch wire 42, are supplied with the common potential signal from the common potential signal supply wire 44. This causes the first spare touch wire 42, which is disposed between the touch electrodes 30 adjacent to each other in the first direction, to be at the same potential as each touch electrode 30 at a timing during which the common potential signal is supplied from the driver 12. Accordingly, for example, in a case where the alignment of liquid crystal molecules is controlled by an electric field generated between the pixel electrode 24 and the touch electrode 30, the alignment of liquid crystal molecules in an area between the touch electrodes 30 adjacent to each other in the first direction is hardly disrupted. Further, since the second spare touch wires 43 are disposed between the touch electrodes 30 adjacent to each other in the first direction, it is hard for the second spare touch wires 43 and a touch electrode 30 to which the broken touch wire 31 is not connected to form a parasitic capacitance with each other even in a case where the second spare touch wires 43 transmit the position detection signal as they are used for repairing the broken touch wire 31. This makes it hard for the position detection signal to become blunt while being transmitted by the second spare touch wires 43, thus making it hard for position detection sensitivity to decrease.

Further, the liquid crystal panel 11 further includes a plurality of intermediate electrodes 47 that are disposed so that the first interlayer insulating film 36 and the planarizing film 37, each of which is an interlayer insulating film, is sandwiched between the plurality of connectable portions 46 of the touch wire 31 and the plurality of intermediate electrodes 47 and that are disposed so that the gate insulating film (insulating film) 33 is sandwiched between the plurality of connectable portions 46 of the plurality of second spare touch wires 43 and the plurality of intermediate electrodes 47. In the liquid crystal panel 11, either the plurality of connectable portions 46 of the touch wire 31 or the plurality of connectable portions 43 of the plurality of second spare touch wires 43 are connected to the plurality of intermediate electrodes 47 through intermediate electrode contact holes CH6 bored through either the first interlayer insulating film 36 and the planarizing film 37 or the gate insulating film 33, each of which is an insulating film. In this way, in case of a break in the touch wire 31, a process such as laser light irradiation is performed on those of the connectable portions 46, provided separately at each of sites of intersection of at least two of the plurality of second spare touch wires 43 between which the location of the break in the broken touch wire 31 is interposed in the first direction and the broken touch wire 31, which are unconnected to the plurality of intermediate electrodes 47 insulated from those connectable portions 46 by the other insulating film(s), namely the first interlayer insulating film 36 and the planarizing film 37 or the gate insulating film 33. Then, the plurality of connectable portions 46 and the plurality of intermediate electrodes 47 cause the broken touch wire 31 and the at least two second spare touch wires 43 between which the location of the break is interposed in the first direction to be electrically connected. In this way, even in a configuration in which the gate insulating film 33, the first interlayer insulating film 36, and the planarizing film 37, which are a plurality of insulating films, are sandwiched between the plurality of connectable portions 46 of the touch wire 31 and the plurality of connectable portions 46 of the plurality of second spare touch wires 43, the connectable portions 46 are connected to each other with high reliability by the intermediate electrodes 47 being sandwiched between the connectable portions 46. Moreover, since either the plurality of connectable portions 46 provided at the sites of intersection with the touch wire 31 or the plurality of connectable portions 46 provided at the sites of intersection with the plurality of second spare touch wires 43 are connected to the intermediate electrodes 47 through the intermediate electrode contact holes CH6 bored through either the first interlayer insulating film 36 and the planarizing film 37 or the gate insulating film 33, each of which is an insulating film interposed between the plurality of connectable portions 46 and the intermediate electrodes 47, the number of times a process such as laser light irradiation is performed is reduced, so that excellent workability is attained.

Further, the liquid crystal panel 11 further includes a plurality of inter-spare touch wire electrodes (inter-spare position detecting wire electrodes) 45 disposed so that the first interlayer insulating film 36 and the planarizing film 37, each of which is an interlayer insulating film, is sandwiched between sites of intersection of the first spare touch wire 42 with the plurality of second spare touch wires 43 and the plurality of inter-spare touch wire electrodes 45 and the gate insulating film (insulating film) 33 is sandwiched between sites of intersection of the plurality of second spare touch wires 43 with the first spare touch wire 42 and the plurality of inter-spare touch wire electrodes 45. In the liquid crystal panel 11, at least either the sites of intersection of the first spare touch wire 42 with the plurality of second spare touch wires 43 or the sites of intersection of the plurality of second spare touch wires 43 with the first spare touch 42 wire are connected to the plurality of intermediate electrodes 47 through inter-spare touch wire electrode contact holes CH4 or CH5 bored through at least either the first interlayer insulating film 36 and the planarizing film 37 or the gate insulating film 33, each of which is an insulating film. In this way, even in a configuration in which the gate insulating film 33, the first interlayer insulating film 36, and the planarizing film 37, which are a plurality of insulating films, are sandwiched between the first spate touch wire 42 and the plurality of second spare touch wires 43, the sites of intersection of the first spare touch wire 42 and the plurality of second spare touch wires 43 are connected to each other with high reliability by the inter-spare touch wire electrodes 45 being sandwiched between the sites of intersection. Moreover, since at least either the sites of intersection of the first spare touch wire 42 with the plurality of second spare touch wires 43 or the sites of intersection of the plurality of second spare touch wires 43 with the first spare touch 42 wire are connected to the inter-spare touch wire electrodes 45 through the inter-spare touch wire electrode contact holes CH4 or CH5 bored through at least either the first interlayer insulating film 36 and the planarizing film 37 or the gate insulating film 33, each of which is an insulating film interposed between the sites of intersection and the inter-spare touch wire electrodes 45, the number of times a process such as laser light irradiation is performed is reduced, so that excellent workability is attained.

Further, the liquid crystal panel 11 further includes a plurality of pixel electrodes 24 that are arranged in the second direction and that are disposed to overlap the touch electrode 30 via a second interlayer insulating film (insulating film) 40; and a plurality of source lines (image lines) 27 that extend along the first direction, that are arranged in the second direction, and that supply the plurality of pixel electrodes 24 with an image signal. In the liquid crystal panel 11, the touch wire 31 and the first spare touch wire 42 are located at the same layer as each other and disposed to overlap the plurality of source lines 27 via the first interlayer insulating film 36 and the planarizing film 37, each of which is an insulating film. In this way, the pixel electrodes 24 are charged to an electric potential based on the image signal that is supplied by the source lines 27. Since the touch wire 31 and the first spare touch wire 42 are located at the same layer as each other and disposed to overlap the plurality of source lines 27 via the first interlayer insulating film 36 and the planarizing film 37, each of which is an insulating film, improvement in aperture ratio can be more suitably brought about than in a case where a touch wire and a first spare touch wire are located at the same layer as the plurality of source lines 27 and disposed not to overlap the plurality of source lines 27.

Further, the liquid crystal panel 11 further includes a plurality of pixel electrodes 24 that are arranged in the first direction and that are disposed to overlap the touch electrode 30 via a second interlayer insulating film (insulating film) 40; a plurality of TFTs (switching elements) 23 that are connected separately to each of the plurality of pixel electrodes 24; and a plurality of gate lines (scanning lines) 26 that extend along the second direction, that are disposed so that two pixel electrodes 24 are interposed therebetween in the first direction, two of which are disposed between pixel electrodes 24 adjacent to each other in the first direction, and that are connected to the plurality of TFTs 23. In the liquid crystal panel 11, the second spare touch wires 43 are located at the same layer as the gate lines 26, disposed between the pixel electrodes 24 adjacent to each other in the first direction, and disposed so that the pixel electrodes 24 are interposed between the gate lines 26 and the second spare touch wires 43 in the first direction. In this way, the TFTs 23 are driven in accordance with signals that are supplied by the gate lines 26. The pixel electrodes 24 are charged to an electric potential that is supplied as the TFTs 23 are driven. The gate lines 26 are disposed so that two pixel electrodes 24 are interposed therebetween in the first direction, and two of the gate lines 26 are disposed between the pixel electrodes 24 adjacent to each other in the first direction. The second spare touch wires 43, which are located at the same layer as the gate lines 26, are disposed between the pixel electrodes 24 adjacent to each other in the first direction and disposed so that the pixel electrodes 24 are interposed between the gate lines 26 and the second spare touch wires 43 in the first direction. That is, since the second spare touch wires 43 are disposed in those of areas between the plurality of pixel electrodes 24 arranged in the first direction in which no gate lines 26 are placed, the second spare touch wires 43 are efficiently placed while avoiding short circuits with the gate lines 26, which are located at the same layer as the second spare touch wires 43.

Embodiment 2

Embodiment 2 is described with reference to FIGS. 17 to 21. Embodiment 2 illustrates an embodiment in which inter-spare touch wire connectable portions 48 are provided. It should be noted that a repeated description of structures, actions, and effects which are similar to those of Embodiment 1 is omitted.

Figure 17:
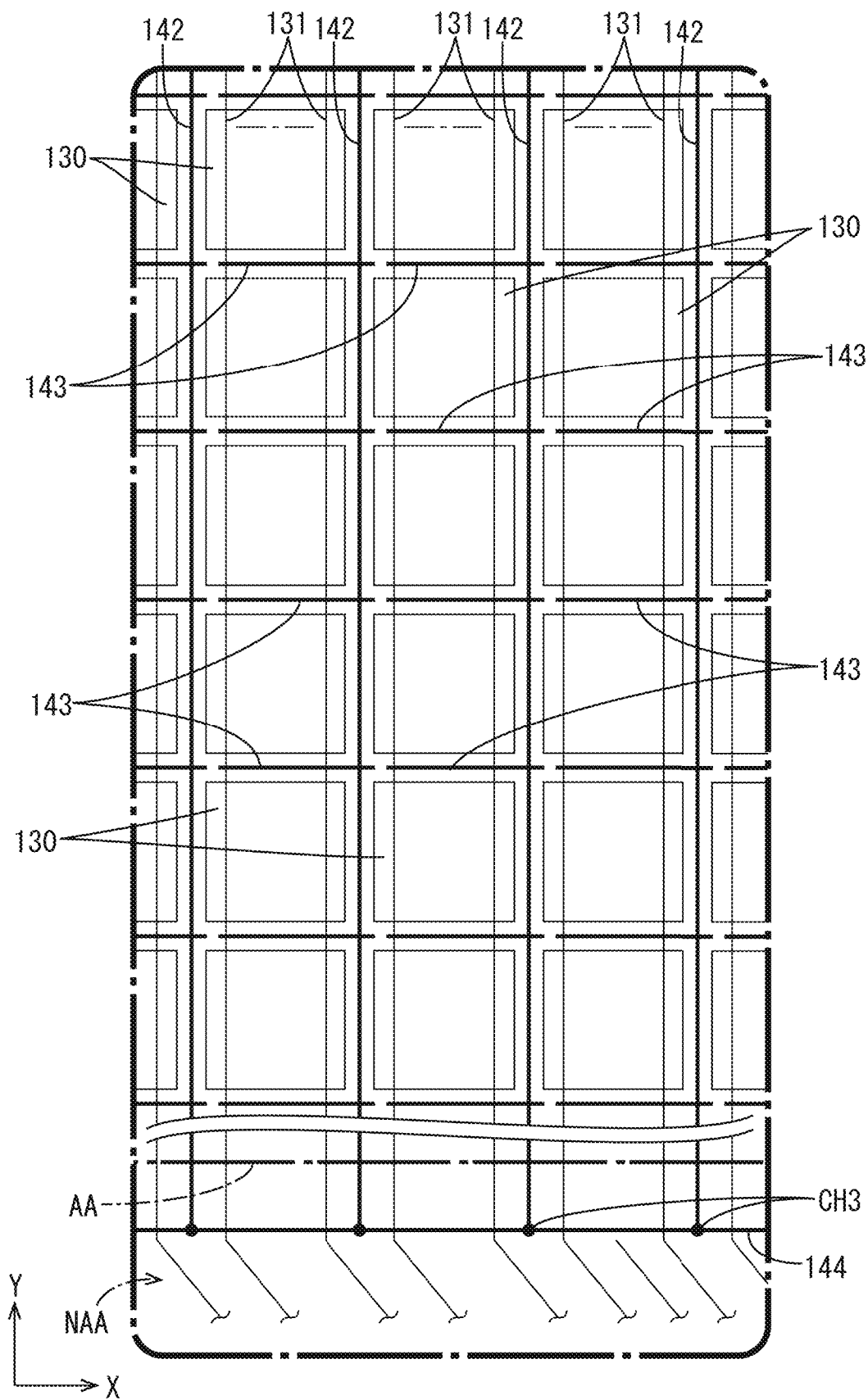
FIG. 17 is a plan view schematically showing touch electrodes, touch wires, first spare touch wires, second spare touch wires, and a common potential signal supply wire of a liquid crystal panel according to Embodiment 2.
Figure 18:
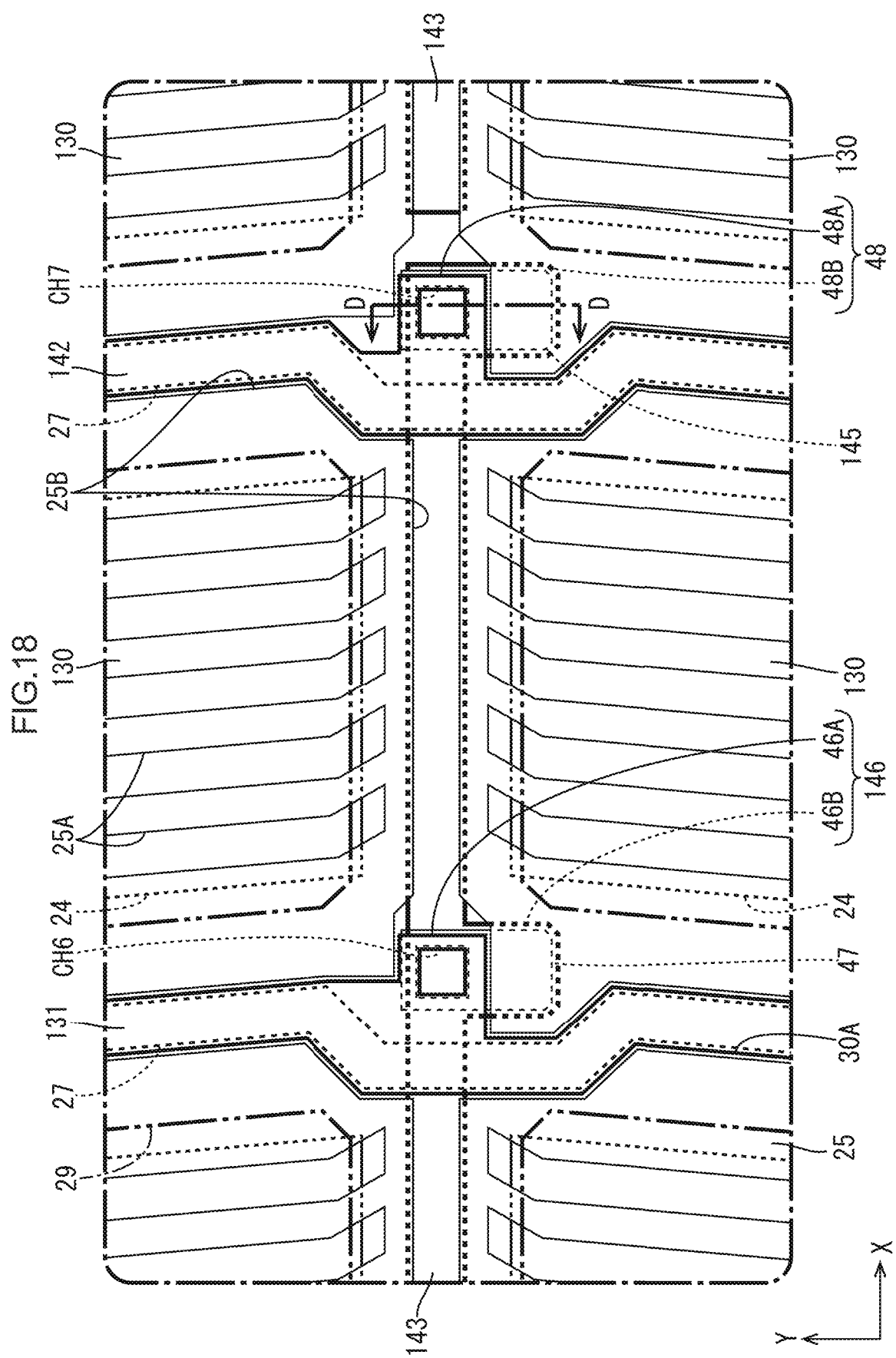
FIG. 18 is an enlarged plan view of a part of an array substrate near a touch wire, a first spare touch wire, and a second spare touch wire.

As shown in FIGS. 17 and 18, first spare touch wires 142 and second spare touch wires 143 according to the present embodiment are configured such that those of the first spare touch wires 142 and the second spare touch wires 143 which intersect each other are not connected to each other in advance. FIG. 17 is a plan view schematically showing touch electrodes 130, touch wires 131, first spare touch wires 142, second spare touch wires 143, and a common potential signal supply wire 144 of a liquid crystal panel. FIG. 18 is an enlarged plan view of a part of an array substrate 121 near a touch wire 131, a first spare touch wire 142, and a second spare touch wire 143. In particular, as shown in FIG. 18, inter-spare touch wire connectable portions (inter-spare position detecting wire connectable portions) 48 are provided separately at each of sites of intersection of the first spare touch wire 142 and the second spare touch wire 143. The inter-spare touch wire connectable portions 48, which are provided separately at each of the sites of intersection of the first spare touch wires 142 and the second spare touch wires 143, are in the state of being electrically insulated from each other under normal conditions, but are configured to be electrically connected to each other by performing a predetermined process in repairing a break in the touch wire 131. These inter-spare touch wire connectable portions 48 are provided separately at all sites of intersection of a plurality of the first spare touch wires 142 and a plurality of the second spare touch wires 143.

Figure 19:
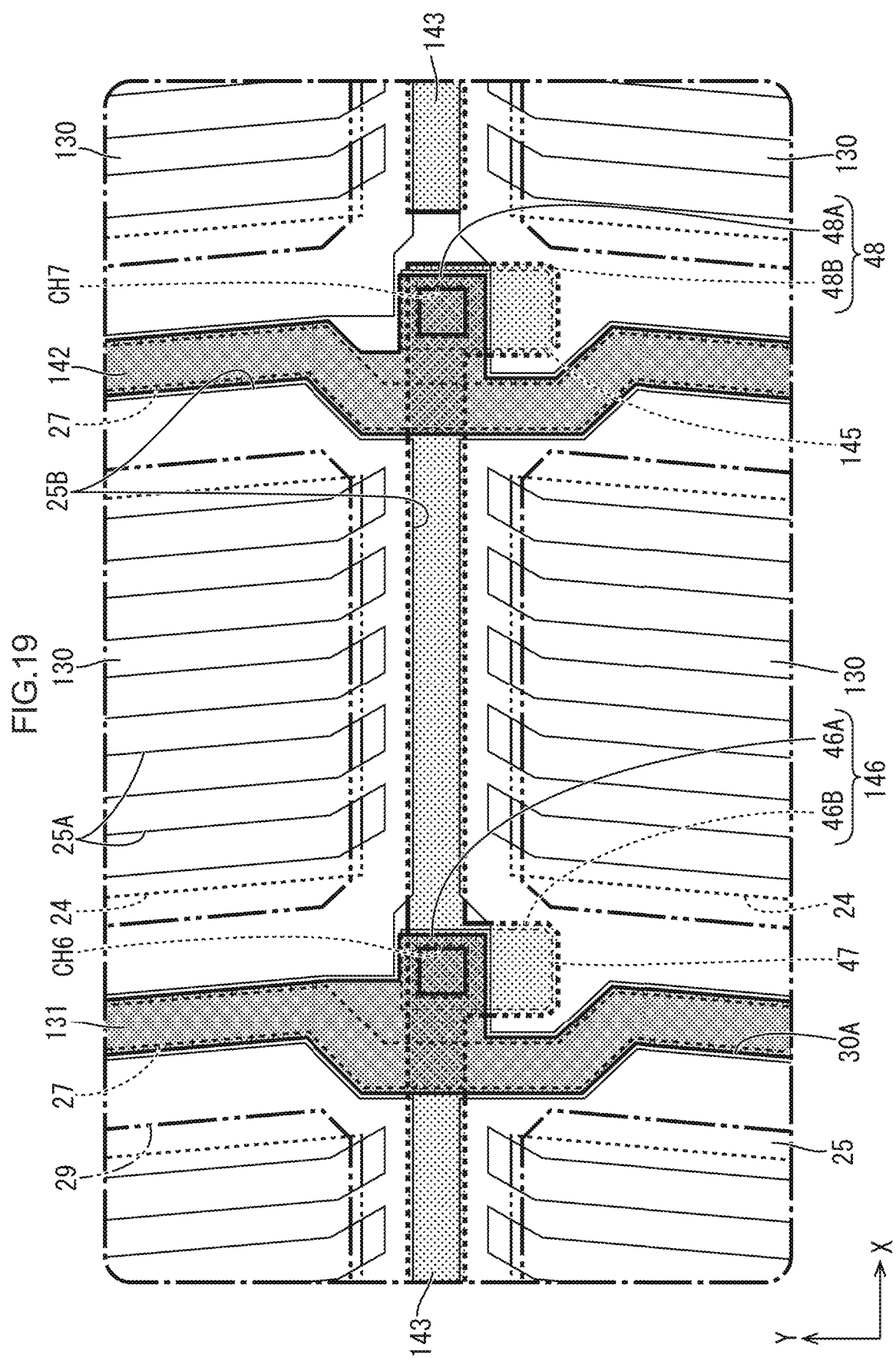
FIG. 19 is a plan view of patterns of a first metal film and a third metal film of the array substrate in the same area as FIG. 18.
Figure 20:
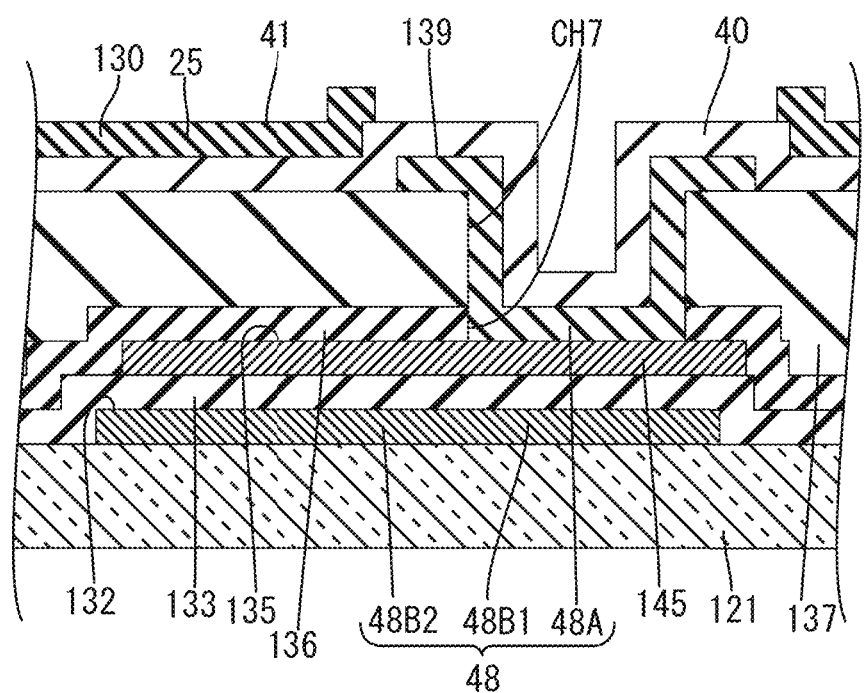
FIG. 20 is a cross-sectional view of the array substrate as taken along line D-D in FIG. 18.

FIG. 19 is a plan view of patterns of a touch wire 131, a first spare touch wire 142, a second spare touch wire 143, or other components (i.e. a first metal film 132 and a third metal film 139) of the array substrate 121. FIG. 19 illustrates the first metal film 132 and the third metal film 139 by half-tone dot meshing. FIG. 20 is a cross-sectional view of sites of intersection of a first spare touch wire 142 and a second spare touch wire 143 in the array substrate 121 (i.e. a cross-sectional view taken along line D-D in FIG. 18). As shown in FIGS. 19 and 20, the inter-spare touch wire connectable portions 48 include a first spare touch wire side connectable portion (first spare position detecting wire side connectable portion) 48A provided at the site of intersection of the first spare touch wire 142 with the second spare touch wire 143 and a secondary second spare touch wire side connectable portion (secondary second spare position detecting wire side connectable portion) 48B provided at the site of intersection of the second spare touch wire 143 with the first spare touch wire 142. The first spare touch wire side connectable portion 48A is provided in such a manner as to protrude from the first spare touch wire 142 along the X-axis direction, and is disposed to overlap the second spare touch wire 143. The first spare touch wire side connectable portion 48A is similar in configuration to the first branch portion 42A described above in Embodiment 1 (see FIG. 12). The secondary second spare touch wire side connectable portion 48B is composed of a secondary overlap portion 48B1 that is a part of the second spare touch wire 143 overlapping the first spare touch wire side connectable portion 48A and a secondary non-overlap portion 48B2 that is a part of the second spare touch wire 143 protruding from the secondary overlap portion 48B1 along the Y-axis direction and not overlapping the first spare touch wire side connectable portion 48A. Of them, the secondary non-overlap portion 48B2 is similar in configuration to the second branch portion 43A described above in Embodiment 1 (see FIG. 12). As shown in FIG. 20, a gate insulating film 133, a first interlayer insulating film 136, and a planarizing film 137 are sandwiched between the first spare touch wire side connectable portion 48A, which is composed of the third metal film 139, and the secondary overlap portion 48B1 of the secondary second spare touch wire side connectable portion 48B, which is composed of the first metal film 132.

As shown in FIGS. 18 and 20, an inter-spare touch wire electrode 145 is disposed to overlap the first spare touch wire side connectable portion 48A and the secondary second spare touch wire side connectable portion 48B. An inter-spare touch wire electrode 145 according to the present embodiment is configured as described above in Embodiment 1, except that it overlaps a first spare touch wire side connectable portion 48A and a secondary second spare touch wire side connectable portion 48B. A plurality of the inter-spare touch wire electrodes 145 are provided so as to overlap all inter-spare touch wire connectable portions 48, and the number of inter-spare touch wire electrodes 145 provided is equal to the number of sites of intersection of the first spare touch wires 142 and the second spare touch wires 143. As shown in FIG. 20, whereas the first interlayer insulating film 136 and the planarizing film 137 are sandwiched between the inter-spare touch wire electrode 145, which is composed of a second metal film 135, and the first spare touch wire side connectable portion 48A of the first spare touch wire 142, which is composed of the third metal film 139, the gate insulating film 133 is sandwiched between the inter-spare touch wire electrode 145 and the secondary second spare touch wire side connectable portion 48B of the second spare touch wire 143, which is composed of the first metal film 132. The inter-spare touch wire electrode 145 and the first spare touch wire side connectable portion 48A are connected to each other through an inter-spare touch wire electrode contact hole CH7 bored through the first interlayer insulating film 136 and the planarizing film 137, which are sandwiched between the inter-spare touch wire electrode 145 and the first spare touch wire side connectable portion 48A. On the other hand, the inter-spare touch wire electrode 145 and the secondary second spare touch wire side connectable portion 48B are kept in the state of being electrically insulated from each other by the gate insulating film 133, which is sandwiched between the inter-spare touch wire electrode 145 and the secondary second spare touch wire side connectable portion 48B. Thus, since the first spare touch wires 142 and the second spare touch wires 143 according to the present embodiment are electrically unconnected to each other under normal conditions, the common potential signal that is supplied from the common potential signal supply wire 144 to each first spare touch wire 142 is not supplied to the second spare touch wires 143. On the other hand, for example, when parts of the light shield of the CF substrate overlapping the second spare touch wires 143 are made greater in width than the other parts, it is hard to view unevenness in display caused by a disruption in the alignment of liquid crystal molecules that may arise due to failure to supply the common potential signal to the second spare touch wires 143.

Figure 21:
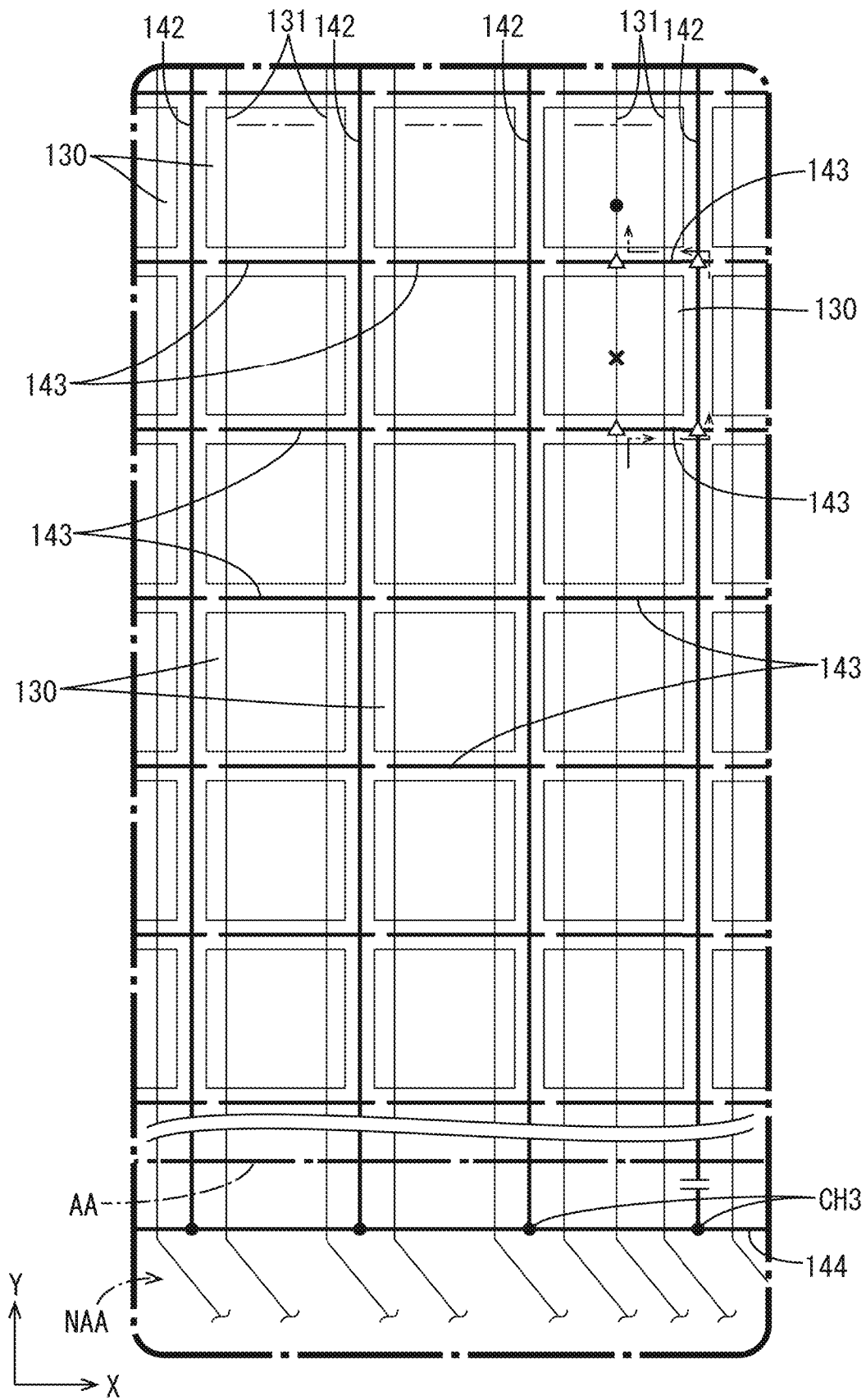
FIG. 21 is a plan view schematically showing touch electrodes, touch wires, first spare touch wires, second spare touch wires, and the common potential signal supply wire of the liquid crystal panel with a touch wire repaired.

A method for repairing in case of a break in a touch wire 131 in a liquid crystal display panel configured as described above is described with reference to FIGS. 20 and 21. FIG. 21 is a plan view schematically showing touch electrodes 130, touch wires 131, first spare touch wires 142, second spare touch wires 143, and the common potential signal supply wire 144 of the liquid crystal panel with a touch wire 131 repaired. Identification of a broken touch wire 131 and the location of the break by an inspection makes it possible to, as shown in FIG. 21, identify inter-spare touch wire connectable portions 48 provided separately at each of sites of intersection of two second spare touch wires 143 between which a touch electrode 130 overlapping the broken touch wire 131 is interposed in the Y-axis direction and a first spare touch wire 142 intersecting those two second spare touch wires 143. FIG. 21 uses the mark "X" to illustrate the location of the break in the touch wire 131. As in the case of Embodiment 1, a process of electrically disconnecting the first spare touch wire 142 thus identified from the common potential signal supply wire 144 is performed. FIG. 21 uses the mark "=" to illustrate the location of a cut in the first spare touch wire 142.

Meanwhile, as shown in FIG. 21, a process of short-circuiting connectable portions (see FIG. 15) provided separately at each of the sites of intersection of the two second spare touch wires 143 between which the touch electrode 130 overlapping the broken touch wire 131 is interposed in the Y-axis direction and the broken touch wire 131 is performed, and in addition, a process of short-circuiting the inter-spare touch wire connectable portions 48 provided separately at each of the sites of intersection of the two second spare touch wires 143 between which the touch electrode 130 overlapping the broken touch wire 131 is interposed in the Y-axis direction and the first spare touch wire 142 intersecting those two second spare touch wires 143 is performed. A repeated description of the process of short-circuiting the connectable portions is omitted, as the process is similar to that described above in Embodiment 1.

The process of short-circuiting the inter-spare touch wire connectable portions 48 is performed in the following manner. That is, as shown in FIG. 20, the secondary non-overlap portions 48B2 of the secondary second spare touch wire side connectable portions 48B of the aforementioned two second spare touch wires 143 and the inter-spare touch wire electrodes 145 are irradiated with laser light. Then, at the points of irradiation with the laser light, the state of being insulated by the gate insulating film 133 sandwiched between the secondary non-overlap portions 48B2 of the secondary second spare touch wire side connectable portions 48B and the inter-spare touch wire electrodes 145 is broken down, so that the secondary non-overlap portions 48B2 of the secondary second spare touch wire side connectable portions 48B and the inter-spare touch wire electrodes 145 become short-circuited. FIG. 21 uses the mark "▲" to illustrate a point of irradiation with laser light for a short circuit. The film thickness of the gate insulating film 133, whose insulation is broken down by irradiation with laser light, is thinner than the sum of the film thicknesses of the first interlayer insulating film 136 and the planarizing film 137. Accordingly, the second spare touch wires 143 and the inter-spare touch wire electrodes 145 are short-circuited by irradiation with laser light with higher certainty than in a case where first spare touch wire side connectable portions and inter-spare touch wire electrodes are unconnected in advance and a process of irradiation with laser light is performed in making a repair.

Meanwhile, as shown in FIG. 20, the first spare touch wire side connectable portion 48A, which is electrically connected to the inter-spare touch wire electrode 145 through the inter-spare touch wire electrode contact hole CH7, does not need such a short-circuiting process (laser light irradiation process). Thus, as shown in FIG. 21, the two second spare touch wires 143 between which the touch electrode 130 overlapping the broken touch wire 131 is interposed in the Y-axis direction and the first spare touch wire 142 intersecting those two second spare touch wires 143 become electrically connected via the inter-spare touch wire connectable portions 48, so that the touch signal and the common potential signal that are supplied to the broken touch wire 131 come to be supplied through the aforementioned two second spare touch wires 143 and the first spare touch wire 142 intersecting these two second spare touch wires 143 to the touch electrodes 130 to which the broken touch wire 131 is connected. It should be noted that FIG. 21 uses arrows to illustrate a transmission path of each signal. This makes it possible to repair a touch wire 131 and avoid impairment of the touch panel function. Moreover, the first spare touch wire 142 used for the repair is selectively electrically connected solely to the two second spare touch wires 143, included in the plurality of second spare touch wires 143 that the first spare touch wire 142 intersects, between which the location of the break in the touch wire 131 is interposed in the Y-axis direction, and is rendered electrically unconnected to a large number of remaining second spare touch wires 143. Accordingly, the touch signal that is supplied to the broken touch wire 131 is subjected to a lower load than in a case where all of the plurality of second spare touch wires 43 are connected to the first spare touch wire 42 in advance as in the case of Embodiment 1. This makes it hard for the touch signal to become blunt, thus making it hard for touch sensitivity to decrease.

As described above, the present embodiment further includes a plurality of inter-spare touch wire connectable portions (inter-spare position detecting wire connectable portions) 48 that are provided separately at each of sites of intersection of the first spare touch wire 142 and the plurality of second spare touch wires 143 and that are disposed to overlap each other via a gate insulating film 133, a first interlayer insulating film 136, and a planarizing film 137, each of which is an insulating film. In this way, in case of a break in the touch wire 131, a process such as laser light irradiation is performed on a plurality of the inter-spare touch wire connectable portions 48 provided separately at each of sites of intersection of at least two of the plurality of second spare touch wires 143 between which the location of the break in the broken touch wire 131 is interposed in the first direction and a first spare touch wire 142 intersecting those second spare touch wires 143 and disposed to overlap each other via the gate insulating film 133, the first interlayer insulating film 136, and the planarizing film 137, each of which is an insulating film. Then, the plurality of inter-spare touch wire connectable portions 48 cause the at least two second spare touch wires 143 between which the location of the break is interposed in the first direction and the first spare touch wire 142 intersecting those second spare touch wires 143 to be electrically connected. Further, the at least two second spare touch wires 143 between which the location of the break is interposed in the first direction are electrically connected to the broken touch wire 131 by a plurality of connectable portions 146. Accordingly, even in case of a break in the touch wire 131, the position detection signal is supplied to the touch electrode 130 by passing through the first spare touch wire 142 and the at least two second spare touch wires 143 between which the location of the break is interposed in the first direction. Moreover, a position detection signal that, when a broken touch wire 131 has been repaired, is transmitted to the touch wire 131 is subjected to a lower load than in a case where all of a plurality of second spare touch wires are connected to the first spare touch wire 142 in advance. This makes it hard for the position detection signal to become blunt, thus making it hard for position detection sensitivity to decrease.

Embodiment 3

Embodiment 3 is described with reference to FIGS. 22 to 29. Embodiment 3 illustrates changes made from Embodiments 1 and 2 to configure a first spare touch wire 242 and a second spare touch wire 243. It should be noted that a repeated description of structures, actions, and effects which are similar to those of Embodiments 1 and 2 is omitted.

Figure 22:
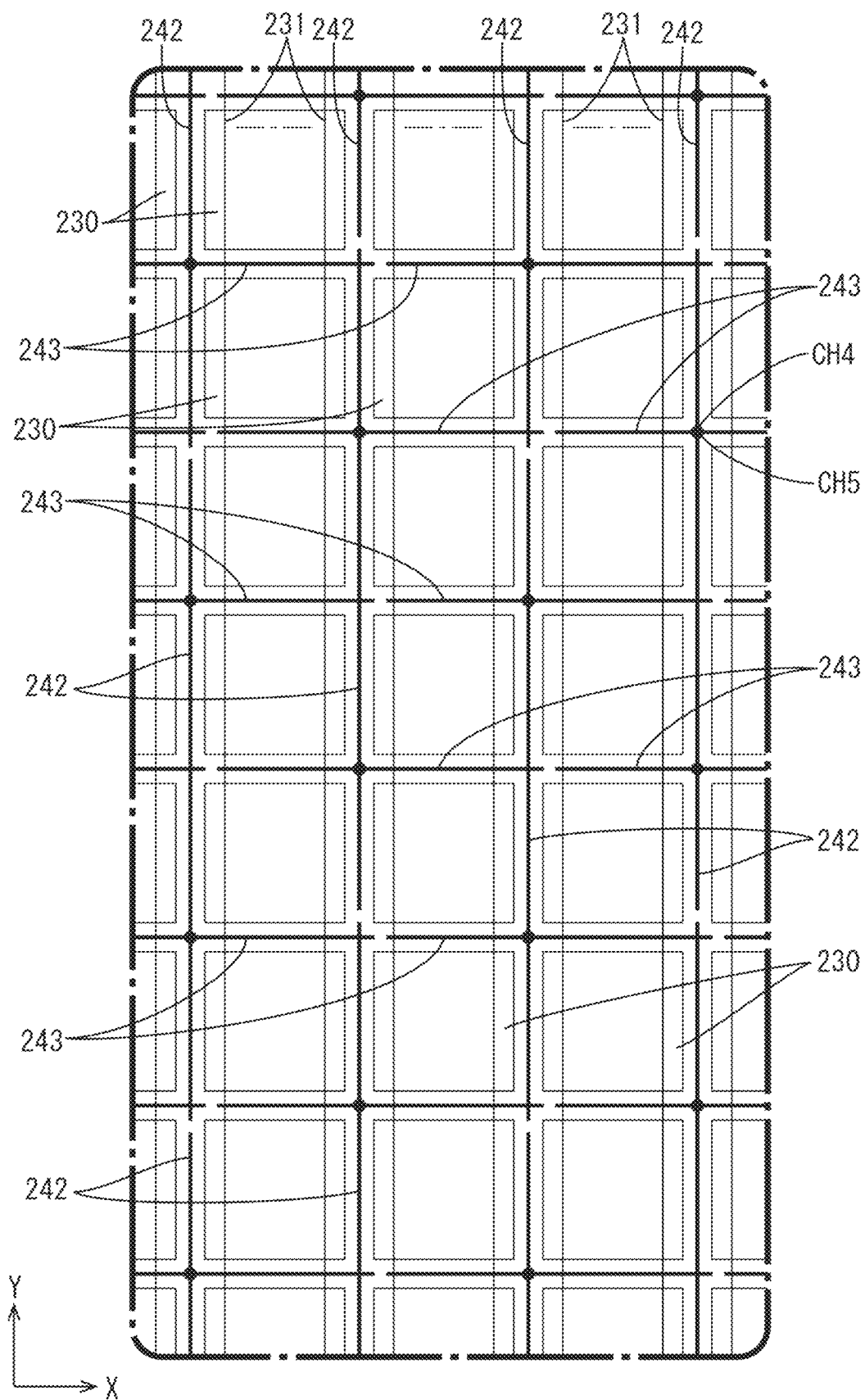
FIG. 22 is a plan view schematically showing touch electrodes, touch wires, first spare touch wires, second spare touch wires, and a common potential signal supply wire of a liquid crystal panel according to Embodiment 3.

The first spare touch wire 242 according to the present embodiment is provided in such a manner that as shown in FIG. 22, a plurality of the first spare touch wires 242 are arranged in the Y-axis direction. The first spare touch wire 242 has a length that is smaller than the range of placement (i.e. a short side of the touch area) of a column of touch electrodes 230 arranged in the Y-axis direction and that lies astride about four touch electrodes 230 arranged in the Y-axis direction. That is, the length of the first spare touch wire 242 is about four times as great as the length of a side of a touch electrode 230. Accordingly, the number of first spare touch wires 242 arranged in the Y-axis direction is about equal to ¼ of the number of touch electrodes 230 arranged in the Y-axis direction. Thus, the first spare touch wire 242 according to the present embodiment is configured not to traverse the entire length of the touch area in the Y-axis direction; therefore, in the present embodiment, the common potential signal supply wires 44 and 144 described above in Embodiments 1 and 2 are omitted. Correspondingly, for example, when the light shield of the CF substrate is made greater in width than that described above in Embodiment 1, it is hard to view unevenness in display caused by a disruption in the alignment of liquid crystal molecules that may arise due to failure to supply the common potential signal to the first spare touch wire 242 or the second spare touch wire 243. Meanwhile, the second spare touch wire 243 has a length that lies astride about two touch electrodes 230 arranged in the X-axis direction. That is, the length of the second spare touch wire 243 is about twice as great as the length of a side of a touch electrode 230. Accordingly, the number of second spare touch wires 243 arranged in the X-axis direction is about equal to ½ of the number of touch electrodes 230 arranged in the X-axis direction.

As shown in FIG. 22, the first spare touch wires 242 are disposed so that those of the first spare touch wires 242 between which a touch electrode 230 is interposed in the X-axis direction differ in position from each other in the Y-axis direction. In particular, two first spare touch wires 242 between which one touch electrode 230 is interposed in the X-axis direction are displaced about the size of one touch electrode 230 with respect to each other in the Y-axis direction. Meanwhile, two first spare touch wires 242 between which two touch electrodes 230 and one first spare touch wire 242 are interposed in the X-axis direction are arranged in substantially the same position in the Y-axis direction. That is, a plurality of the first spare touch wires 242 arranged at spacings the size of a touch electrode 230 in the X-axis direction are alternately aligned in the Y-axis direction. In other words, odd-numbered (even-numbered) first spare touch wires 242 as counted from the end in the X-axis direction are aligned in the Y-axis direction, but differ in position in the Y-axis direction from even-numbered (odd-numbered) first spare touch wires 242 as counted from the end in the X-axis direction.

On the other hand, as shown in FIG. 22, the second spare touch wires 243 are disposed so that those of the second spare touch wires 243 between which a touch electrode 230 is interposed in the Y-axis direction differ in position from each other in the X-axis direction. In particular, the second spare touch wires 243 are displaced about the size of one touch electrode 230 with respect to each other in the X-axis direction. Meanwhile, two second spare touch wires 243 between which two touch electrodes 230 and one second spare touch wire 243 are interposed in the Y-axis direction are arranged in substantially the same position in the X-axis direction. That is, a plurality of the second spare touch wires 243 arranged at spacings the size of a touch electrode 230 in the Y-axis direction are alternately aligned in the X-axis direction. In other words, odd-numbered (even-numbered) second spare touch wires 243 as counted from the end in the Y-axis direction are aligned in the X-axis direction, but differ in position in the X-axis direction from even-numbered (odd-numbered) second spare touch wires 242 as counted from the end in the Y-axis direction. Moreover, the second spare touch wire 243 is disposed to separately intersect two first spare touch wires 242 between which a touch electrode 230 is interposed in the X-axis direction. In particular, the second spare touch wire 243 intersects two first spare touch wires 242 each adjacent on the right (one side) in FIG. 22 in the X-axis direction to two touch electrodes 230 adjacent to the second spare touch wire 243 in the Y-axis direction.

Figure 23:
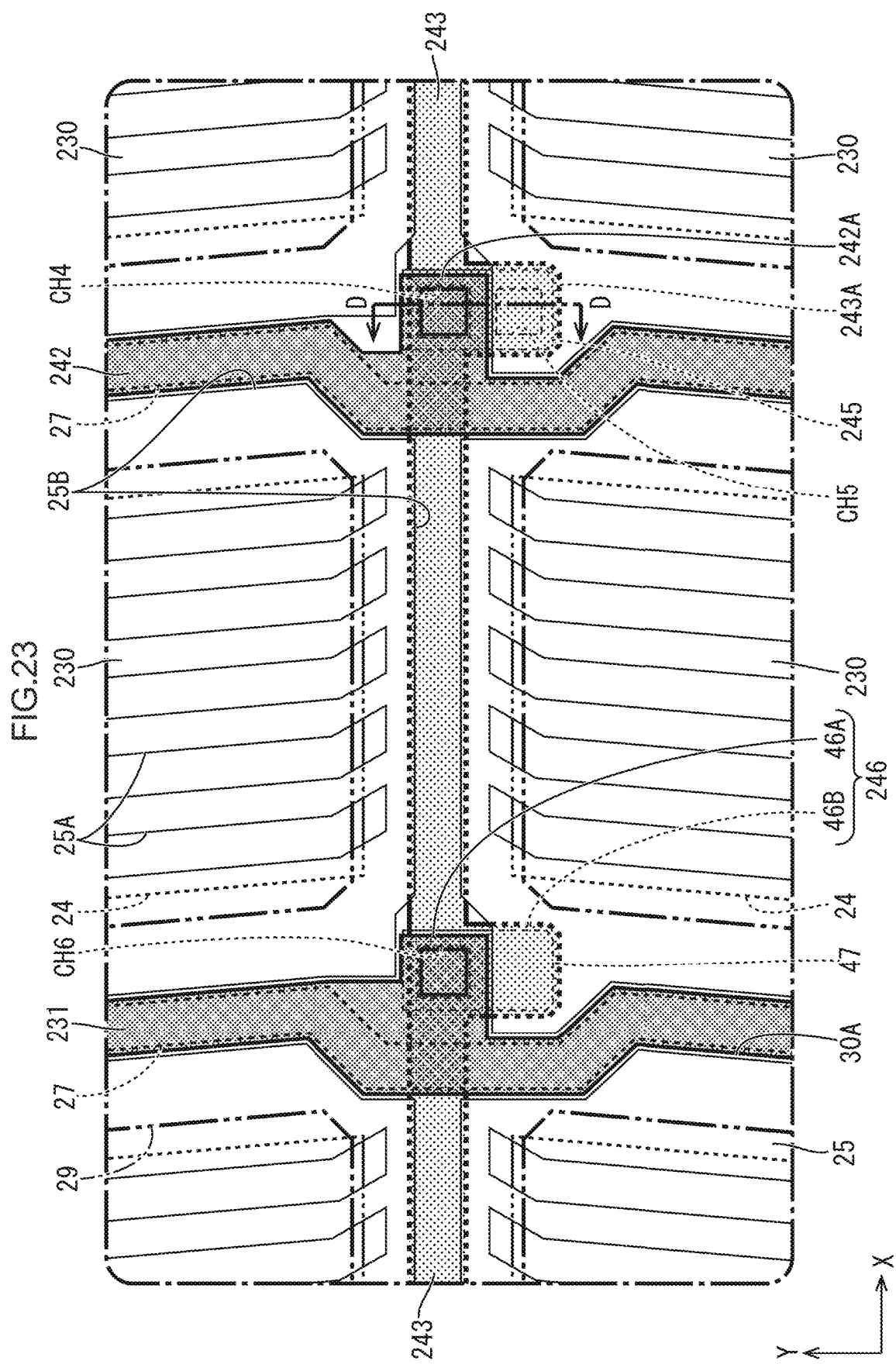
FIG. 23 is an enlarged plan view showing patterns of a first metal film and a third metal film of the array substrate near a point of connection between a first spare touch wire and a second spare touch wire.
Figure 24:
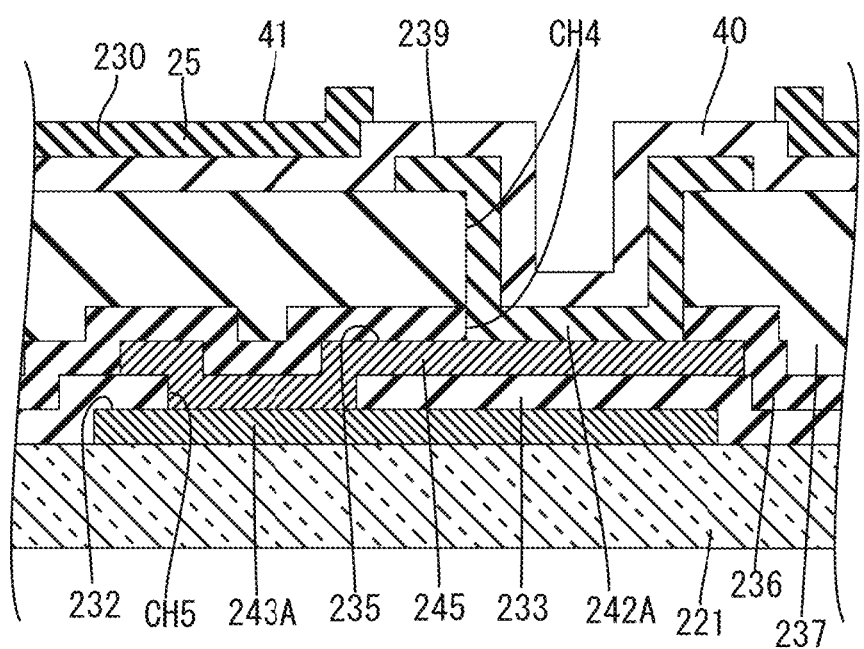
FIG. 24 is a cross-sectional view of the array substrate as taken along line D-D in FIG. 23.

As shown in FIG. 22, the second spare touch wire 243 is electrically connected to one first spare touch wire 242 (left in FIG. 22) of the two first spare touch wires 242 but electrically unconnected to the other first spare touch wire 242 (right in FIG. 22). A relationship between the second spare touch wire 243 and the one first spare touch wire 242 is described with reference to FIGS. 23 and 24. FIG. 23 is a plan view showing patterns of a touch wire 231, the one first spare touch wire 242, the second spare touch wire 243, or other components (i.e. a first metal film 232 and a third metal film 239) of an array substrate 221. FIG. 23 illustrates the first metal film 232 and the third metal film 239 by half-tone dot meshing. FIG. 24 is a cross-sectional view of sites of intersection of the one first spare touch wire 242 and the second spare touch wire 243 in the array substrate 221 (i.e. a cross-sectional view taken along line D-D in FIG. 23). As shown in FIG. 23, a first branch portion 242A protruding along the X-axis direction is provided at the site of intersection of the one first spare touch wire 242 with the second spare touch wire 243. A second branch portion 243A protruding along the Y-axis direction is provided at the site of the second spare touch wire 243 with the one first spare touch wire 242. Moreover, an inter-spare touch wire electrode 245 is provided in such a manner as to overlap both the first branch portion 242A and the second branch portion 243A. The first branch portion 242A, the second branch portion 243A, and the inter-spare touch wire electrode 245 are similar in configuration to those described above in Embodiment 1. As shown in FIG. 24, the inter-spare touch wire electrode 245, which is composed of a second metal film 235, is connected to the first branch portion 242A of the one first spare touch wire 242, which is composed of the third metal film 239, through a first inter-spare touch wire contact hole CH4 bored through a first interlayer insulating film 236 and a planarizing film 237 that are sandwiched between the second metal film 235 and the third metal film 239. The inter-spare touch wire electrode 245, which is composed of the second metal film 235, is connected to the second branch portion 243A of the second spare touch wire 243, which is composed of the first metal film 232, through a second inter-spare touch wire electrode contact hole CH5 bored through a gate insulating film 233 sandwiched between the second metal film 235 and the first metal film 232. Thus, the second spare touch wire 243 and the one first spare touch wire 242 are electrically connected to each other via the inter-spare touch wire electrode 245. It should be noted that FIG. 22 uses one black circuit to illustrate the first inter-spare touch wire electrode contact hole CH4 and the second inter-spare touch wire electrode contact hole CH5.

Figure 25:
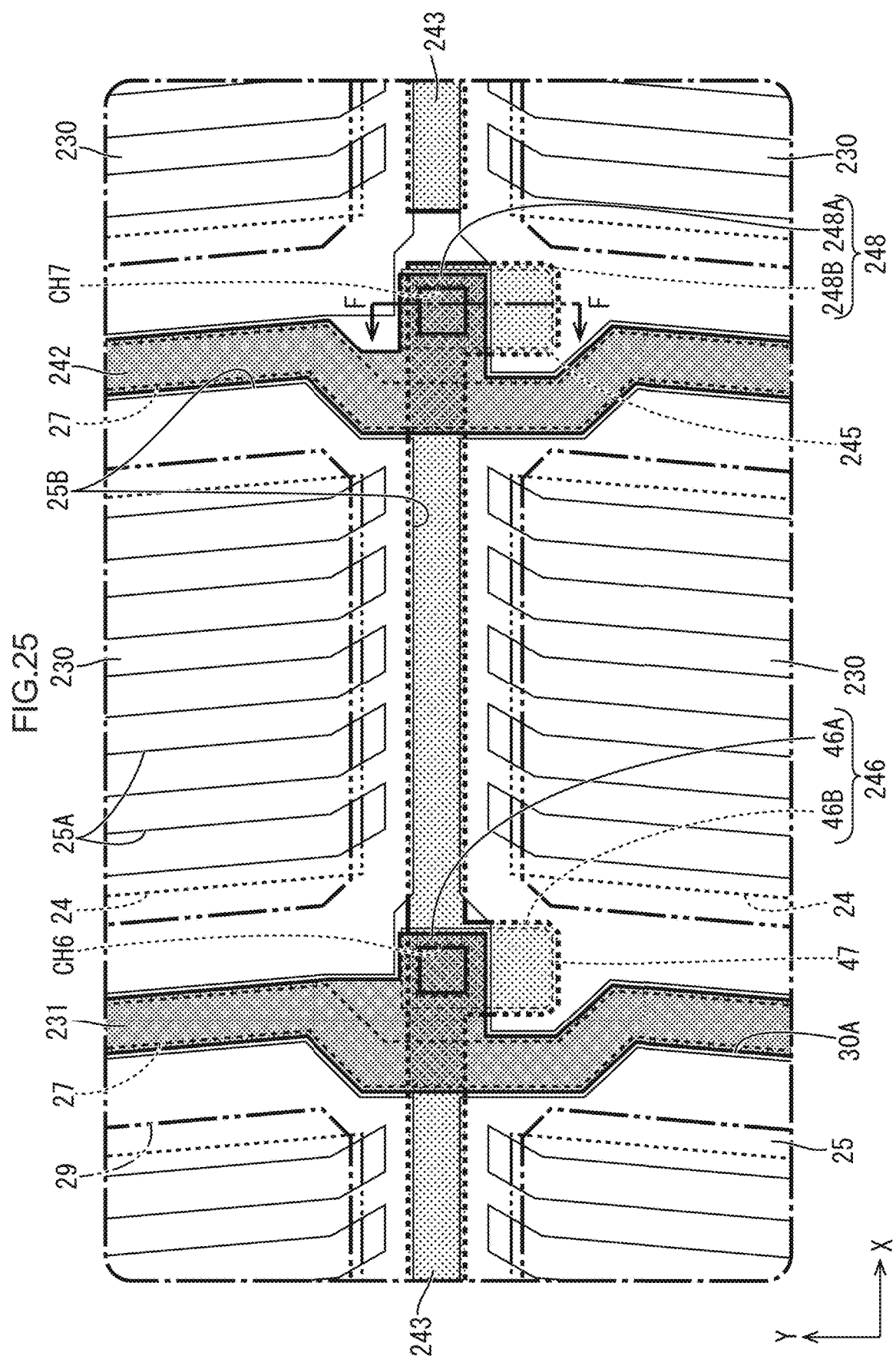
FIG. 25 is an enlarged plan view showing patterns of the first metal film and the third metal film of the array substrate near an inter-spare touch wire connectable portion.
Figure 26:
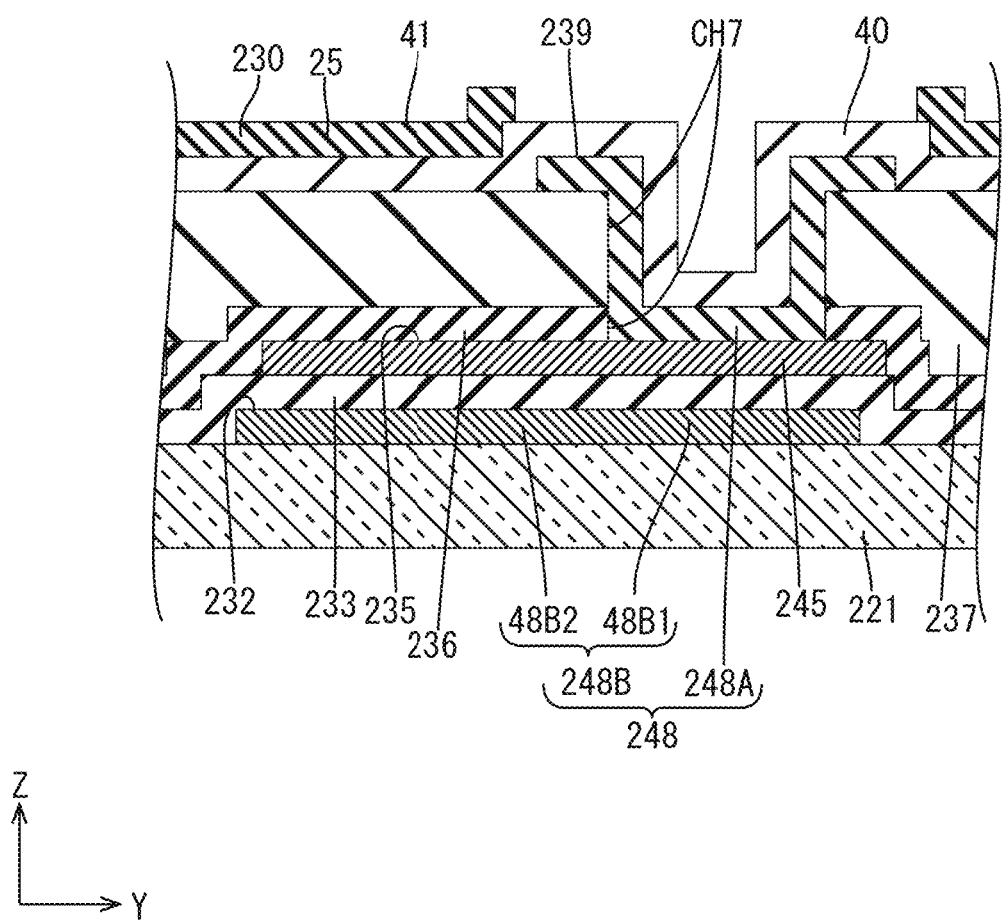
FIG. 26 is a cross-sectional view of the array substrate as taken along line F-F in FIG. 25.

Next, a relationship between the second spare touch wire 243 and the other first spare touch wire 242 is described with reference to FIGS. 25 and 26. FIG. 25 is a plan view showing patterns of a touch wire 231, the other first spare touch wire 242, the second spare touch wire 243, or other components (i.e. the first metal film 232 and the third metal film 239) of the array substrate 221. FIG. 25 illustrates the first metal film 232 and the third metal film 239 by half-tone dot meshing. FIG. 26 is a cross-sectional view of sites of intersection of the other first spare touch wire 242 and the second spare touch wire 243 in the array substrate 221 (i.e. a cross-sectional view taken along line F-F in FIG. 25). As shown in FIG. 25, inter-spare touch wire connectable portions 248 are provided separately at each of the sites of intersection of the second spare touch wire 243 and the other first spare touch wire 242. The inter-spare touch wire connectable portions 248 include a first spare touch wire side connectable portion 248A provided at the site of the other first spare touch wire 242 with the second spare touch wire 243 and a secondary second spare touch wire side connectable portion 248B provided at the site of intersection of the second spare touch wire 243 with the other first spare touch wire 242. The inter-spare touch wire connectable portions 248 are similar in configuration to those described above in Embodiment 2. As shown in FIG. 26, an inter-spare touch wire electrode 245 is disposed to overlap the first spare touch wire side connectable portion 248A and the secondary second spare touch wire side connectable portion 248B. The inter-spare touch wire electrode 245 is similar in configuration to that described above in Embodiment 2. The inter-spare touch wire electrode 245, which is composed of the second metal film 235, is connected to the first spare touch wire side connectable portion 248A of the other first spare touch wire 242, which is composed of the third metal film 239, through an inter-spare touch wire electrode contact hole CH7 bored through the first interlayer insulating film 236 and the planarizing film 237, which are sandwiched between the second metal film 235 and the third metal film 239. The inter-spare touch wire electrode 245, which is composed of the second metal film 235, is kept in the state of being electrically insulated from the secondary second spare touch wire side connectable portion 248B of the second spare touch wire 243, which is composed of the first metal film 232, by the gate insulating film 233, which is sandwiched between the second metal film 235 and the first metal film 232.

Figure 27:
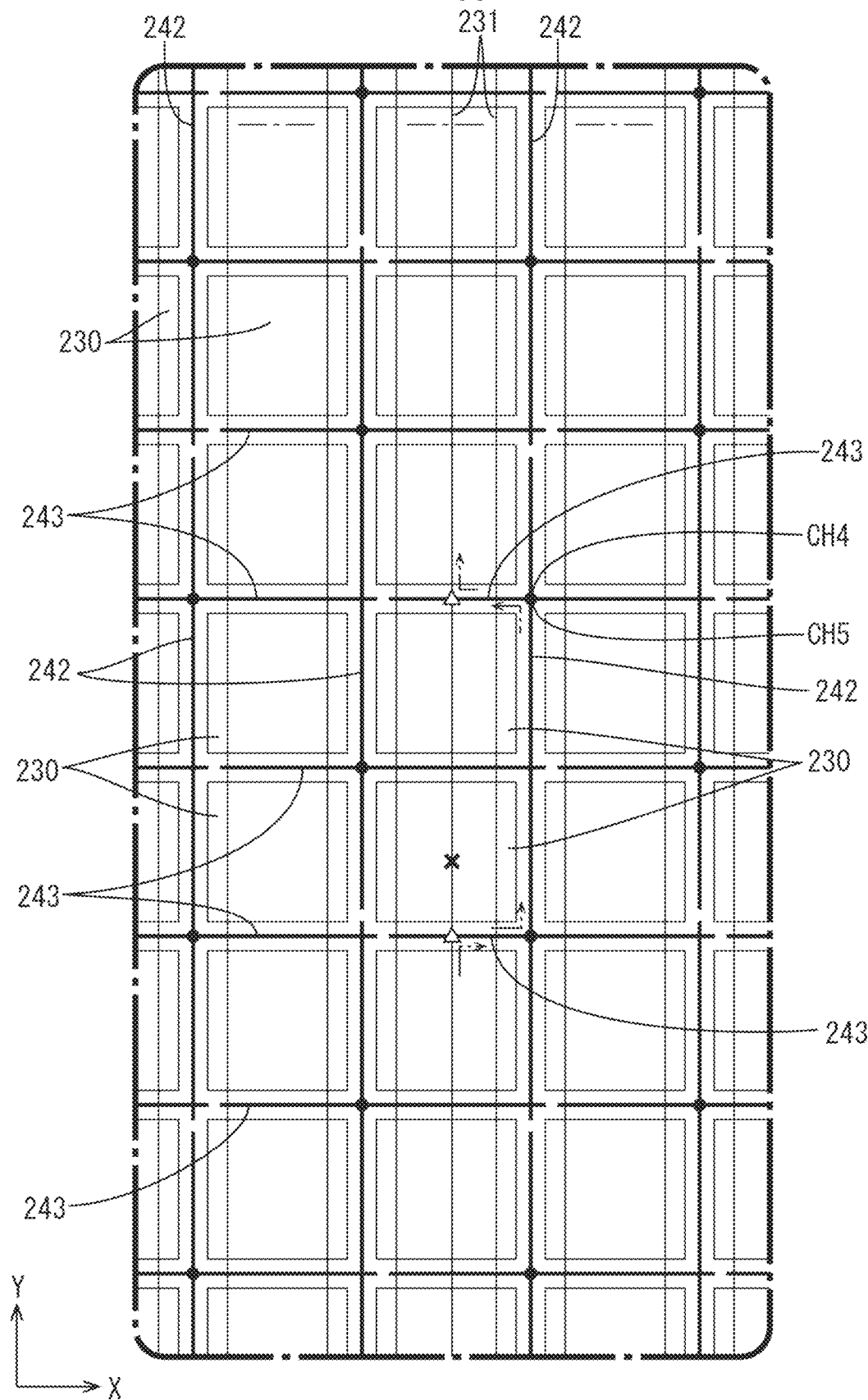
FIG. 27 is a plan view schematically showing touch electrodes, touch wires, first spare touch wires, and second spare touch wires of the liquid crystal panel with a touch wire repaired.
Figure 28:
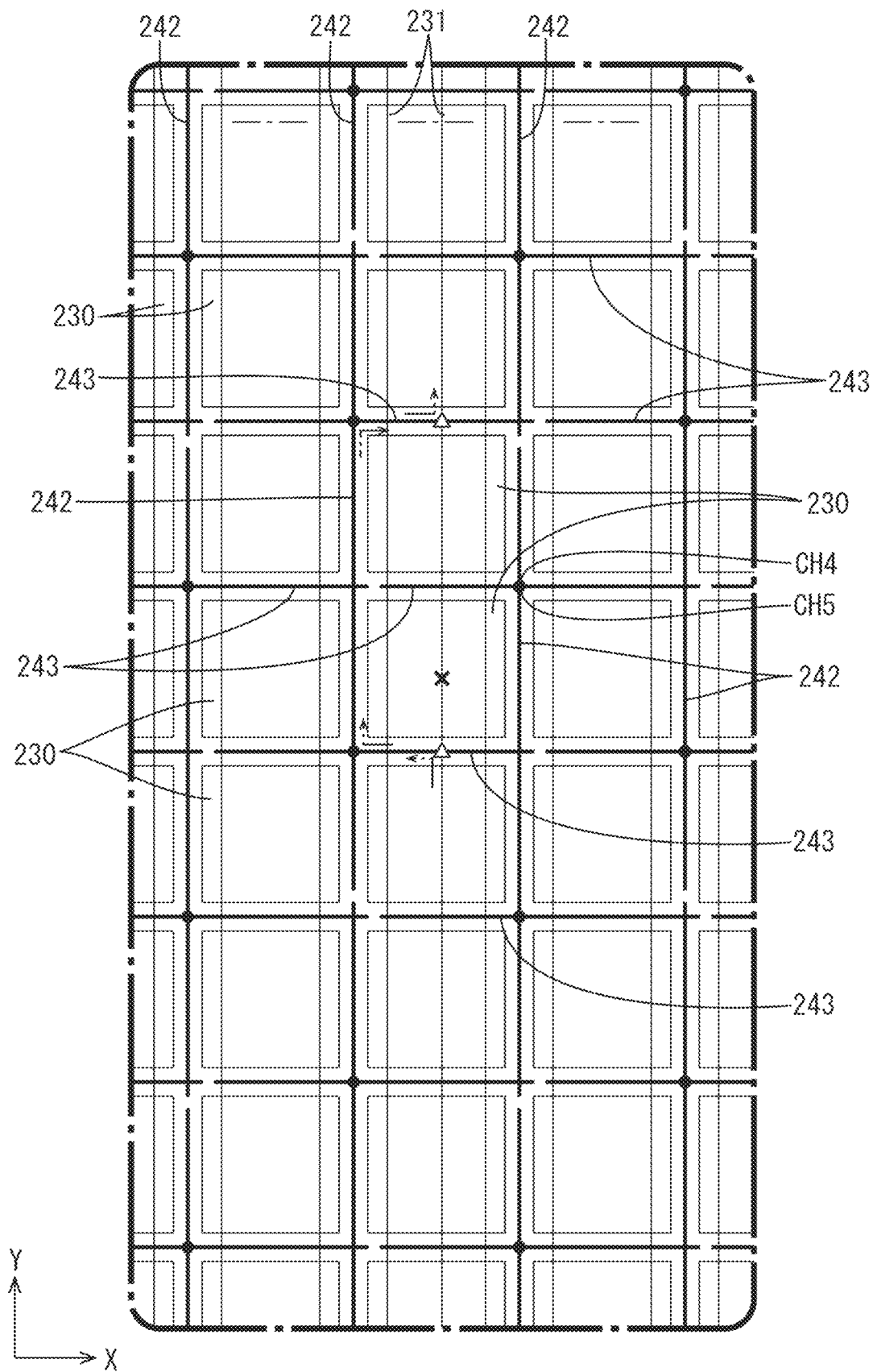
FIG. 28 is a plan view schematically showing touch electrodes, touch wires, first spare touch wires, and second spare touch wires of the liquid crystal panel with a touch wire repaired.
Figure 29:
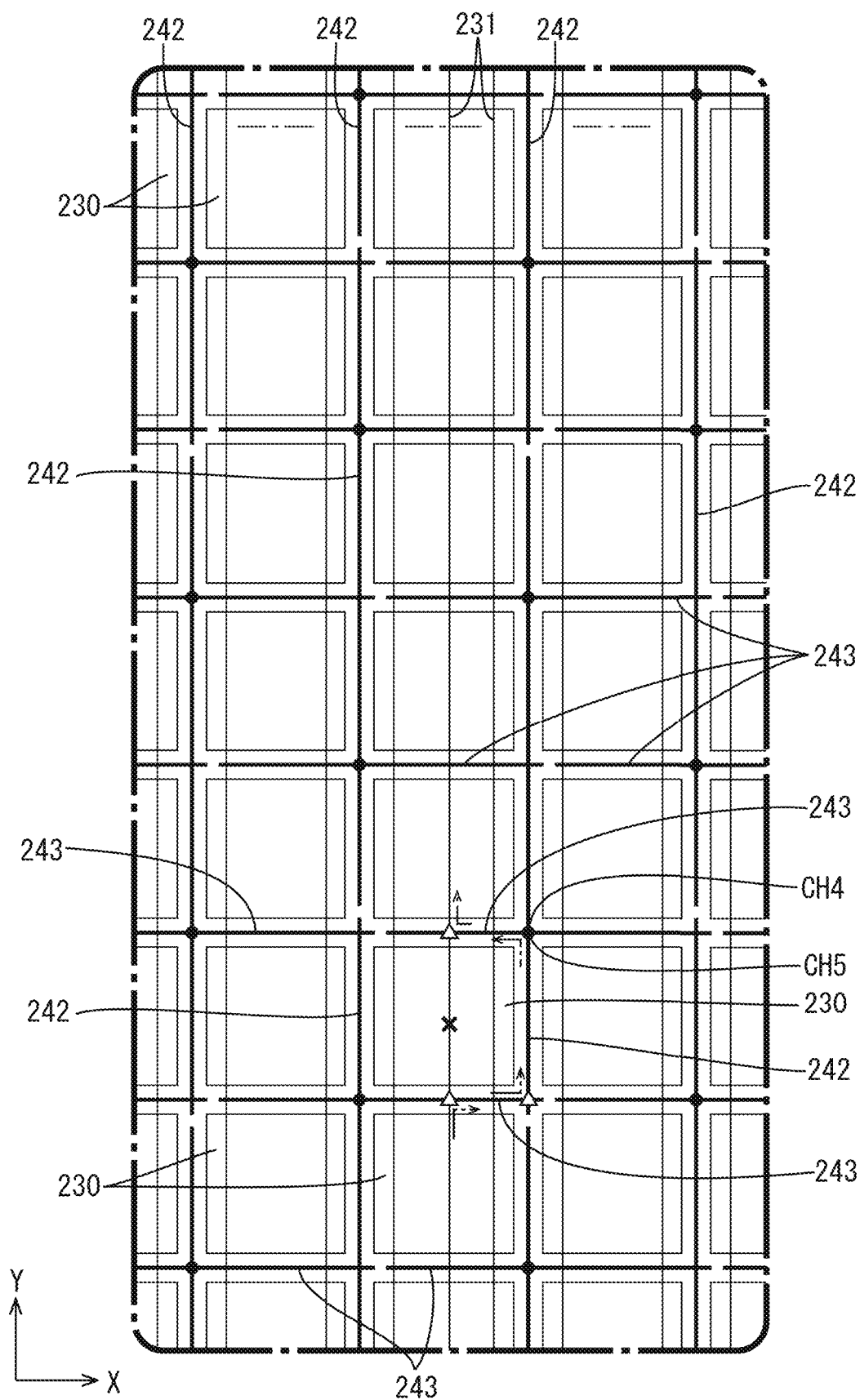
FIG. 29 is a plan view schematically showing touch electrodes, touch wires, first spare touch wires, second spare touch wires, and a common potential signal supply wire of the liquid crystal panel with a touch wire repaired.

A method for repairing in case of a break in a touch wire 231 in a liquid crystal display panel configured as described above is described with reference to FIGS. 27 to 29. FIGS. 27 to 29 are each a plan view schematically showing touch electrodes 230, touch wires 231, first spare touch wires 242, and second spare touch wires 243 of the liquid crystal panel with a touch wire 231 repaired. FIGS. 27 to 29 use the mark "x" to illustrate the position of a break in a touch wire 231 and use the mark "▲" to illustrate a point of irradiation with laser light for a short circuit. Further, FIGS. 27 to 29 uses arrows to illustrate signal transmission paths. As shown in FIGS. 27 to 29, once a broken touch wire 231 and the location of the break have been identified by an inspection, for example, two first spare touch wires 242 between which a touch electrode 230 overlapping the location of the break in the touch wire 231 is interposed in the X-axis direction and four second spare touch wires 243 each connected to one of these two first spare touch wires 242 via an inter-spare touch wire electrode 245 (indicated by a black circle in FIGS. 27 to 29) are identified. Since the four second spare touch wires 243 include two second spare touch wires 243 connected to one first spare touch wire 242 of the two first spare touch wires 242 and two second spare touch wires 243 connected to the other first spare touch wire 242, a determination is made as to whether these two sets include a set of second spare touch wires 243 between which the touch electrode 230 overlapping the location of the break in the touch wire 231 is interposed in the Y-axis direction.

In a case where it has been determined that these two sets include such a set, the two second spare touch wires 243 belonging to the set of second spare touch wires 243 between which the touch electrode 230 overlapping the location of the break in the touch wire 231 is interposed in the Y-axis direction are subjected to a process (laser light irradiation process) of short-circuiting the two second spare touch wires 243 with the broken touch wire 231 as shown in FIGS. 27 and 28. At this point in time, since the two second spare touch wires 243 that are short-circuited with the broken touch wire 231 are connected via inter-spare touch wire electrodes 245 to one of the two first spare touch wires 242 between which the touch electrode 230 overlapping the location of the break in the touch wire 231 is interposed in the X-axis direction, a signal transmission path of the touch wire 231 is ensured, so that a repair is done. The two second spare touch wires 243 belonging to the aforementioned set are placed so that the touch electrode 230 overlapping the location of the break in the touch wire 231 and another touch electrode adjacent to the touch electrode 230 are interposed between the two second spare touch wires 243.

On the other hand, in a case where it has been determined that these two sets do not include such a set, two second spare touch wires 243 between which the touch electrode 230 overlapping the location of the break in the touch wire 231 is interposed in the Y-axis direction are subjected to a process of short-circuiting the two second spare touch wires 243 with the broken touch wire 231 as shown in FIG. 29. At this point in time, the two second spare touch wires 243 that are short-circuited with the broken touch wire 231 intersect one of the two first spare touch wires 242 between which the touch electrode 230 overlapping the location of the break in the touch wire 231 is interposed in the X-axis direction, but only one of the second spare touch wires 243 is connected via an inter-spare touch wire electrode 245 to that first spare touch wire 242. Accordingly, inter-spare touch wire connectable portions 248 provided at the sites of intersection of the other second spare touch wire 243 and the first spare touch wire 242 are subjected to a process of short-circuiting the inter-spare touch wire connectable portions 248 with each other by irradiating the inter-spare touch wire connectable portions 248 with laser light. Since the two second spare touch wires 243 between which the touch electrode 230 overlapping the location of the break in the touch wire 231 is interposed in the Y-axis direction are electrically connected to the first spare touch wire 242 via the inter-spare touch wire electrode 245 and the inter-spare touch wire connectable portions 248 thus short-circuited with each other, a signal transmission path of the touch wire 231 is ensured, so that a repair is done.

This makes it possible to repair a touch wire 231 and avoid impairment of the touch panel function. Moreover, any one of a plurality of the first spare touch wires 242 arranged in the Y-axis direction is selectively used for repairing a touch wire 231, and a large number of remaining first spare touch wires 242 belonging to the same column are rendered electrically unconnected to the broken touch wire 231. Accordingly, the touch signal that is supplied to the broken wire 231 is subjected to a lower load than in a case where the first spare touch wire 42 or 142 extends the entire length of a range of placement of a plurality of the touch electrodes 230 in the Y-axis direction as in the case of Embodiment 1 or 2. This makes it hard for the touch signal to become blunt, thus making it hard for touch sensitivity to decrease. Furthermore, any one of a plurality of the second spare touch wire 243 arranged in the X-axis direction is selectively used for repairing a touch wire 231, and a large number of remaining second spare touch wires 243 belonging to the same row are rendered electrically unconnected to the broken touch wire 231. Accordingly, the touch signal that is supplied to the broken wire 231 is subjected to a lower load than in the case of a second spare touch wire extending the entire length of a range of placement of a plurality of the touch electrodes 230 in the X-axis direction. This makes it hard for the touch signal to become blunt, thus making it hard for the touch sensitivity to decrease. In addition, since the second spare touch wire 243 is connected in advance via an inter-spare touch wire electrode 245 to one of two first spare touch wires 242 between which a touch electrode 230 is interposed in the X-axis direction, a repair is performed with higher workability than in a case where a second spare touch wire is unconnected to one of the first spare touch wires 242 and it is necessary to perform a process of connecting the second spare touch wire to that first spare touch wire 242 in performing a repair.

As described above, in the present embodiment, a plurality of the touch electrodes 230 are arranged at spacings in the first direction, a plurality of the first spare touch wires 242 are arranged in the first direction, arranged so that the touch electrode 230 is interposed therebetween in the second direction, and disposed so that those of the first spare touch wires 242 between which the touch electrode 230 is interposed in the second direction differ in position from each other in the first direction, and the second spare touch wires 243 are disposed to separately intersect at least two of the first spare touch wires 242 between which the touch electrode 230 is interposed in the second direction. In this way, in case of a break in a touch wire 231, at least two second spare touch wires 243 between which the location of the break is interposed in the first direction are electrically connected to the touch wire 231 by connectable portions 246, and a first spare touch wire 242 intersecting the at least two second spare touch wires 243 between which the location of the break is interposed in the first direction is electrically connected to the at least two second spare touch wires 243. Since the first spare touch wires 242 between which the touch electrode 230 is interposed in the second direction are disposed to differ in position from each other in the first direction and the second spare touch wires 243 are disposed to separately intersect at least two of the first spare touch wires 242 between which the touch electrode 230 is interposed in the second direction, the broken touch wire 231 can be repaired by utilizing one of the at least two first spare touch wires 242 differing in position from each other in the first direction. Moreover, since a plurality of the first spare touch wires 242 are arranged in the first direction, a position detection signal that, when a broken touch wire 231 has been repaired, is transmitted to the touch wire 231 is subjected to a lower load than in the case of a first spare touch wire extending the entire length of a range of placement of a plurality of the touch electrodes 230 in the first direction. This makes it hard for the position detection signal to become blunt, thus making it hard for position detection sensitivity to decrease.

Further, the second spare touch wires 243 are disposed between the touch electrodes 230 adjacent to each other in the first direction, arranged in the second direction, and disposed so that those of the second spare touch wires 243 between which the touch electrode 230 is interposed in the first direction differ in position from each other in the second direction. In this way, a plurality of the second spare touch wires 243 are arranged in the second direction, a position detection signal that, when a broken touch wire 231 has been repaired, is transmitted to the touch wire 231 is subjected to a lower load than in the case of a second spare touch wire extending the entire length of a range of placement of a plurality of the touch electrodes 230 in the second direction. This makes it hard for the position detection signal to become blunt, thus making it hard for the position detection sensitivity to decrease.

Further, the second spare touch wires 243 are connected to one of two of the first spare touch wires 242 between which the touch electrode 230 is interposed in the second direction, and the liquid crystal panel further includes inter-spare touch wire connectable portions 248 that are provided separately at each of sites of intersection of the second spare touch wires 243 and the other of the two first spare touch wires 242 and that are disposed to overlap each other via a gate insulating film 233, a first interlayer insulating film 236, and a planarizing film 237, each of which is an insulating film. In this way, in case of a break in a touch wire 231, a process such as laser light irradiation is performed on inter-spare touch wire connectable portions 248 provided at sites of intersection of one of at least two of a plurality of the second spare touch wires 243 arranged in the first direction between which the location of the break in the broken touch wire 231 is interposed in the first direction and a first spare touch wire 242 intersecting the second spare touch wire 243 and disposed to overlap each other via the gate insulating film 233, the first interlayer insulating film 236, and the planarizing film 237, each of which is an insulating film. Then, the inter-spare touch wire connectable portions 248 cause one of the at least two second spare touch wires 243 between which the location of the break in the broken touch wire 231 is interposed in the first direction and the first spare touch wire 242 intersecting the second spare touch wire 243 to be electrically connected. Further, the at least two second spare touch wires 243 between which the location of the break is interposed in the first direction are electrically connected to the broken touch wire 231 by a plurality of connectable portions 246. Accordingly, even in case a break in the touch wire 231, the position detection signal is supplied to the touch electrode 230 by passing through the first spare touch wire 242 and the at least two second spare touch wires 243 between which the location of the break is interposed in the first direction. Moreover, since the second spare touch wires 243 are connected to one of two of the first spare touch wires 242 between which the touch electrode 230 is interposed in the second direction, a repair is performed with higher workability than in a case where second spare touch wires are unconnected to one of the first spare touch wires 242 and it is necessary to perform a process of connecting the second spare touch wires to that first spare touch wire 242 in performing a repair.

Other Embodiments

The technology disclosed herein is not limited to the embodiments described with reference to the foregoing description and drawings. For example, embodiments such as those listed below are encompassed in the technical scope.

(1) As modifications of the connectable portions 46, 146, or 246, the touch wire side connectable portions 46A and the intermediate electrodes 47 may be in the state of being insulated from each other by the first interlayer insulating film 36, 136, or 236 and the planarizing film 37, 137, or 237, and the second spare touch wire side connectable portions 46B and the intermediate electrodes 47 may be connected to each other through the intermediate electrode 47 contact holes CH6 bored through the gate insulating film 33, 133, or 233. Furthermore, the intermediate electrodes 47 may be unconnected to both the touch wire side connectable portions 46A and the second spare touch wire side connectable portions 46B. In that case, a short-circuiting process needs only be performed twice by separately irradiating sites of overlap between the intermediate electrodes 47 and the touch wire side connectable portions 46A and sites of overlap between the intermediate electrodes 47 and the second spare touch wire side connectable portions 46B with laser light.

(2) It is also possible to omit the intermediate electrodes 47. In that case, the touch wire side connectable portions 46A and the second spare touch wire side connectable portions 46B, which constitute the connectable portions 46, 146, or 246, need only be disposed to overlap each other, and a short-circuiting process needs only be performed by irradiating the sites of overlap with laser light.

(3) As modifications of the inter-spare touch wire connectable portions 48 or 248 described in Embodiment 2 or 3, the first spare touch wire side connectable portions 48A or 248A and the inter-spare touch wire electrodes 145 or 245 may be in the state of being insulated from each other by the first interlayer insulating film 136 or 236 and the planarizing film 137 or 237, the secondary second spare touch wire side connectable portions 48B or 248B and the inter-spare touch wire electrodes 145 or 245 may be connected to each other through the inter-spare touch wire electrode contact holes CH7 bored through the gate insulating film 133 or 233. Furthermore, the inter-spare touch wire electrodes 145 or 245 may be unconnected to both the first spare touch wire side connectable portions 48A or 248A and the secondary second spare touch wire side connectable portions 48B or 248B. In that case, a short-circuiting process needs only be performed twice by separately irradiating sites of overlap between the inter-spare touch wire electrodes 145 or 245 and the first spare touch wire side connectable portions 48A or 248A and sites of overlap between and the inter-spare touch wire electrodes 145 or 245 and the secondary second spare touch wire side connectable portions 48B or 248B with laser light.

(4) It is also possible to omit the inter-spare touch wire electrodes 145 or 245 described in Embodiment 2 or 3. In that case, the first spare touch wire side connectable portions 48A or 248A and the secondary second spare touch wire side connectable portions 48B or 248B, which constitute the inter-spare touch wire connectable portions 48 or 248, need only be disposed to overlap each other, and a short-circuiting process needs only be performed by irradiating the sites of overlap with laser light.

(5) As a modification of Embodiment 1 or 2, the length of each of the second spare touch wires 43 or 143 in the X-axis direction may be greater than the length of a side of the touch electrode 30 or 130. For example, the second spare touch wires 43 or 143 may each have a length over a plurality of the touch electrodes 30 or 130 arranged in the X-axis direction. In that case, a repair is made possible by providing a first spare touch wire 42 or 142 in a place adjacent to a touch electrode 30 or 130, included in the plurality of touch electrodes 30 or 130 arranged in the X-axis direction, that is located at an end, the number of first spare touch wires 42 or 142 provided can be reduced.

(6) As a modification of Embodiment 1 or 2, two first spare touch wires 42 or 142 may be arranged in the Y-axis direction. In that case, it is possible to provide two common potential signal supply wires 44 or 144 in places between which the display area AA is interposed in the Y-axis direction, and to connect the two common potential signal supply wires 44 or 144 to the two first spare touch wires 42 or 142, respectively, and supply a common potential signal to the two first spare touch wires 42 or 142.

(7) As a modification of Embodiment 1, the second spare touch wires 43 may extend the entire length of the touch area in the X-axis direction, and a plurality of the first spare touch wires 42 may be arranged in the Y-axis direction and configured to individually intersect the second spare touch wires 43. In that case, it is possible to connect the common potential signal supply wire 44 to the second spare touch wires 43 and supply a common potential signal to the second spare touch wires 43.

(8) As a modification of Embodiment 3, the first spare touch wire 242 may include a plurality of first spare touch wires 242 differing in length from each other, and the second spare touch wires 243 may include a plurality of second spare touch wires 243 differing in length from each other. Further, the specifics of the first spare touch wires 242 and the second spare touch wires 243 including the arrangements and the lengths may be changed as appropriate. Further, it is appropriately optional to choose which sites of intersection of the first spare touch wires 242 and the second spare touch wires 243 to connect in advance and which sites of intersection not to connect in advance.

(9) It is possible to apply the configuration described in Embodiment 2 to the configuration described in Embodiment 3 not to connect the sites of intersection of the first spare touch wires 242 and the second spare touch wires 243 in advance.

(10) The first spare touch wire 42, 142, or 242 may be disposed to overlap the touch electrode 30, 130, or 230. Similarly, the second spare touch wires 43, 143, or 243 may be disposed to overlap the touch electrode 30, 130, or 230.

(11) While it is possible to connect one touch wire 31, 131 or 231 to a plurality of the touch electrodes 30, 130, or 230 arranged in the X-axis direction and the Y-axis direction, it is also possible to connect a plurality of the touch wires 31, 131, or 231. Furthermore, different numbers of the touch wires 31, 131, or 231 may be connected to different touch electrodes 30, 130, or 230.

(12) It is also possible to add a fourth metal film that is placed at a higher layer than the third metal film 39, 139, or 239 via an insulating film. In that case, the first spare touch wire 42, 142, or 242 and the second spare touch wires 43, 143, or 243 may both be composed of the fourth metal film, and may be connected to each other without a contact hole by being joined directly on top of each other.

(13) The source lines 27 and the touch electrode 31, 131, or 231 may have such a relationship as to partially overlap each other, or may have such a relationship as to completely overlap each other. Similarly, the source lines 27 and the first spare touch wire 42, 142, or 242 may have such a relationship as to partially overlap each other, or may have such a relationship as to completely overlap each other.

(14) The source lines 27 and the touch wire 31, 131, or 231 may have such a relationship as not to overlap each other. Similarly, the source lines 27 and the first spare touch wire 42, 142, or 242 may have such a relationship as not to overlap each other. In these cases, the source lines 27 may be composed of the same metal film (conducting film) as the touch wire 31, 131, or 231 and the first spare touch wire 42, 142, or 242.

(15) A configuration in which the gate lines 26 and the pixel electrodes 24 are alternately arranged in the Y-axis direction (i.e. a configuration in which no gate wire non-placement areas are present) may be set up. In that case, it is also possible, for example, to dispose the second spare touch wires 43, 143, or 243 to traverse the central parts of the pixel electrodes 24.

(16) The common potential signal supply wire 44 or 144 may be connected to the driver 12. In that case, the driver 12 constitutes a common potential signal supply unit that supplies a common potential signal.

(17) The planar shape of each of the pixel electrodes 24 may be a horizontally long substantially square shape instead of being a vertically long substantially square shape.

(18) The driver 12 does not need to supply both a touch signal and an image signal. For example, the driver 12 may supply an image signal, and the flexible substrate 13 may supply a touch signal.

(19) The specifics of the liquid crystal panel 11 including the screen size and the resolution may be changed as appropriate.

(20) The specific dimensions of and array pitches between the pixel sections PX in the liquid crystal panel 11 may be changed as appropriate. Further, the specifics of the touch electrode 30, 130, or 230 including the dimensions, the array pitches, and the number of touch electrodes 30, 130, or 230 provided (i.e. the numbers of touch electrodes 30, 130, or 230 arranged in the X-axis direction and the Y-axis direction) may be changed as appropriate.

(21) The number of drivers 12 mounted may be changed as appropriate to a number other than 4.

(22) The driver 12 may be mounted on the flexible substrate 13 by COF (chip on film).

(23) The gate circuit unit 14 may be provided only on one side of the array substrate 21, 121, or 221. Alternatively, the gate circuit unit 14 may be omitted, and instead of the gate circuit unit 14, a gate driver having functions which are similar to those of the gate circuit unit 14 may be mounted on the array substrate 21, 121, or 221.

(24) The specific planar shapes of the pixel overlap openings 25A provided in the common electrode 25 may be changed as appropriate, and may for example be W shapes, linear shapes, or other shapes. Further, the specifics of the pixel overlap openings 25A including the number of pixel overlap openings 25A provided and the array pitches may be changed as appropriate.

(25) The common electrode 25 may be composed of the first transparent electrode film 38, and the pixel electrodes 24 may be composed of the second transparent electrode film 41. In that case, the pixel overlap openings 25A provided in the common electrode 25 need only be omitted and replaced by common electrode overlap openings that are provided in the pixel electrodes 24.

(26) The TFTs 23 may be planarly arranged in a zigzag pattern instead of being planarly arranged in a matrix.

(27) The semiconductor film 34, which constitutes the channel portion 23D of each of the TFTs 23, may be polysilicon. In that case, it is preferable that each of the TFTs 23 be of a bottom-gate type, or be of a top-gate type including a light-shielding film at a lower layer (on which the backlight device is placed) than the channel portion 23D.

(28) The display mode of the liquid crystal panel 11 may be an IPS mode or other modes.

(29) The touch panel pattern may employ a mutual-capacitance scheme instead of a self-capacitance scheme.

(30) The liquid crystal panel 11 may be of a reflective type or a semitransmissive type instead of being of a transmissive type.

(31) The planar shape of the liquid crystal display device 10 may be a horizontally long rectangle, a regular square, a circle, a semicircle, an oval, an ellipse, a trapezoid, or other shapes.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A position input device comprising:
    a position detecting electrode that forms a capacitance with a position input body which performs position input and that detects an input position inputted by the position input body;
    a position detecting wire that extends along a first direction, that is connected to the position detecting electrode, and that transmits at least a position detection signal;
    a first spare position detecting wire that extends along the first direction;
    a plurality of second spare position detecting wires that extend along a second direction intersecting the first direction, that are arranged at spacings in the first direction, that intersect the position detecting wire and the first spare position detecting wire, and that are connectable to the first spare position detecting wire; and
    a plurality of connectable portions that are provided at each intersection of the position detecting wire and the plurality of second spare position detecting wires that are separated by a first insulating film.

2. The position input device according to claim 1, wherein a plurality of the position detecting electrodes are arranged at spacings in the second direction, and the first spare position detecting wire is disposed between the position detecting electrodes adjacent to each other in the second direction.

3. The position input device according to claim 2, further comprising:
a pixel electrode disposed to overlap the position detecting electrode via a second insulating film; and
a signal supply unit, connected to the position detecting wire, that supplies the position detecting wire with the position detection signal and a common potential signal in a time-division manner.

4. The position input device according to claim 3, further comprising a common potential signal supply unit, connected to the first spare position detecting wire, that supplies the first spare position detecting wire with the common potential signal.

5. The position input device according to claim 4, wherein
a plurality of the position detecting electrodes are arranged at spacings in the first direction, and
the first spare position detecting wire extends an entire length of a range of placement of the plurality of position detecting electrodes in the first direction.

6. The position input device according to claim 4, wherein the second spare position detecting wires are disposed between the position detecting electrodes adjacent to each other in the first direction, and are connected to the first spare position detecting wire that the second spare position detecting wires intersect.

7. The position input device according to claim 5, wherein
a plurality of the first spare position detecting wires are placed adjacent separately to each of a plurality of the position detecting electrodes arranged in the second direction, and
a plurality of the second spare position detecting wires are arranged in the second direction and disposed to separately intersect each of the plurality of first spare position detecting wires.

8. The position input device according to claim 4, wherein
the first insulating film includes a plurality of first insulating films; and
the position input device further includes a plurality of inter-spare position detecting wire connectable portions that are provided at each intersection of the first spare position detecting wire and the plurality of second spare position detecting wires that are separated by at least one of the plurality of first insulating films.

9. The position input device according to claim 2, wherein
a plurality of the position detecting electrodes are arranged at spacings in the first direction,
a plurality of the first spare position detecting wires are arranged in the first direction, arranged so that the position detecting electrode is interposed therebetween in the second direction, and disposed so that those of the first spare position detecting wires between which the position detecting electrode is interposed in the second direction differ in position from each other in the first direction, and
the second spare position detecting wires are disposed to separately intersect at least two of the first spare position detecting wires between which the position detecting electrode is interposed in the second direction.

10. The position input device according to claim 9, wherein the second spare position detecting wires are disposed between the position detecting electrodes adjacent to each other in the first direction, arranged in the second direction, and disposed so that those of the second spare position detecting wires between which the position detecting electrode is interposed in the first direction differ in position from each other in the second direction.

11. The position input device according to claim 10, wherein
the first insulating film includes a plurality of the first insulating films;
the second spare position detecting wires are connected to one of two of the first spare position detecting wires between which the position detecting electrode is interposed in the second direction; and
the position input device further includes inter-spare position detecting wire connectable portions that are provided at each intersection of the second spare position detecting wires and the other of the two first spare position detecting wires that are separated by at least one of the plurality of first insulating films.

12. The position input device according to claim 1, wherein
the first insulating film includes a third insulating film and a fourth insulating film;
the plurality of connectable portions includes a plurality of position detecting wire side connectable portions and a plurality of spare position detecting wire side connectable portions, the plurality of position detecting wire side connectable portions being provided at a site of intersection of the position detecting wire with the plurality of second spare position detecting wires, the plurality of spare position detecting wire side connectable portions being provided at the site of intersection of the plurality of second spare position detecting wires with the position detecting wire;
the position input device further includes a plurality of intermediate electrodes that are disposed so that the third insulating film is sandwiched between the plurality of position detecting wire side connectable portions and the plurality of intermediate electrodes and that are disposed so that the fourth insulating film is sandwiched between the plurality of spare position detecting wire side connectable portions and the plurality of intermediate electrodes; and
either the plurality of position detecting wire side connectable portions or the plurality of spare position detecting wire side connectable portions are connected to the plurality of intermediate electrodes through intermediate electrode contact holes bored through either the third insulating film or the fourth insulating film.

13. The position input device according to claim 12, further comprising a plurality of inter-spare position detecting wire electrodes disposed so that the third insulating film is sandwiched between sites of intersection of the first spare position detecting wire with the plurality of second spare position detecting wires and the plurality of inter-spare position detecting wire electrodes and the fourth insulating film is sandwiched between sites of intersection of the plurality of second spare position detecting wires with the first spare position detecting wire and the plurality of inter-spare position detecting wire electrodes,
wherein at least either the sites of intersection of the first spare position detecting wire with the plurality of second spare position detecting wires or the sites of intersection of the plurality of second spare position detecting wires with the first spare position detecting wire are connected to the plurality of intermediate electrodes through inter-spare position detecting wire electrode contact holes bored through either the third insulating film or the fourth insulating film.

14. The position input device according to claim 1, further comprising:
    a plurality of pixel electrodes that are arranged in the second direction and that are disposed to overlap the position detecting electrode via a second insulating film; and
    a plurality of image lines that extend along the first direction, that are arranged in the second direction, and that supply the plurality of pixel electrodes with an image signal; wherein
    the first insulating film includes a plurality of first insulating films; and
    the position detecting wire and the first spare position detecting wire are located at the same layer as each other and disposed to overlap the plurality of image lines via at least one of the plurality of first insulating films.

15. The position input device according to claim 1, further comprising:
    a plurality of pixel electrodes that are arranged in the first direction and that are disposed to overlap the position detecting electrode via a second insulating film;
    a plurality of switching elements that are connected separately to each of the plurality of pixel electrodes; and
    a plurality of scanning lines that extend along the second direction, that are disposed so that two of the pixel electrodes are interposed therebetween in the first direction, two of which are disposed between the pixel electrodes adjacent to each other in the first direction, and that are connected to the plurality of switching elements,
    wherein the second spare position detecting wires are located at the same layer as the scanning lines, disposed between the pixel electrodes adjacent to each other in the first direction, and disposed so that the pixel electrodes are interposed between the scanning lines and the second spare position detecting wires in the first direction.

* * * * *